(12) United States Patent
Kuroiwa et al.

(10) Patent No.: US 10,677,151 B2
(45) Date of Patent: Jun. 9, 2020

(54) STRADDLED VEHICLE

(71) Applicant: YAMAHA HATSUDOKI KABUSHIKI KAISHA, Iwata-shi, Shizuoka (JP)

(72) Inventors: Makoto Kuroiwa, Iwata (JP); Hayatoshi Sato, Iwata (JP); Masaki Torigoshi, Iwata (JP); Yoshitaka Momiyama, Iwata (JP); Naoki Makita, Iwata (JP)

(73) Assignee: YAMAHA HATSUDOKI KABUSHIKI KAISHA, Iwata-Shi, Shizuoka (JP)

( * ) Notice: Subject to any disclaimer, the term of this patent is extended or adjusted under 35 U.S.C. 154(b) by 14 days.

(21) Appl. No.: 16/219,880

(22) Filed: Dec. 13, 2018

(65) Prior Publication Data

US 2019/0120130 A1    Apr. 25, 2019

Related U.S. Application Data

(63) Continuation-in-part of application No. PCT/JP2017/021934, filed on Jun. 14, 2017.

(30) Foreign Application Priority Data

Jun. 17, 2016 (JP) .................. 2016-121163

(51) Int. Cl.
*F02B 37/18* (2006.01)
*B62M 7/02* (2006.01)
(Continued)

(52) U.S. Cl.
CPC ............ *F02B 37/186* (2013.01); *B62M 7/02* (2013.01); *F01N 3/20* (2013.01); *F01N 3/28* (2013.01);
(Continued)

(58) Field of Classification Search
CPC .............. F02B 37/186; F02B 2039/166; F02B 2039/164; F02B 37/18; F02B 39/00;
(Continued)

(56) References Cited

U.S. PATENT DOCUMENTS 4,469,189 A * 9/1984 Minami .................. B62K 11/04
180/219
4,900,343 A * 2/1990 Minami .................. F02B 33/44
55/318
(Continued)

FOREIGN PATENT DOCUMENTS

JP    S57-044728 A    3/1982
JP    S57-044729 A    3/1982
(Continued)

*Primary Examiner* — Hoang M Nguyen
(74) *Attorney, Agent, or Firm* — Rabin & Berdo, P.C.

(57) ABSTRACT

In a vehicle, a rod of a waste gate valve actuator reciprocates along a virtual plane which is parallel to both the central axis of a connecting shaft of a turbocharger and the cylinder axis of a cylinder hole. When viewed in the left or right direction of the vehicle, a main catalyst of a catalyst portion is provided forward of the cylinder axis of the cylinder hole. The flow direction of the exhaust gas in the main catalyst intersects with the reciprocating direction of the rod of the waste gate valve actuator when viewed in a direction orthogonal to both the central axis of the connecting shaft of the turbocharger and the central axis of the cylinder hole.

15 Claims, 20 Drawing Sheets

(51) Int. Cl.
    *F02B 39/00*     (2006.01)
    *F01N 13/00*     (2010.01)
    *F01N 3/20*     (2006.01)
    *F01N 3/28*     (2006.01)
    *B62M 7/04*     (2006.01)
    *F02B 39/16*     (2006.01)

(52) U.S. Cl.
CPC .............. *F01N 13/00* (2013.01); *F02B 37/18* (2013.01); *F02B 39/00* (2013.01); *F02B 39/005* (2013.01); *B62M 7/04* (2013.01); *F01N 2340/04* (2013.01); *F01N 2340/06* (2013.01); *F01N 2590/04* (2013.01); *F02B 2039/164* (2013.01); *F02B 2039/166* (2013.01); *F05B 2220/40* (2013.01); *F05D 2260/96* (2013.01); *Y02A 50/2322* (2018.01); *Y02T 10/144* (2013.01)

(58) Field of Classification Search
CPC .......... F02B 39/005; F01N 3/20; F01N 13/00; F01N 3/28; F01N 2340/06; F01N 2340/04; F01N 2590/04; Y02A 50/2322; Y02T 10/144; F05D 2260/96; F05B 2220/40; B62M 7/04; B62M 7/02
USPC .................................................. 60/605.1–612
See application file for complete search history.

(56) References Cited

U.S. PATENT DOCUMENTS

| | | | |
|---|---|---|---|
| 5,778,857 A | * | 7/1998 | Nakamura ............ F02D 35/023 123/406.29 |
| 2005/0204730 A1 | * | 9/2005 | Tsukahara ................. F01N 3/22 60/290 |
| 2006/0283418 A1 | | 12/2006 | Matsuda et al. |
| 2015/0083513 A1 | | 3/2015 | Ito et al. |
| 2018/0231116 A1 | * | 8/2018 | Kobayashi ............... F01M 1/02 |

FOREIGN PATENT DOCUMENTS

| | | |
|---|---|---|
| JP | S58-128925 A | 8/1983 |
| JP | S5968513 A | 4/1984 |
| JP | H02-016330 A | 1/1990 |
| WO | 2005111395 A2 | 11/2005 |

\* cited by examiner

STRADDLED VEHICLE

CROSS-REFERENCE TO RELATED APPLICATIONS

This application claims the benefit of the earlier filing date of International Application No. PCT/JP2017/021934, filed Jun. 14, 2017, and of Japanese Patent Application No. 2016-121163, filed Jun. 17, 2016. The entire contents of each of the identified applications are incorporated herein by reference.

BACKGROUND

Technical Field

The present teaching relates to a straddled vehicle including an engine unit with a turbocharger.

Background Art

A straddled vehicle such as a motorcycle is required to have improved fuel consumption of the engine and an improved output of the engine. To satisfy these requirements, a turbocharger is provided and the engine displacement is reduced. The fuel consumption is improved by reducing the engine displacement. The turbocharger improves the intake efficiency. In this way, an output of the engine is increased while the fuel consumption is improved.

The engine main body is downsized as the engine displacement is reduced. Providing the turbocharger, however, disadvantageously increases the number of parts. To restrain increase in size of the straddled vehicle, it is necessary to provide the additional parts in a narrow space in the straddled vehicle. Patent Literature 1 (identified further on) proposes a layout of a straddled vehicle in which a turbocharger is provided while increase in size of the vehicle is restrained.

Patent Literature 1 recites the layout of a turbocharger, an intercooler, a surge tank, a throttle body, and a cylinder head of an engine main body. The intercooler is an apparatus to cool air compressed by the turbocharger. The air discharged from the intercooler is supplied to the throttle body via the surge tank. The throttle body and the surge tank are provided behind the cylinder head. The intercooler is provided rearward of the cylinder head and the throttle body. The intercooler is provided adjacent to the surge tank. The turbocharger is provided forward of the intercooler. This layout allows the intercooler to efficiently cool intake air. The intake efficiency is therefore improved. With the layout of Patent Literature 1, the intake efficiency is improved while increase in size of the straddled vehicle is restrained.

CITATION LIST

Patent Literatures

[Patent Literature 1] U. S. Unexamined Patent Publication No. 2015/083513

SUMMARY

Straddled vehicles are recently required to improve an exhaust gas purification performance. It has been found, however, that improving the exhaust gas purification performance while restraining increase in size of the vehicle is difficult in the straddled vehicle of Patent Literature 1.

An object of the present teaching is to provide a straddled vehicle in which an exhaust gas purification performance is improved while increase in size of the vehicle is restrained, even if a turbocharger is provided.

As described above, straddled vehicles are recently required to improve an exhaust gas purification performance. It has been found, however, that improving the exhaust gas purification performance while restraining increase in size of the vehicle is difficult in the straddled vehicle of Patent Literature 1. The reason for this will be described below.

The engine main body is connected to an exhaust passage member for exhausting exhaust gas. In the straddled vehicle of Patent Literature 1, an exhaust passage member downstream of the turbocharger is referred to as a turbine downstream passage member for convenience in this specification. In Patent Literature 1, the turbocharger is provided in front of a lower portion of the engine main body. When viewed in the right or left direction, the flow direction of the exhaust gas in the turbine downstream passage member is substantially in parallel to the front-rear direction. In other words, the entire turbine downstream passage member is provided at a low position which is substantially at the same height as the turbocharger. Patent Literature 1 is silent on a catalyst. The inventors of the subject application tried to provide a catalyst in the turbine downstream passage member. A catalyst is increased in size in order to improve the exhaust gas purification performance. If a large catalyst is provided in the turbine downstream passage member, the turbine downstream passage member is increased in size, too. As described above, the entire turbine downstream passage member is provided at a low position. On this account, in a case where the turbine downstream passage member is laterally increased in size, the turbine downstream passage member makes contact with the road surface when the straddled vehicle leans. Meanwhile, in a case where the turbine downstream passage member is increased in size downward, the distance between the turbine downstream passage member and the road surface is insufficient. For these reasons, the turbine downstream passage member can be increased in size only upward. In Patent Literature 1, the turbine downstream passage member is provided to be close to a part of the lower surface of the engine main body. On this account, if the turbine downstream passage member is increased in size upward, the position of the engine main body is higher. The vehicle is therefore increased in size upward. In short, when one simply tries to provide a large catalyst in the turbine downstream passage member, the straddled vehicle is increased in size upward.

An object of the technology recited in Patent Literature 1 is to restrain increase in size of a straddled vehicle while improving an intake efficiency. To achieve this object, Patent Literature 1 employs a technical idea which is to determine the layout of an intake system of the engine unit and lastly, to determine the position of the turbocharger. However, when one tries to improve the exhaust gas purification performance of the engine unit based on this technical idea, the straddled vehicle is increased in size upward, as described above.

Under the circumstances described above, the inventors of the subject application investigated the layout of the engine unit based on the following technical idea rather than the known technical idea above. The technical idea is to determine the position of the turbocharger so that the degree of freedom in layout of a catalyst in the turbine downstream passage member is increased. As a result of an increased degree of freedom in layout of the catalyst, a large catalyst can be provided at a position with which increase in size of the straddled vehicle is restrained. As a result, it is possible to further suppress the increase in size of the straddled vehicle and at the same time to further improve the exhaust gas purification performance.

The inventors of the subject application found a new technical idea through research and development. The technical idea is to adjust the positional relation between an actuator of a waste gate valve of the turbocharger and the catalyst. To put it differently, the technical idea is to determine the position of the actuator of the waste gate valve so that the degree of freedom in layout of the catalyst is increased. As a result of an increased degree of freedom in layout of the catalyst, a large catalyst can be provided at a position with which increase in size of the straddled vehicle is restrained. As a result, it is possible to further suppress the increase in size of the straddled vehicle and at the same time to further improve the exhaust gas purification performance.

(1) A straddled vehicle of the present teaching includes: an engine unit supported by the vehicle body frame; a front wheel unit which includes at least one front wheel and is provided in front of the engine unit in a front-rear direction of the vehicle when viewed in a left-right direction of the vehicle; and a rear wheel unit which includes at least one rear wheel and is provided behind the engine unit in the front-rear direction when viewed in the right or left direction.

The engine unit includes: an engine main body including at least one combustion chamber and at least one cylinder hole; an intake passage member which is connected to the engine main body and includes an atmosphere suction port through which air is suckable, air supplied to the at least one combustion chamber passing through the intake passage member, an upstream exhaust passage member which is connected to the engine main body, exhaust gas exhausted from the at least one combustion chamber passing through the upstream exhaust passage member; a downstream exhaust passage member including an atmosphere discharge port from which the exhaust gas is dischargeable to the atmosphere; a turbocharger including a turbine wheel which is provided in the upstream exhaust passage member and a compressor wheel which is provided in the intake passage member and is connected to the turbine wheel via a connecting shaft having a central axis which is along the left-right direction of the vehicle; a bypass exhaust passage member connected to the upstream exhaust passage member so as to bypass the turbine wheel; a waste gate valve which is configured to adjust a flow rate of the exhaust gas supplied to the turbine wheel by changing a cross-sectional area of a path of the bypass exhaust passage member; a waste gate valve actuator which includes a rod connected to the waste gate valve and is configured to drive the waste gate valve by reciprocating the rod along a virtual plane which is parallel to both the central axis of the connecting shaft of the turbocharger and at least one central axis of the at least one cylinder hole; and a catalyst portion which is connected to a downstream end of the upstream exhaust passage member and an upstream end of the downstream exhaust passage member and includes a main catalyst configured to purify the exhaust gas exhausted from the at least one combustion chamber most in at least one exhaust path from the at least one combustion chamber to the atmosphere discharge port, the catalyst portion being provided so that (a) the main catalyst is provided forward of the at least one central axis of the at least one cylinder hole in the front-rear direction when viewed in the right-left direction, (b) a flow direction of the exhaust gas in the main catalyst is along a direction parallel to the at least one central axis of the at least one cylinder hole, (c) the flow direction of the exhaust gas in the main catalyst intersects with a reciprocating direction in which the rod of the waste gate valve actuator moves, when viewed in a direction orthogonal to both the central axis of the connecting shaft of the turbocharger and the at least one central axis of the at least one cylinder hole, and (d) a center in the left-right direction of the straddled vehicle is positioned between the main catalyst and the waste gate valve actuator.

According to this arrangement, the straddled vehicle includes the vehicle body frame, the engine unit, the front wheel unit, and the rear wheel unit. In the following description, the left-right direction, the front-rear direction, and the up-down direction are the left-right direction of the vehicle, the front-rear direction of the vehicle, and the up-down direction of the vehicle respectively. The engine unit is supported by the vehicle body frame. The front wheel unit includes at least one front wheel. The front wheel unit is provided in front of the engine unit when viewed in the left or right direction. The rear wheel unit includes at least one rear wheel. The rear wheel unit is provided behind the engine unit when viewed in the left or right direction.

The engine unit includes the engine main body, the intake passage member, the upstream exhaust passage member, and the downstream collective exhaust passage member. The engine main body includes at least one combustion chamber. The engine main body includes at least one cylinder hole. The cylinder hole forms part of the inner surface of the combustion chamber. The intake passage member is connected to the engine main body. The intake passage member includes the atmosphere suction port through which air is suckable from the atmosphere. Air supplied to the at least one combustion chamber passes through the intake passage member. The upstream exhaust passage member is connected to the engine main body. Exhaust gas exhausted from the at least one combustion chamber passes through the upstream exhaust passage member. The downstream exhaust passage member includes the atmosphere discharge port from which the exhaust gas is discharged to the atmosphere.

The engine unit includes the turbocharger, the bypass exhaust passage member, the waste gate valve, and the waste gate valve actuator. The turbocharger includes the turbine wheel and the compressor wheel. The turbine wheel is provided in the upstream exhaust passage member. The compressor wheel is provided in the intake passage member. The compressor wheel is connected to the turbine wheel via the connecting shaft having the central axis which is along the left-right direction. In other words, the central rotation axes of the turbine wheel and the compressor wheel are along the left-right direction. The turbine wheel is rotated by receiving exhaust gas. In accordance with the rotation of the turbine wheel, the compressor wheel rotates. As a result, the compressor wheel compresses air. The compressed air is supplied to the engine main body. The bypass exhaust passage member is connected to the upstream exhaust passage member so as to bypass the turbine wheel. The waste gate valve is arranged to be able to change the cross-sectional area of the path of the bypass exhaust passage member. As the cross-sectional area of the path of the bypass exhaust passage member is changed, the flow rate of the exhaust gas supplied to the turbine wheel is adjusted. To put it differently, the waste gate valve is arranged to be able to adjust the flow rate of the exhaust gas supplied to the turbine wheel. The waste gate valve actuator includes the rod which is directly or indirectly connected to the waste gate valve. The waste gate valve actuator is arranged such that the rod is able to reciprocate in a direction along a virtual plane. This virtual plane is a plane orthogonal to both the central axis of the connecting shaft of the turbocharger and each central axis of the at least one cylinder hole. The direction in which the rod reciprocates is the longitudinal direction of the rod. As the rod reciprocates, the waste gate valve is driven. The waste gate valve actuator is arranged to be able to drive the waste gate valve.

The engine unit includes the catalyst portion. The catalyst portion is connected to the downstream end of the upstream exhaust passage member and the upstream end of the downstream exhaust passage member. The catalyst portion includes the main catalyst. The main catalyst is configured to purify the exhaust gas exhausted from the at least one combustion chamber most in at least one exhaust path from the at least one combustion chamber to the atmosphere discharge port.

The catalyst portion is provided so that the main catalyst is forward of each central axis of the at least one cylinder hole when viewed in the left or right direction. Furthermore, the catalyst portion is provided so that the flow direction of the exhaust gas in the main catalyst is along a direction parallel to each central axis of the at least one cylinder hole. In the straddled vehicle, the percentage of the size of the engine main body within the size of the entire vehicle is high. On this account, the catalyst portion of the straddled vehicle can be provided in the vicinity of the engine main body by arranging the catalyst portion as described above.

Furthermore, the catalyst portion is provided such that the flow direction of the exhaust gas in the main catalyst intersects with the reciprocating direction of the rod of the waste gate valve actuator when viewed in the direction orthogonal to both the central axis of the connecting shaft of the turbocharger and each central axis of the at least one cylinder hole. This arrangement allows the catalyst portion and the waste gate valve actuator to be remote from each other. Because the catalyst portion is unlikely to interfere with the waste gate valve actuator, the degree of freedom in layout of the catalyst portion is improved.

In addition, the catalyst portion is provided so that the center in the left-right direction of the straddled vehicle is located between the main catalyst and the waste gate valve actuator. In the straddled vehicle, the positions of components may be restricted due to weight unbalance of the vehicle in the left-right direction. In the present teaching, the weight unbalance of the straddled vehicle in the left-right direction can be restrained by adjusting the positional relation between the main catalyst and the waste gate valve actuator.

Because the straddled vehicle of the present teaching has the arrangement above, the degree of freedom in layout of the catalyst portion is improved. It is therefore possible to provide the catalyst portion at a position where increase in size of the straddled vehicle in the up-down direction is restrained, even when the size of the main catalyst is increased. As a result, it is possible to further suppress the increase in size of the straddled vehicle and at the same time to further improve the exhaust gas purification performance. In this way, it is possible to further suppress the increase in size of the straddled vehicle and at the same time to further improve the exhaust gas purification performance, by setting the positional relation between the catalyst portion and the engine main body, the positional relation between the catalyst portion and the turbocharger, and the positional relation between the catalyst portion and the waste gate valve actuator, in order to improve the degree of freedom in layout of the catalyst portion.

The following provides details. Assume that the angle between the central axis of the cylinder hole and the up-down direction of the vehicle is equal to or smaller than 45 degrees. In this case, increase in distance between the engine main body and the front wheel unit is restrained even when the catalyst portion, the turbocharger, and the waste gate valve actuator are provided between the engine main body and the front wheel unit when viewed in the left or right direction. It is therefore possible to further suppress the increase in size of the vehicle in the front-rear direction. Further, assume that the angle between the central axis of the cylinder hole and the up-down direction of the vehicle is equal to or larger than 45 degrees. In this case, increase in distance between the engine main body and the road surface is restrained even when the catalyst portion, the turbocharger, and the waste gate valve actuator are provided between the engine main body and the road surface when viewed in the left or right direction. It is therefore possible to further suppress the increase in size of the vehicle in the up-down direction.

(2) According to an aspect of the present teaching, the straddled vehicle of the present teaching preferably includes the following arrangement, in addition to the arrangement (1). The catalyst portion is provided such that, when viewed in the direction orthogonal to both the central axis of the connecting shaft of the turbocharger and the at least one central axis of the at least one cylinder hole, the flow direction of the exhaust gas in the main catalyst intersects with the reciprocating direction of the rod of the waste gate valve actuator to form an acute angle or an obtuse angle.

This arrangement reduces the distance in the left-right direction between the catalyst portion and the waste gate valve actuator. The degree of freedom in layout of the catalyst portion is therefore improved. It is therefore possible to provide the catalyst portion at a position where increase in size of the straddled vehicle in the up-down direction is restrained, even when the size of the main catalyst is increased. As a result, it is possible to further suppress the increase in size of the straddled vehicle and at the same time to further improve the exhaust gas purification performance.

(3) According to an aspect of the present teaching, the straddled vehicle of the present teaching preferably includes the following arrangement, in addition to the arrangement (1). The engine main body includes a crankshaft having a central axis which is along the left-right direction. At least part of the catalyst portion is provided forward of the central axis of the crankshaft in the front-rear direction.

(4) According to an aspect of the present teaching, the straddled vehicle of the present teaching preferably includes the following arrangement, in addition to the arrangement (2). The engine main body includes a crankshaft having a central axis which is along the left-right direction. At least part of the catalyst portion is provided forward of the central axis of the crankshaft in the front-rear direction.

According to this arrangement, the engine main body includes a crankshaft. The crankshaft has a central axis which is along the left-right direction. At least part of the catalyst portion is provided forward of the central axis of the crankshaft. The path length from the combustion chamber to the catalyst portion is therefore short. On this account, the temperature of exhaust gas flowing into the main catalyst is higher. Thus, at the cold start of the engine unit, the time required for activation of the main catalyst in an inactive state is shortened. On this account, the exhaust gas purification performance of the main catalyst is further improved. The cold start of the engine unit is to start the engine unit in a state in which the temperature of the engine main body is equal to or lower than the outside air temperature.

(5) According to an aspect of the present teaching, the straddled vehicle of the present teaching preferably includes the following arrangement, in addition to the arrangement (1). At least part of the catalyst portion is provided below a horizontal plane which passes a center of the front wheel unit in an up-down direction of the vehicle.

(6) According to an aspect of the present teaching, the straddled vehicle of the present teaching preferably includes the following arrangement, in addition to the arrangement (2). At least part of the catalyst portion is provided below a horizontal plane which passes a center of the front wheel unit in an up-down direction of the vehicle.

(7) According to an aspect of the present teaching, the straddled vehicle of the present teaching preferably includes the following arrangement, in addition to the arrangement (3). At least part of the catalyst portion is provided below a horizontal plane which passes a center of the front wheel unit in an up-down direction of the vehicle.

(8) According to an aspect of the present teaching, the straddled vehicle of the present teaching preferably includes the following arrangement, in addition to the arrangement (4). At least part of the catalyst portion is provided below a horizontal plane which passes a center of the front wheel unit in an up-down direction of the vehicle.

If the entirety of the catalyst portion is provided above the horizontal plane passing the center of the front wheel unit, the position of the turbocharger is considerably higher. As a result, the straddled vehicle is increased in size in the up-down direction in order to secure a space where the turbocharger is provided. It is possible to further restrain increase in size of the straddled vehicle in the up-down direction by providing at least part of the catalyst portion below the horizontal plane passing the center of the front wheel unit.

(9) According to an aspect of the present teaching, the straddled vehicle of the present teaching preferably includes the following arrangement, in addition to the arrangement (1). When viewed in the front-rear direction, the catalyst portion is provided leftward of or rightward of the turbine wheel in the left-right direction.

(10) According to an aspect of the present teaching, the straddled vehicle of the present teaching preferably includes the following arrangement, in addition to the arrangement (2). When viewed in the front-rear direction, the catalyst portion is provided leftward of or rightward of the turbine wheel in the left-right direction.

(11) According to an aspect of the present teaching, the straddled vehicle of the present teaching preferably includes the following arrangement, in addition to the arrangement (3). When viewed in the front-rear direction, the catalyst portion is provided leftward of or rightward of the turbine wheel in the left-right direction.

(12) According to an aspect of the present teaching, the straddled vehicle of the present teaching preferably includes the following arrangement, in addition to the arrangement (4). When viewed in the front-rear direction, the catalyst portion is provided leftward of or rightward of the turbine wheel in the left-right direction.

(13) According to an aspect of the present teaching, the straddled vehicle of the present teaching preferably includes the following arrangement, in addition to the arrangement (5). When viewed in the front-rear direction, the catalyst portion is provided leftward of or rightward of the turbine wheel in the left-right direction.

(14) According to an aspect of the present teaching, the straddled vehicle of the present teaching preferably includes the following arrangement, in addition to the arrangement (6). When viewed in the front-rear direction, the catalyst portion is provided leftward of or rightward of the turbine wheel in the left-right direction.

(15) According to an aspect of the present teaching, the straddled vehicle of the present teaching preferably includes the following arrangement, in addition to the arrangement (7). When viewed in the front-rear direction, the catalyst portion is provided leftward of or rightward of the turbine wheel in the left-right direction.

(16) According to an aspect of the present teaching, the straddled vehicle of the present teaching preferably includes the following arrangement, in addition to the arrangement (8). When viewed in the front-rear direction, the catalyst portion is provided leftward of or rightward of the turbine wheel in the left-right direction.

With this arrangement, when viewed in the front or rear direction, at least part of the catalyst portion and at least part of the turbine wheel are not lined up in the up-down direction. Assume that, when viewed in the front or rear direction, at least part of the catalyst portion is provided straight below the turbine wheel and is lined up with at least part of the turbine wheel in the up-down direction. In this case, the path from the turbine wheel to the downstream end of the upstream exhaust passage member is bended in a substantially S shape when viewed in the front or rear direction. The path length of a passage member is typically long when the passage member has many bended portions. On this account, when the catalyst portion is provided leftward of or rightward of the turbine wheel, the path length from the combustion chamber to the catalyst portion is short. On this account, the temperature of exhaust gas flowing into the main catalyst is higher. Thus, at the cold start of the engine unit, the time required for activation of the main catalyst in an inactive state is shortened. On this account, the exhaust gas purification performance of the main catalyst is further improved.

(17) According to an aspect of the present teaching, the straddled vehicle of the present teaching preferably includes the following arrangement, in addition to any one of the arrangements (1) to (16). The at least one central axis of the at least one cylinder hole is along an up-down direction of the vehicle.

This arrangement makes it easy to provide the catalyst portion below the turbine wheel. As a result, it is possible to further suppress the increase in size of the straddled vehicle and at the same time to further improve the exhaust gas purification performance.

(18) According to an aspect of the present teaching, the straddled vehicle of the present teaching preferably includes the following arrangement, in addition to the arrangement (17). The catalyst portion is provided so that the flow direction of the exhaust gas in the main catalyst is along the up-down direction.

According to this arrangement, the length in the front-rear direction of the catalyst portion is shorter than the length in the up-down direction of the catalyst portion. This makes it easy to secure a space in front of the engine main body, where the catalyst portion is provided. Furthermore, increase in size of the straddled vehicle in the front-rear direction can be restrained even when the main catalyst is increased in size.

(19) According to an aspect of the present teaching, the straddled vehicle of the present teaching preferably includes the following arrangement, in addition to the arrangement (18). The engine main body includes a crankshaft having a central axis which is along the left-right direction. When viewed in the left-right direction, at least part of the catalyst portion is provided forward of a linear line in the front-rear direction, the linear line being orthogonal to the at least one central axis of the at least one cylinder hole and passing through the central axis of the crankshaft.

According to this arrangement, the engine main body includes a crankshaft. The crankshaft has a central axis which is along the left-right direction. A linear line that is orthogonal to each central axis of at least one cylinder hole and passes through the central axis of the crankshaft when viewed in the left or right direction is defined as a linear line L2. When viewed in the left or right direction, at least part of the catalyst portion is provided forward of the linear line L2. On this account, the path length from the combustion chamber to the catalyst portion is short as compared to cases where the entirety of the catalyst portion is provided rearward of the linear line L2 when viewed in the left or right direction. On this account, the temperature of exhaust gas flowing into the main catalyst is even higher. Thus, at the cold start of the engine unit, the time required for activation of the main catalyst in an inactive state is shortened. On this account, the exhaust gas purification performance of the main catalyst is further improved.

(20) According to an aspect of the present teaching, the straddled vehicle of the present teaching preferably includes the following arrangement, in addition to the arrangement (18). The upstream exhaust passage member includes a scroll exhaust passage member which entirely surrounds the outer circumference of the turbine wheel. When viewed in the left or right direction, at least part of the catalyst portion is lined up with at least part of the scroll exhaust passage member in the up-down direction, and is provided straight below the scroll exhaust passage member.

(21) According to an aspect of the present teaching, the straddled vehicle of the present teaching preferably includes the following arrangement, in addition to the arrangement (19). The upstream exhaust passage member includes a scroll exhaust passage member which entirely surrounds the outer circumference of the turbine wheel. When viewed in the left or right direction, at least part of the catalyst portion is lined up with at least part of the scroll exhaust passage member in the up-down direction, and is provided straight below the scroll exhaust passage member.

This arrangement makes it possible to shorten, in the front-rear direction, the space in which the catalyst portion and the turbocharger are provided. On this account, increase in size of the straddled vehicle in the front-rear direction can be restrained even when the main catalyst is increased in size.

(22) According to an aspect of the present teaching, the straddled vehicle of the present teaching preferably includes the following arrangement, in addition to any one of the arrangements (1) to (16). At least part of the catalyst portion and at least part of the waste gate valve actuator do not overlap the front wheel unit when viewed in the front-rear direction.

If the catalyst portion, the turbocharger, and the waste gate valve actuator are provided in a concentrated manner in order to suppress upsizing of the straddled vehicle, there is concern over the decrease in durability of components due to heat. In some cases, increase in size of the vehicle is required to avoid the decrease in durability of components due to heat. In this regard, because at least part of the catalyst portion and at least part of the waste gate valve actuator do not overlap the front wheel unit when viewed in the front-rear direction, the decrease in durability of components due to heat is avoidable. It is therefore possible to provide the catalyst portion at a position where increase in size of the straddled vehicle in the up-down direction is restrained, even when the size of the main catalyst is increased. As a result, it is possible to further suppress the increase in size of the straddled vehicle and at the same time to further improve the exhaust gas purification performance.

(23) According to an aspect of the present teaching, the straddled vehicle of the present teaching preferably includes the following arrangement, in addition to any one of the arrangements (1) to (16). A distance in the left-right direction between the center in the left-right direction of the straddled vehicle and the turbine wheel is shorter than a distance in the left-right direction between the center in the left-right direction of the straddled vehicle and the compressor wheel.

The distance in the left-right direction between the center in the left-right direction of the straddled vehicle and the turbine wheel is defined as a distance D1. Further, the distance in the left-right direction between the center in the left-right direction of the straddled vehicle and the compressor wheel is defined as a distance D2. The distance D1 is shorter than the distance D2. In other words, the turbine wheel is closer to the center in the left-right direction of the straddled vehicle than the compressor wheel is to the center. At least one exhaust port connected to the upstream exhaust passage member is formed in the outer surface of the engine main body. The center in the left-right direction of the region where all of the at least one exhaust ports are provided is close to the center in the left-right direction of the straddled vehicle. Because the turbine wheel is provided at a position close to the center in the left-right direction of the straddled vehicle, the path length from the upstream end of the upstream exhaust passage member to the turbine wheel is further shortened. It is therefore possible to shorten the path length from the combustion chamber to the catalyst portion. On this account, the temperature of exhaust gas flowing into the main catalyst is higher. Thus, at the cold start of the engine unit, the time required for activation of the main catalyst in an inactive state is shortened. On this account, the exhaust gas purification performance of the main catalyst is further improved.

(24) According to an aspect of the present teaching, the straddled vehicle of the present teaching preferably includes the following arrangement, in addition to any one of the arrangements (1) to (16). The engine main body includes a crankshaft having a central axis which is along the left-right direction. The upstream exhaust passage member includes a scroll exhaust passage member which entirely surrounds the outer circumference of the turbine wheel. When viewed in the left-right direction, at least part of the scroll exhaust passage member is provided forward of a linear line in the front-rear direction, the linear line being orthogonal to the at least one central axis of the at least one cylinder hole and passing through the central axis of the crankshaft.

According to this arrangement, the engine main body includes a crankshaft. The crankshaft has a central axis which is along the left-right direction. A linear line that is orthogonal to each central axis of at least one cylinder hole and passes through the central axis of the crankshaft when viewed in the left or right direction is defined as a linear line L2. When viewed in the left or right direction, at least part of the scroll exhaust passage member is provided forward of the linear line L2. On this account, the path length from the upstream end of the upstream exhaust passage member to the turbine wheel is short as compared to cases where the entirety of the scroll exhaust passage member is provided rearward of the linear line L2 when viewed in the left or right direction. As a result, the path length of a part of the upstream exhaust passage member, which is downstream of the turbine wheel, is long. Due to this, it is possible to further improve the degree of freedom in layout of the catalyst portion. It is therefore possible to provide the catalyst portion at a position where increase in size of the straddled vehicle in the up-down direction is restrained, even when the size of the main catalyst is increased. As a result, it is possible to further suppress the increase in size of the straddled vehicle and at the same time to further improve the exhaust gas purification performance.

(25) According to an aspect of the present teaching, the straddled vehicle of the present teaching preferably includes the following arrangement, in addition to any one of the arrangements (1) to (16). The catalyst portion is provided below the turbine wheel in an up-down direction of the vehicle.

According to this arrangement, the degree of freedom in layout of the catalyst portion is high as compared to cases where at least part of the catalyst portion is provided above the lowermost end of the turbine wheel. It is therefore possible to provide the catalyst portion at a position where increase in size of the straddled vehicle in the up-down direction is restrained, even when the size of the main catalyst is increased. As a result, it is possible to further suppress the increase in size of the straddled vehicle and at the same time to further improve the exhaust gas purification performance.

(26) According to an aspect of the present teaching, the straddled vehicle of the present teaching preferably includes the following arrangement, in addition to any one of the arrangements (1) to (16).

The catalyst portion is provided so that the flow direction of the exhaust gas in the main catalyst is along the horizontal direction.

According to this arrangement, the length in the up-down direction of the catalyst portion is shorter than the length in the front-rear direction of the catalyst portion. This makes it easy to secure a space straight below the engine main body, where the catalyst portion is provided. Furthermore, increase in size of the straddled vehicle in the up-down direction can be further restrained even when the main catalyst is increased in size.

(27) According to an aspect of the present teaching, the straddled vehicle of the present teaching preferably includes the following arrangement, in addition to the arrangement (26). The engine main body includes a crankshaft having a central axis which is along the left-right direction. When viewed in the left or right direction, at least part of the catalyst portion is provided rearward of a linear line in the front-rear direction, the linear line being orthogonal to each central axis of the at least one cylinder hole and passing the central axis of the crankshaft.

According to this arrangement, the engine main body includes a crankshaft. The crankshaft has a central axis which is along the left-right direction. A linear line that is orthogonal to each central axis of at least one cylinder hole and passes through the central axis of the crankshaft when viewed in the left or right direction is defined as a linear line L2. When viewed in the left or right direction, at least part of the catalyst portion is provided rearward of the linear line L2. Furthermore, the catalyst portion is provided so that the flow direction of the exhaust gas in the main catalyst is along the horizontal direction. Assume that the entirety of such a catalyst portion is provided forward of the linear line L2 when viewed in the left or right direction. In such a case, the front-most end of the catalyst portion may be significantly forward of the front-most end of the engine main body. To secure a sufficient distance between the front wheel unit and the catalyst portion, it is necessary to increase the size of the straddled vehicle in the front-rear direction. It is therefore possible to restrain increase in size of the straddled vehicle in the front-rear direction by providing at least part of the catalyst portion at a position rearward of the linear line L2 when viewed in the left or right direction.

(27) According to an aspect of the present teaching, the straddled vehicle of the present teaching preferably includes the following arrangement, in addition to any one of the arrangements (1) to (27). The engine unit includes a fuel injector configured to inject fuel to the combustion chamber.

With this arrangement, the temperature of the combustion chamber is lowered by heat of evaporation of the fuel. As a result, knocking is unlikely to occur even if the compression ratio is increased. It is therefore possible to increase the compression ratio. As the compression ratio is increased, the fuel consumption can be improved.

(28) According to an aspect of the present teaching, the straddled vehicle of the present teaching preferably includes the following arrangement, in addition to any one of the arrangements (1) to (27). The number of the combustion chambers is more than one. The engine unit includes independent exhaust passage members connected to the respective combustion chambers of the engine main body, an upstream collective exhaust passage member which is connected to the downstream ends of the independent exhaust passage members and the upstream end of the catalyst portion, constitutes at least part of the upstream exhaust passage member, and gathers exhaust gas exhausted from the independent exhaust passage members, and an exhaust gas cooling passage member in which coolant for cooling the exhaust gas flows, at least part of the exhaust gas cooling passage member being provided at the outer circumference of at least part of the upstream collective exhaust passage member.

According to this arrangement, the engine unit includes the independent exhaust passage members, the upstream collective exhaust passage member, and the exhaust gas cooling passage member. The independent exhaust passage members are connected to the respective combustion chambers of the engine main body. The upstream collective exhaust passage member is connected to the downstream ends of the independent exhaust passage members and the upstream end of the catalyst portion. The upstream collective exhaust passage member gathers (merges) the exhaust gas discharged from the independent exhaust passage members. The upstream collective exhaust passage member constitutes at least part of the above-described upstream exhaust passage member. Each independent exhaust passage member may be only partially provided inside the engine main body. In this case, the upstream exhaust passage member is constituted by the remaining parts of the independent exhaust passage members and the entire upstream collective exhaust passage member. Each independent exhaust passage member may be entirely provided inside the engine main body. In this case, part of the upstream collective exhaust passage member is provided inside the engine main body and the remaining part of the upstream collective exhaust passage member is provided outside the engine main body.

At least part of the exhaust gas cooling passage member is provided at the outer circumference of at least part of the upstream collective exhaust passage member. A coolant for cooling exhaust gas flows in the exhaust gas cooling passage member. On this account, the temperature of exhaust gas flowing into the catalyst portion is lowered. The temperature of exhaust gas flowing into the catalyst portion does not become excessively high, even when the catalyst portion is provided at a location close to the combustion chamber. The deterioration of the main catalyst due to excessive heating is prevented. On this account, the exhaust gas purification performance of the main catalyst is further improved.

At least part of the exhaust gas cooling passage member is provided at the outer circumference of at least part of the upstream collective exhaust passage member. With this, the exhaust gas cooling passage member is downsized as compared to cases where the exhaust gas cooling passage member is provided not at the outer circumference of the upstream collective exhaust passage member but at the outer circumference of each of the independent exhaust passage members. On this account, increase in size of the straddled vehicle in the up-down direction and the front-rear direction can be restrained.

(29) According to an aspect of the present teaching, the straddled vehicle of the present teaching preferably includes the following arrangement, in addition to any one of the arrangements (1) to (28). The number of the combustion chambers is more than one. The upstream exhaust passage member includes a plurality of external independent exhaust passage members connected to the engine main body and an external upstream collective exhaust passage member in which the turbine wheel is provided, which is connected to the downstream ends of the external independent exhaust passage members and the upstream end of the catalyst portion, and gathers (merges) the exhaust gas exhausted from the external independent exhaust passage members.

According to this arrangement, the upstream exhaust passage member includes the external independent exhaust passage members and the external upstream collective exhaust passage member. The external independent exhaust passage members are connected to the engine main body. The turbine wheel is provided in the external upstream collective exhaust passage member. The external upstream collective exhaust passage member is connected to the downstream ends of the external independent exhaust passage members and the upstream end of the catalyst portion. The external upstream collective exhaust passage member gathers (merges) the exhaust gas discharged from the external independent exhaust passage members. The passage member by which the exhaust gas exhausted from the combustion chambers is gathered (merged) is therefore not provided inside the engine main body. Assume that the passage member by which the exhaust gas exhausted from the combustion chambers is gathered (merged) is provided inside the engine main body. In this case, pressure of exhaust gas exhausted from one combustion chamber may obstruct the exhaust of exhaust gas from another combustion chamber. The flow rate and pressure of the exhaust gas may therefore be decreased. This causes decrease in an engine output. When the flow rate and pressure of exhaust gas decrease, the rotation speed of the turbine wheel decreases. As a result, the intake efficiency becomes lower. The decrease in intake efficiency results in deterioration in fuel consumption and further decrease in engine output. Because the upstream exhaust passage member includes the plurality of external independent exhaust passage members and the external upstream collective exhaust passage member, the decrease in output and the deterioration in fuel consumption can be prevented.

(30) According to an aspect of the present teaching, the straddled vehicle of the present teaching preferably includes the following arrangement, in addition to any one of the arrangements (1) to (29). The number of the combustion chambers is more than one. The engine main body includes a plurality of internal independent exhaust passage members connected to the respective combustion chambers and an internal collective exhaust passage member which is connected to the downstream ends of the internal independent exhaust passage members and the upstream end of the upstream exhaust passage member and gathers (merges) exhaust gas exhausted from the internal independent exhaust passage members.

According to this arrangement, the engine main body includes the combustion chambers, the internal independent exhaust passage members, and the internal collective exhaust passage member. The internal independent exhaust passage members are connected to the respective combustion chambers. The internal collective exhaust passage member is connected to the downstream ends of the internal independent exhaust passage members and the upstream end of the upstream exhaust passage member. The internal collective exhaust passage member gathers (merges) the exhaust gas exhausted from the internal independent exhaust passage members. According to this arrangement, as compared to cases where the internal collective exhaust passage member is not provided, the path length of a passage member in which only exhaust gas exhausted from one combustion chamber passes is shortened. It is therefore possible to decrease the surface area of the inner surface of the passage member from the combustion chambers to the catalyst portion. It is therefore possible to decrease the thermal capacity of the passage member from the combustion chambers to the catalyst portion. On this account, as compared to cases where the internal collective exhaust passage member is not provided, the temperature of exhaust gas flowing into the catalyst portion is high. Thus, at the cold start of the engine unit, the time required for activation of the main catalyst in an inactive state is shortened. The exhaust gas purification performance of the main catalyst is therefore improved.

(31) According to an aspect of the present teaching, the straddled vehicle of the present teaching preferably includes the following arrangement, in addition to any one of the arrangements (1) to (30). When viewed in the left or right direction, the turbine wheel does not overlap the vehicle body frame.

If at least part of the turbine wheel overlaps the vehicle body frame when viewed in the left or right direction, the position of the turbocharger is higher. When the position of the turbocharger is high, the straddled vehicle is increased in size in the up-down direction in order to secure a space where the turbocharger is provided. It is therefore possible to restrain increase in size of the straddled vehicle in the up-down direction by arranging the turbine wheel not to overlap the vehicle body frame when viewed in the left or right direction.

<Definition of Main Catalyst>

In the present teaching, an expression "a main catalyst which purifies exhaust gas exhausted from at least one combustion chamber most in at least one exhaust passage" means as follows. When the number of catalysts provided in the at least one exhaust passage is only one, that catalyst is the main catalyst. When the number of catalysts provided in the at least one exhaust passage is more than one, the catalyst which purifies the exhaust gas most among the catalysts is the main catalyst. The phrase "purifies the exhaust gas most"

indicates that the contribution to purification of the exhaust gas is the highest. The catalyst whose contribution to purification of the exhaust gas is the highest does not always have the highest purification capability among the catalysts.

In the present teaching, "the flow direction of exhaust gas in the main catalyst" indicates the direction of the central axis of the main catalyst.

<Definition of Cross-Sectional Area of Path of Bypass Exhaust Passage Member>

In the present teaching, "cross-sectional area of the path of a bypass exhaust passage member" indicates the cross-sectional area of the internal space of the bypass exhaust passage member, which is cut along the direction orthogonal to the flow direction of exhaust gas.

<Definition of Vehicle Body Frame>

In the present teaching, a vehicle body frame is a member which mainly receives stress in the vehicle. The vehicle body frame may be a frame formed by combining a plurality of components, or may be an integrally-molded frame. The vehicle body frame may have a monocoque structure such that the frame is formed by appearance components of the vehicle or a semi-monocoque structure such that a part of the structure functions as an appearance component of the vehicle. The vehicle body frame may be made of metal such as aluminum and iron, resin such as CFRP, or a combination of these materials.

<Definition of Rod>

In the present teaching, a rod is an elongated member. The shape of the rod in cross section orthogonal to the longitudinal direction is not limited to any particular shape. The cross-sectional shape may be circular, rectangular, or polygonal. The rod may be hollow or solid.

In the present teaching, when a rod of a waste gate valve actuator is connected to a waste gate valve, the rod is directly or indirectly connected to the waste gate valve.

<Definition of Front Wheel Unit and Rear Wheel Unit>

The front wheel unit in the present teaching may be composed of only one front wheel or may include a plurality of front wheels. The rear wheel unit in the present teaching may be composed of only one rear wheel or may include a plurality of rear wheels.

In the present teaching, the front wheel includes a tire and a wheel main body that holds the tire. The same definition applies to the rear wheels.

<Other Definitions of Terms>

In the present teaching, an up-down direction of a vehicle is an up-down direction when the straddled vehicle vertically stands up on a horizontal road surface. A left-right direction of a vehicle and a front-rear direction of a vehicle are directions viewed by a rider seated on the straddled vehicle.

A passage member in the present teaching indicates members such as wall members which encompass a path to form the path. The path indicates a space where an object passes. An intake passage member indicates walls or the like which form an intake path by surrounding the intake path. The intake path indicates a space where air supplied to a combustion chamber passes. The exhaust passage member indicates walls or the like which form an exhaust path by surrounding the exhaust path. The exhaust path indicates a space through which exhaust gas passes.

In this specification, the path length of a part of an exhaust path indicates the length of a line passing the center of the exhaust path.

In the present teaching, an end portion of a member indicates a portion constituted by an end and its surroundings of the member.

In this specification, unless otherwise specified, an inclination angle of a linear line A with respect to a linear line B indicates a smaller one of the angles formed by the linear line A and the linear line B. This applies not only to the linear lines but also to directions.

In this specification, unless otherwise specified, an angle between a linear line A and a linear line B indicates a smaller one of the angles formed by the linear line A and the linear line B. This applies not only to the linear lines but also to directions.

In the present teaching and the specification, a linear line along the A direction is not limited to a linear line in parallel to the A direction. Unless otherwise specified, the linear line along the A direction includes a linear line which intersects with the A direction at an angle which falls within the range from −45 degrees to 45 degrees. The same definition applies to other expressions using "along". The other expressions using "along" are, for example, "direction along the A direction", "plural B are lined up along the A direction", and "a single B is provided along the A direction". The direction A does not indicate any specific direction. The direction A may be the horizontal direction or the front-rear direction.

In the present teaching and the specification, an expression "entities A and B are lined up in an X direction" indicates the following state. Even when the entities A and B are viewed in any direction orthogonal to the X direction, a linear line or a curved line indicating the X direction passes both the entities A and B. When the entirety of an entity A is lined up with an entity B in the X direction, the entirety of the entity A opposes the entity B in the X direction. In other words, the entirety of the entity A overlaps the entity B when viewed in the X direction. The term "entirety" may be replaced with a term "part".

In the present teaching and the specification, an expression "entities A and B are lined up in an X direction when viewed in a Y direction" indicates the following state. When the entities A and B are viewed in the Y direction, a linear line or a curved line indicating the X direction passes both of the entities A and B. When the entities A and B are viewed in a direction different from the Y direction, the entities A and B may not be lined up in the X direction. When the entirety of an entity A is lined up with an entity B in a X direction when viewed in a Y direction, the entirety of the entity A opposes the entity B in the X direction when viewed in the Y direction. The term "entirety" may be replaced with a term "part".

In these two definitions, the entities A and B may be in contact with each other. The entities A and B may not be in contact with each other. An entity C may be provided between the entities A and B.

In the present teaching and the specification, an expression "an entity A is provided forward of an entity B" indicates the following state, unless otherwise specified. The entity A is provided in front of a plane which passes the front-most end of the entity B and is orthogonal to the front-rear direction. In this connection, the entities A and B may or may not be lined up in the front-rear direction. When the entity B is a plane or a linear line orthogonal to the front-rear direction, a plane passing the front-most end of the entity B is a plane passing the entity B. When the entity B is a linear line or a plane with an infinite length in the front-rear direction, the front-most end of the entity B is not specified. A linear line or a plane with an infinite length in the front-rear direction is not limited to a linear line or a plane parallel to the front-rear direction.

The same applies to an expression "an entity A is provided rearward of an entity B" in the same condition with regard to the entity B. Furthermore, the same applies to expressions "an entity A is provided above or below an entity B", and "an entity A is provided rightward of or leftward of an entity B" in the same condition with regard to the entity B.

In the present teaching and the specification, when an entity B is a plane with an infinite length in the front-rear direction, an expression "an entity A is provided forward of the entity B" indicates the following state. Among two spaces partitioned by the entity B, the entity A exists in the front one of the spaces.

The same applies to an expression "an entity A is provided rearward of an entity B" in the same condition with regard to the entity B. Furthermore, the same applies to expressions "an entity A is provided above or below an entity B", and "an entity A is provided rightward of or leftward of an entity B" in the same condition with regard to the entity B.

In the present teaching and the specification, when an entity B is a linear line with an infinite length in the front-rear direction when viewed in a X direction different from the front-rear direction, an expression "an entity A is provided forward of the entity B when viewed in the X direction" indicates the following state. Among two areas partitioned by the entity B, the entity A exists in the front one of the areas when viewed in the X direction. The entity B may be a plane in three dimensions, as long as the entity B is a linear line when viewed in the X direction.

The same applies to an expression "an entity A is provided rearward of an entity B" in the same condition with regard to the entity B. Furthermore, the same applies to expressions "an entity A is provided above or below an entity B", and "an entity A is provided rightward of or leftward of an entity B" when viewed in a particular direction, in the same condition with regard to the entity B and the viewing direction.

In the present teaching and the specification, an expression "an entity A is provided in front of an entity B" indicates the following state, unless otherwise specified. At least part of a rear surface of the entity A opposes at least part of a front surface of the entity B in the front-rear direction. Furthermore, the front-most end of the entity B is rearward of the front-most end of the entity A and the rear-most end of the entity B is forward of the rear-most end of the entity A. The rear surface of the entity A is a surface which is viewable when the entity A is viewed from the rear side. The rear surface of the entity A may be a single continuous surface or may be formed of plural non-continuous surfaces. The definition of the front surface of the entity B is similar to this.

The same applies to expressions "an entity A is provided behind an entity B", "an entity A is provided straight above or below an entity B", and "an entity A is provided to the right of or to the left of an entity B".

In the present teaching and the specification, an expression "an entity A is in front of an entity B when viewed in an X direction different from the front-rear direction" indicates the following state, unless otherwise specified. When viewed in the X direction, at least part of the rear end of the entity A opposes at least part of the front end of the entity B in the front-rear direction. Furthermore, the front-most end of the entity B is rearward of the front-most end of the entity A and the rear-most end of the entity B is forward of the rear-most end of the entity A. When the entities A and B are viewed in a Y direction different from the X direction, at least part of the rear end of the entity A may not oppose at least part of the front end of the entity B in the front-rear direction.

This applies to expressions "an entity A is provided behind an entity B when viewed in a particular direction", "an entity A is provided straight above or below an entity B when viewed in a particular direction", and "an entity A is provided to the right of or to the left of an entity B when viewed in a particular direction".

In the present teaching and the specification, an expression "an entity A is provided between entities B and C" indicates the following state, unless otherwise specified. A linear line passes the entities B, A, and C in this order. In other words, the entities B, A, and C are lined up in this order in the direction of a linear line.

In the present teaching, terms "including", "comprising", "having", and derivatives thereof are used to encompass not only listed items and equivalents thereof but also additional items.

In the present teaching, the terms "mounted", "connected", "coupled", and "supported" are used in broad sense. To be more specific, the terms encompass not only directly mounting, connection, coupling, and supporting but also indirect mounting, connection, coupling, and supporting. Furthermore, the terms "connected" and "coupled" do not merely indicate physical or mechanical connection and coupling. These terms encompass direct or indirect electric connection and coupling.

Unless otherwise defined, all terms (technical and scientific terms) used in this specification indicate meanings typically understood by a person with ordinary skill in the art in the technical field to which the present teaching belongs.

Terms defined in typical dictionaries indicate meanings used in related technologies and in the context of the present disclosure. The terms are not interpreted ideally or excessively formally.

In this specification, the term "preferable" is non-exclusive. The term "preferable" means "preferable but not limited to". In this specification, an arrangement which is "preferable" exerts at least the above-described effects of the arrangement (1) above. In this specification, the term "may" is non-exclusive. The term "may" indicate "may but not must". In this specification, an arrangement which is explained by using the term "may" exerts at least the above-described effects of the arrangement (1) above.

In the claims, when the number of a constituent feature is not clearly specified and the constituent feature is expressed in a singular form in English, the number of the constituent feature may be more than one in the present teaching. In the present teaching, the number of the constituent features may be only one.

In the present teaching, the preferred arrangements of the different aspects described above may be variously combined. Before an embodiment of the present teaching is detailed, it is informed that the present teaching is not limited to the configurations and layout of elements described below and/or shown in drawings. The present teaching may be implemented as an embodiment other than the below-described embodiment. The present teaching may be implemented as an embodiment which is a modification of the below-described embodiment. Furthermore, the present teaching may be implemented by suitably combining below-described modifications.

Advantageous Effects

In the straddled vehicle of the present teaching, the exhaust gas purification performance is further improved while increase in size of the straddled vehicle is suppressed, even when a turbocharger is provided.

DETAILED DESCRIPTION

Embodiment of Present Teaching

Figure 1B:
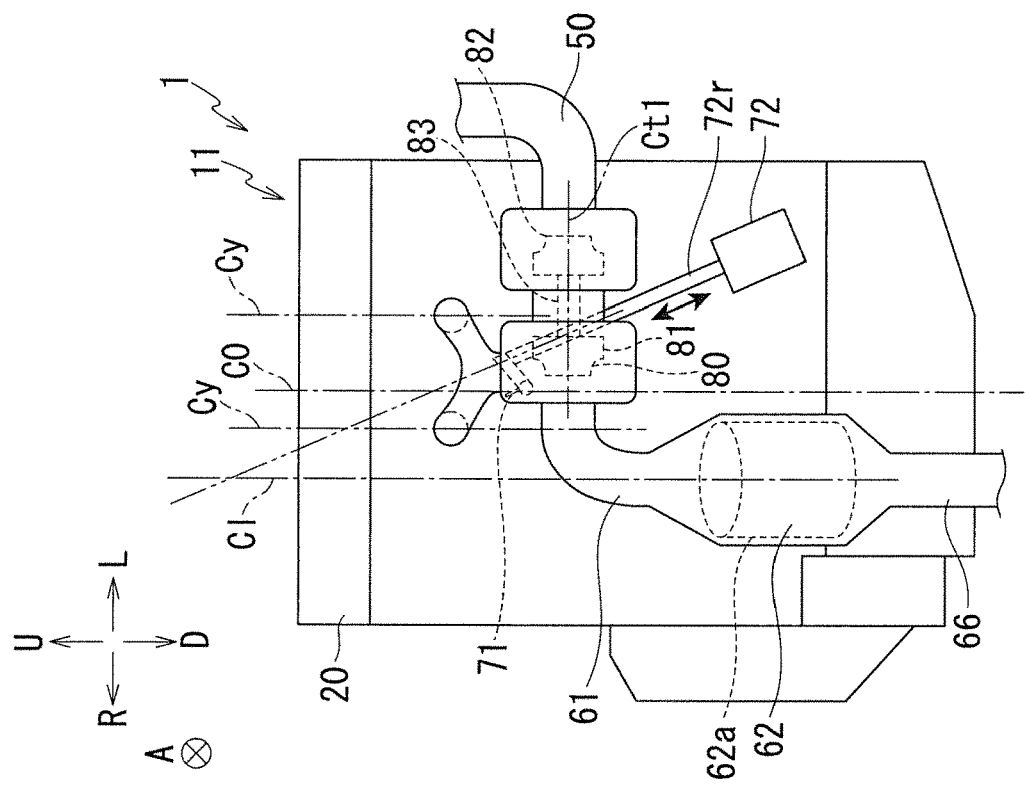
FIG. 1B shows the engine unit which is viewed in an A direction in FIG. 1A.
Figure 1A:
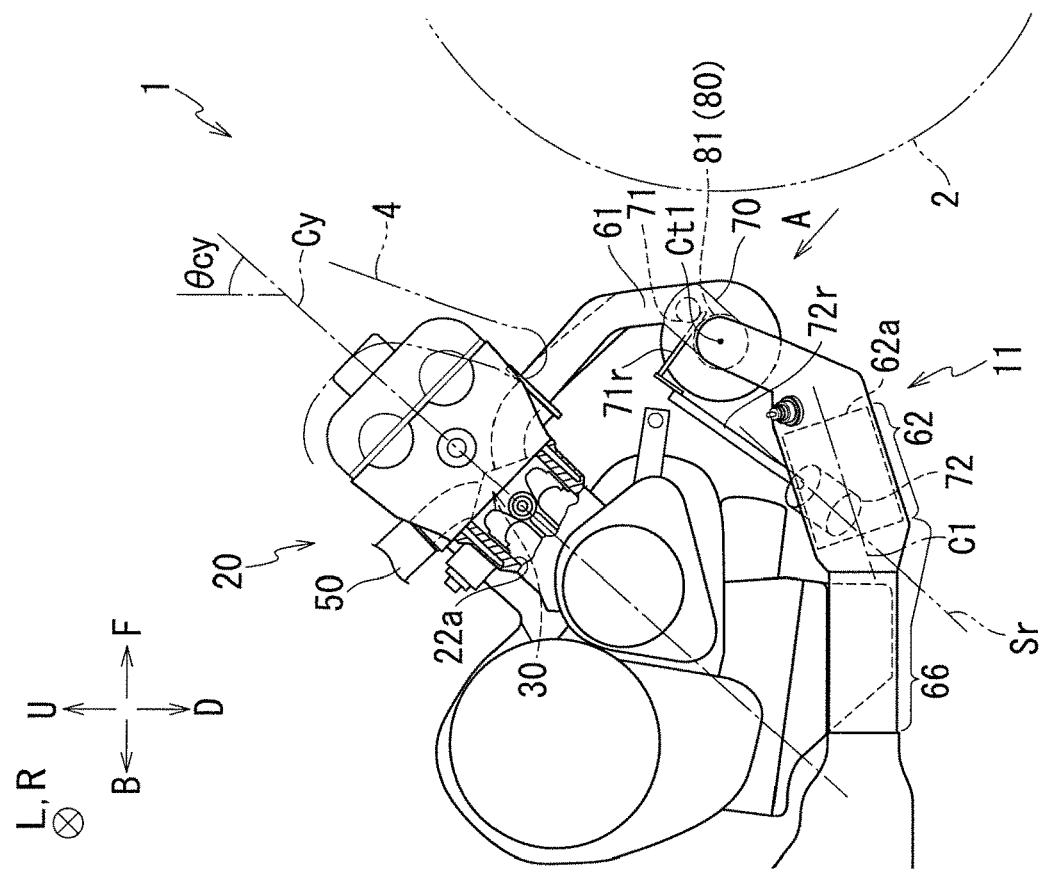
FIG. 1A is a right side view of a part of an engine unit of a motorcycle of an embodiment of the present teaching.

The following will describe an embodiment of the present teaching with reference to FIG. 1A and FIG. 1B. The present embodiment is an example of applying the present teaching to a motorcycle. In the following description, a front-rear direction, a left-right direction, and an up-down direction are a front-rear direction of a vehicle, a left-right direction of a vehicle, and a up-down direction of a vehicle, respectively. Furthermore, in each figure, arrows F, B, U, D, L, and R indicate forward, rearward, upward, downward, leftward, and rightward, respectively.

As shown in FIG. 1A, a straddled vehicle 1 includes a vehicle body frame 4, an engine unit 11, a front wheel unit 2, and a rear wheel unit (not illustrated). The engine unit 11 is supported by the vehicle body frame 4. The front wheel unit 2 includes at least one front wheel. The front wheel unit 2 is provided in front of the engine unit 11 when viewed in the left or right direction. The rear wheel unit includes at least one rear wheel and is provided behind the engine unit 11 when viewed in the left or right direction.

Figure 20:
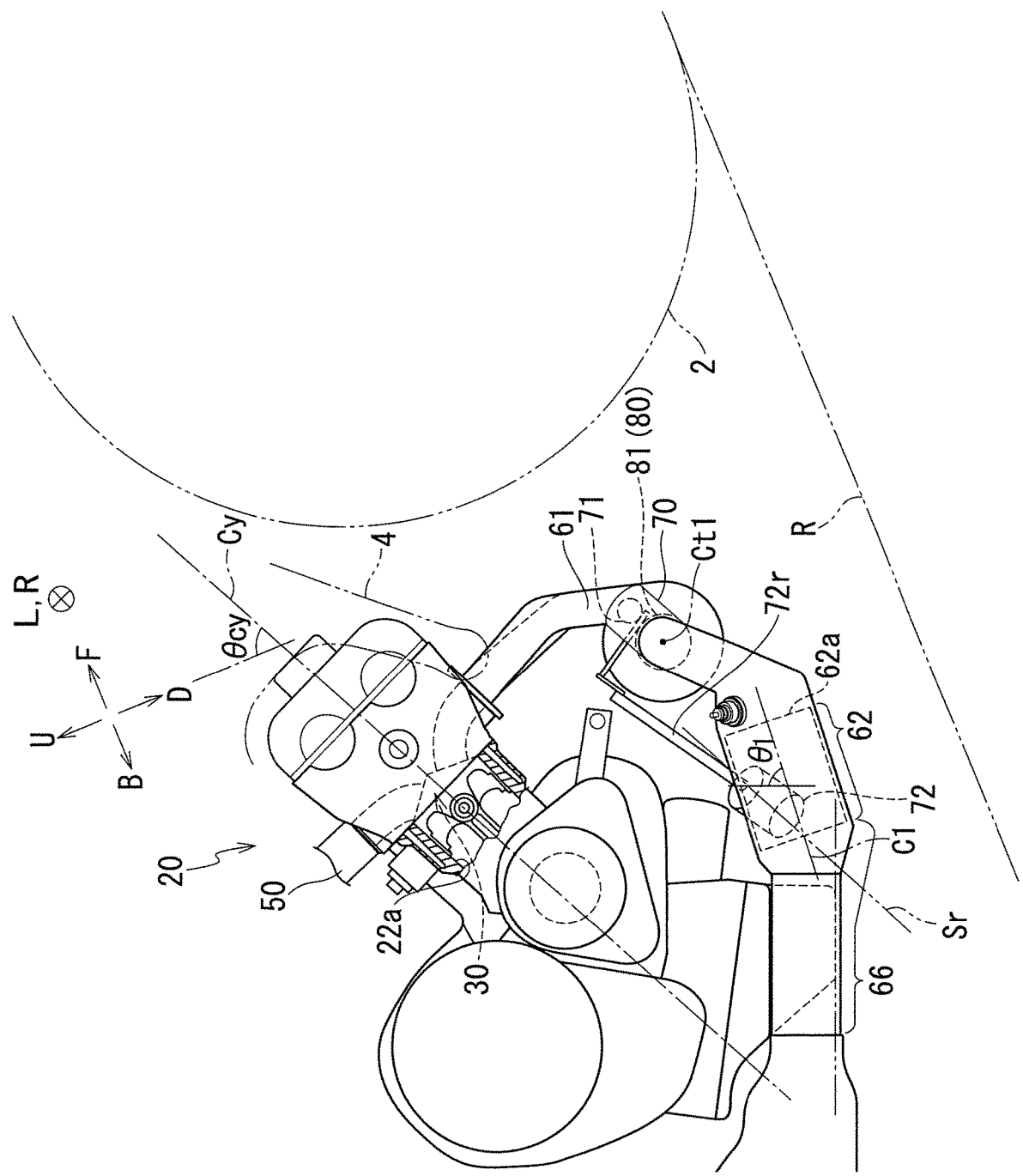
FIG. 20 is a right side view of a part of an engine unit according to another modification of the embodiment of the present teaching.

The engine unit 11 includes an engine main body 20, an intake passage member 50, an upstream exhaust passage member 61, and a downstream exhaust passage member 66. The engine main body 20 includes at least one combustion chamber 30. The engine main body 20 includes at least one cylinder hole 22a. The cylinder hole 22a forms part of the inner surface of the combustion chamber 30. In FIG. 1A, the angle θcy between the central axis Cy of the cylinder hole 22a and the up-down direction is equal to or smaller than 45 degrees. The direction of the central axis Cy of the cylinder hole 22a when viewed in the left or right direction is not limited to this. As shown in FIG. 20, the angle θcy between the central axis Cy of the cylinder hole 22a and the up-down direction may be equal to or larger than 45 degrees. The intake passage member 50 is connected to the engine main body 20. The intake passage member 50 includes an atmosphere suction port (see the atmosphere suction port 52a shown in FIG. 6) through which air is sucked from the atmosphere. Air supplied to the at least one combustion chamber 30 passes through the intake passage member 50. The upstream exhaust passage member 61 is connected to the engine main body 20. Exhaust gas exhausted from the at least one combustion chamber 30 passes through the upstream exhaust passage member 61. The downstream exhaust passage member 66 includes an atmosphere discharge port (see the atmosphere discharge port 67a shown in FIG. 6) from which the exhaust gas is discharged to the atmosphere.

The engine unit 11 includes a turbocharger 80, a bypass exhaust passage member 70, a waste gate valve 71, and a waste gate valve actuator 72. The arrow A in FIG. 1A shows a direction which is orthogonal to both the central axis Ct1 of a connecting shaft 83 of the turbocharger 80 and the cylinder axis Cy. FIG. 1B shows the engine unit 11 viewed in the A direction. As shown in FIG. 1B, the turbocharger 80 includes a turbine wheel 81 and a compressor wheel 82. The turbine wheel 81 is provided in the upstream exhaust passage member 61. The compressor wheel 82 is provided in the intake passage member 50. The compressor wheel 82 is connected to the turbine wheel 81 via the connecting shaft 83 having the central axis Ct1 which is along the left-right direction. In other words, the central rotation axes of the turbine wheel 81 and the compressor wheel 82 are along the left-right direction. The turbine wheel 81 is rotated by receiving exhaust gas. In accordance with the rotation of the turbine wheel 81, the compressor wheel 82 rotates. As a result, the compressor wheel 82 compresses air. The compressed air is supplied to the engine main body 20. The bypass exhaust passage member 70 is connected to the upstream exhaust passage member 61 so as to bypass the turbine wheel 81. The waste gate valve 71 is arranged to be able to change the cross-sectional area of the path of the bypass exhaust passage member 70. As the cross-sectional area of the path of the bypass exhaust passage member 70 is changed, the flow rate of the exhaust gas supplied to the turbine wheel 81 is adjusted. To put it differently, the waste gate valve 71 is arranged to be able to adjust the flow rate of the exhaust gas supplied to the turbine wheel 81. The waste gate valve actuator 72 includes a rod 72r which is directly or indirectly connected to the waste gate valve 71. As shown in FIG. 1A, the waste gate valve actuator 72 is arranged such that the rod 72r is able to reciprocate in a direction along a virtual plane Sr. The virtual plane Sr is a plane orthogonal to both the central axis Ct1 of the connecting shaft 83 of the turbocharger 80 and the central axis Cy of the cylinder hole 22a. The direction in which the rod 72r reciprocates is the longitudinal direction of the rod 72r. As the rod 72r reciprocates, the waste gate valve 71 is driven. In this way, the waste gate valve actuator 72 is arranged to be able to drive the waste gate valve 71.

As shown in FIG. 1A and FIG. 1B, the engine unit 11 includes a catalyst portion 62. The catalyst portion 62 is connected to the downstream end of the upstream exhaust passage member 61 and the upstream end of the downstream exhaust passage member 66. The catalyst portion 62 includes a main catalyst 62a. The main catalyst 62a is configured to purify the exhaust gas exhausted from the at least one combustion chamber 30 most in at least one exhaust path from the at least one combustion chamber 30 to the atmosphere discharge port (not illustrated).

As shown in FIG. 1A, the catalyst portion 62 is provided so that the main catalyst 62a is forward of the central axis Cy of the cylinder hole 22a when viewed in the left or right direction. Furthermore, as shown in FIG. 1A and FIG. 1B, the catalyst portion 62 is provided so that the flow direction of the exhaust gas in the main catalyst 62a is along a direction parallel to the central axis Cy of the cylinder hole 22a. The flow direction of the exhaust gas in the main catalyst 62a is identical with the direction of the central axis C1 of the main catalyst 62a. In the straddled vehicle 1, the percentage of the size of the engine main body 20 within the size of the entire vehicle is high. On this account, the catalyst portion 62 of the straddled vehicle 1 can be provided in the vicinity of the engine main body 20 by arranging the catalyst portion 62 as described above.

In addition, as shown in FIG. 1B, the flow direction of the exhaust gas in the main catalyst 62a intersects with the reciprocating direction of the rod 72r of the waste gate valve actuator 72 when viewed in the A direction orthogonal to both the central axis Ct1 of the connecting shaft 83 of the turbocharger 80 and the central axis Cy of the cylinder hole 22a. This arrangement allows the catalyst portion 62 and the waste gate valve actuator 72 to be remote from each other. Because the catalyst portion 62 is unlikely to interfere with the waste gate valve actuator 72, the degree of freedom in layout of the catalyst portion 62 is improved.

In addition, as shown in FIG. 1B, the catalyst portion 62 is provided so that the center C0 in the left-right direction of the straddled vehicle 1 is located between the main catalyst 62a and the waste gate valve actuator 72. In the straddled vehicle 1, the positions of components may be restricted due to weight unbalance of the vehicle in the left-right direction. In the present embodiment, the weight unbalance of the straddled vehicle 1 in the left-right direction can be restrained by adjusting the positional relation between the main catalyst 62a and the waste gate valve actuator 72.

Because the straddled vehicle 1 of the present embodiment has the arrangement above, the degree of freedom in layout of the catalyst portion 62 is improved. It is therefore possible to provide the catalyst portion 62 at a position where increase in size of the straddled vehicle 1 in the up-down direction is restrained, even when the size of the main catalyst 62a is increased. As a result, it is possible to further suppress the increase in size of the straddled vehicle 1 and at the same time to further improve the exhaust gas purification performance. In this way, it is possible to further suppress the increase in size of the straddled vehicle 1 and at the same time to further improve the exhaust gas purification performance, by setting the positional relation between the catalyst portion 62 and the engine main body 20, the positional relation between the catalyst portion 62 and the turbocharger 80, and the positional relation between the catalyst portion 62 and the waste gate valve actuator 72, in order to improve the degree of freedom in layout of the catalyst portion 62. To be more specific, as shown in FIG. 1A, when the angle θcy between the central axis Cy of the cylinder hole 22a and the up-down direction is equal to or smaller than 45 degrees, increase in distance between the engine main body 20 and the front wheel unit 2 is restrained even when the catalyst portion 62, the turbocharger 80, and the waste gate valve actuator 72 are provided between the engine main body 20 and the front wheel unit 2 when viewed in the left or right direction. It is therefore possible to further suppress the increase in size of the straddled vehicle 1 in the front-rear direction. Further, as shown in FIG. 21, when the angle θcy between the central axis Cy of the cylinder hole 22a and the up-down direction is equal to or larger than 45 degrees, increase in distance between the engine main body 20 and the road surface R is restrained even when the catalyst portion 62, the turbocharger 80, and the waste gate valve actuator 72 are provided between the engine main body 20 and the road surface R when viewed in the left or right direction. It is therefore possible to further suppress the increase in size of the straddled vehicle 1 in the up-down direction.

Specific Example 1 of Embodiment of Present Teaching

Specific Example 1 of the above-described embodiment of the present teaching will be described with reference to FIGS. 2 to 9. Basically, Specific Example 1 of the embodiment of the present teaching encompasses all features of the embodiment of the present teaching described above. Members identical with those in the above-described embodiment of the present teaching are not explained again. The following will describe arrangements which are different from those of the above-described embodiment of the present teaching.

<Overall Structure of Motorcycle>

Figure 2:
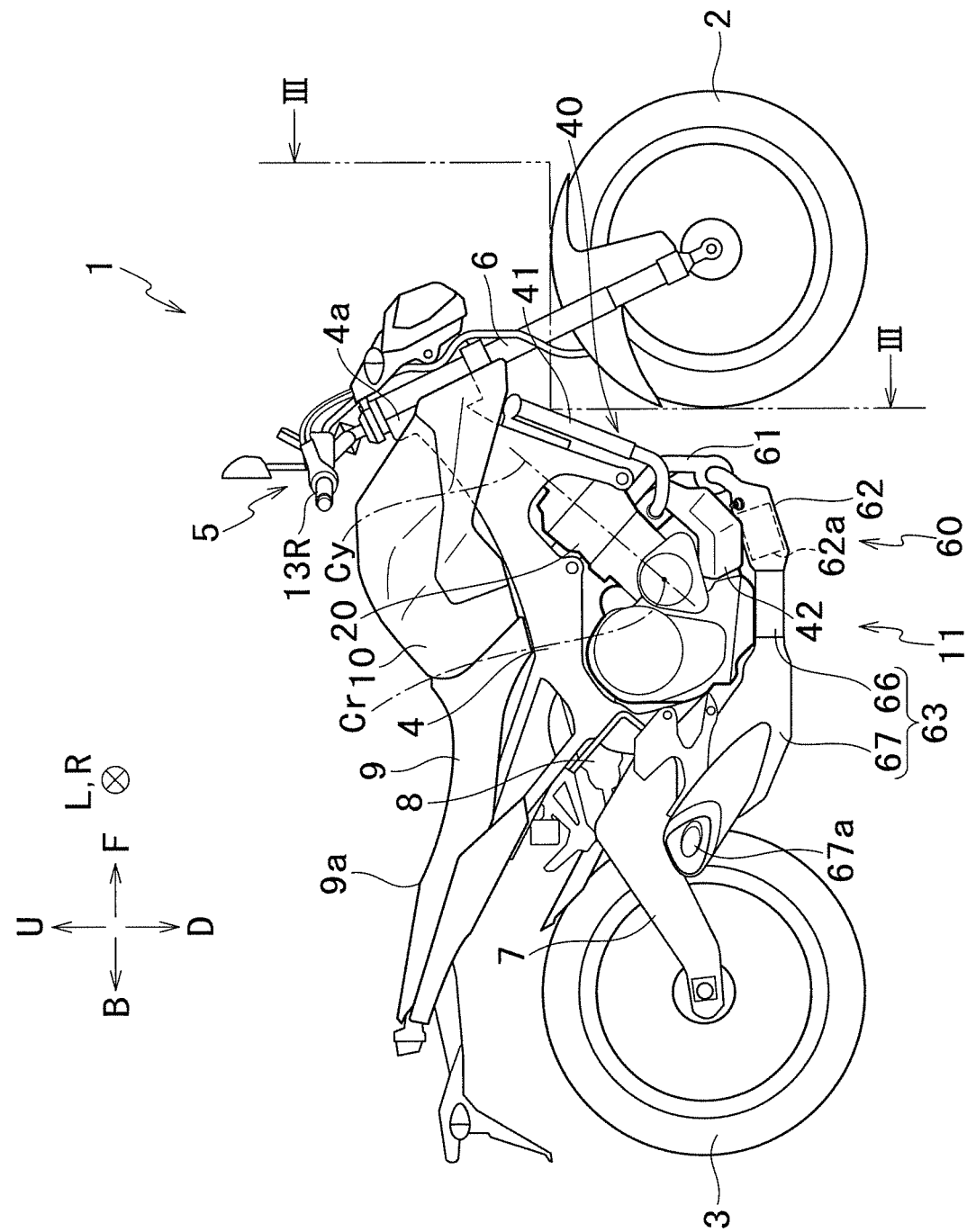
FIG. 2 is a right side view of a motorcycle of Specific Example 1 of the embodiment of the present teaching.

As shown in FIG. 2, the motorcycle 1 includes a front wheel unit 2, a rear wheel unit 3, and a vehicle body frame 4. The vehicle body frame 4 includes a head pipe 4a at a front portion. A steering shaft (not illustrated) is rotatably inserted through the head pipe 4a. The upper end portion of the steering shaft is connected to a handle unit 5. The upper end portions of a pair of front forks 6 are fixed to the handle unit 5. The lower end portions of the pair of front forks 6 support the front wheel unit 2. The front forks 6 are configured to be extendable to absorb impact in the up-down direction. The front wheel unit 2 is composed of one front wheel. The front wheel includes a tire and a wheel. The upper a part of the front wheel unit 2 is covered with a fender. The fender is not included in the front wheel unit 2.

Figure 3:
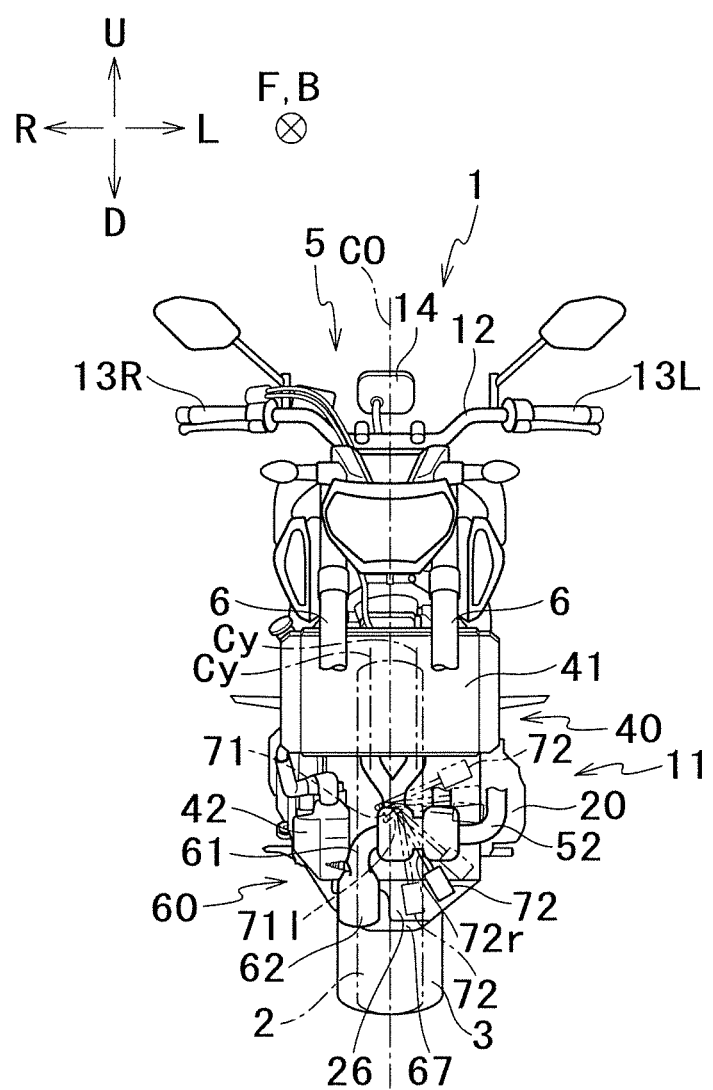
FIG. 3 is a cross section taken along a line in FIG. 2.

As shown in FIG. 3, the handle unit 5 includes one handlebar 12. Grips 13L and 13R are provided at the left end portion and the right end portion of the handlebar 12, respectively. The right grip 13R is an accelerator grip for adjusting the output of the engine.

As shown in FIG. 2, a pair of swing arms 7 is swingably supported by the vehicle body frame 4. The rear end portions of the pair of swing arms 7 support the rear wheel unit 3. The rear wheel unit 3 is composed of one rear wheel. The rear wheel includes a tire and a wheel. One end portion of a rear suspension 8 is attached to a position rearward of the swing center of each swing arm 7. The other end portion of the rear suspension 8 is attached to the vehicle body frame 4. The rear suspension 8 is configured to be extendable to absorb impact in the up-down direction.

Figure 4:
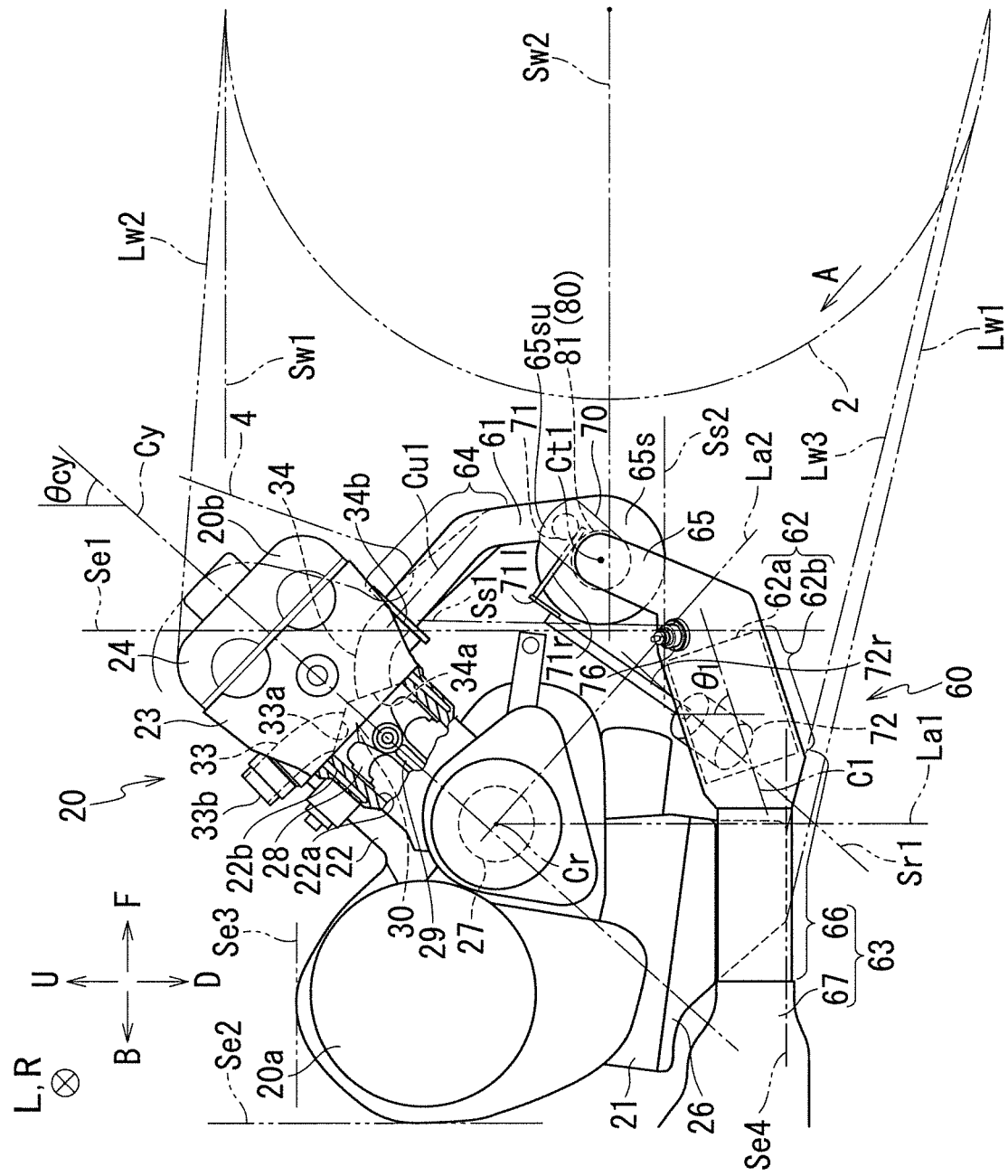
FIG. 4 is a right side view of a part of an engine unit of the motorcycle according to Specific Example 1 of the embodiment of the present teaching.

FIG. 2, FIG. 3, and FIG. 4 show a state in which the front forks 6 and the rear suspension 8 are maximally extended. In other words, these figures show a state in which the position of the vehicle body frame 4 is highest relative to the positions of the front wheel unit 2 and the rear wheel unit 3.

The vehicle body frame 4 supports a seat 9 and a fuel tank 10. The fuel tank 10 is in front of the seat 9. The vehicle body frame 4 supports the engine unit 11. The engine unit 11 may be directly or indirectly connected to the vehicle body frame 4. The engine unit 11 is provided straight below the fuel tank 10. An upper end 9a of the seat 9 is above the engine unit 11. The seat 9 is a part on which a rider (driver) sits, and does not include a part on which a rider's waist or back leans. The seat 9 does not include a part on which the tandem rider (passenger) sits. The engine unit 11 is provided behind the front wheel unit 2 when viewed in the left or right direction. The engine unit 11 is provided in front of the rear wheel unit 3 when viewed in the left or right direction. As shown in FIG. 3, the width in the left-right direction of the engine unit 11 is greater than the width in the left-right direction of the front wheel unit 2. The width in the left-right direction of the engine unit 11 is greater than the width in the left-right direction of the rear wheel unit 3. Here, the width in the left-right direction is the maximum length in the left-right direction. The vehicle body frame 4 supports a battery (not illustrated). The battery supplies electric power to electronic devices such as a controller (not illustrated) controlling the engine unit 11 and sensors.

<Overall Structure of Engine Unit>

Figure 6:
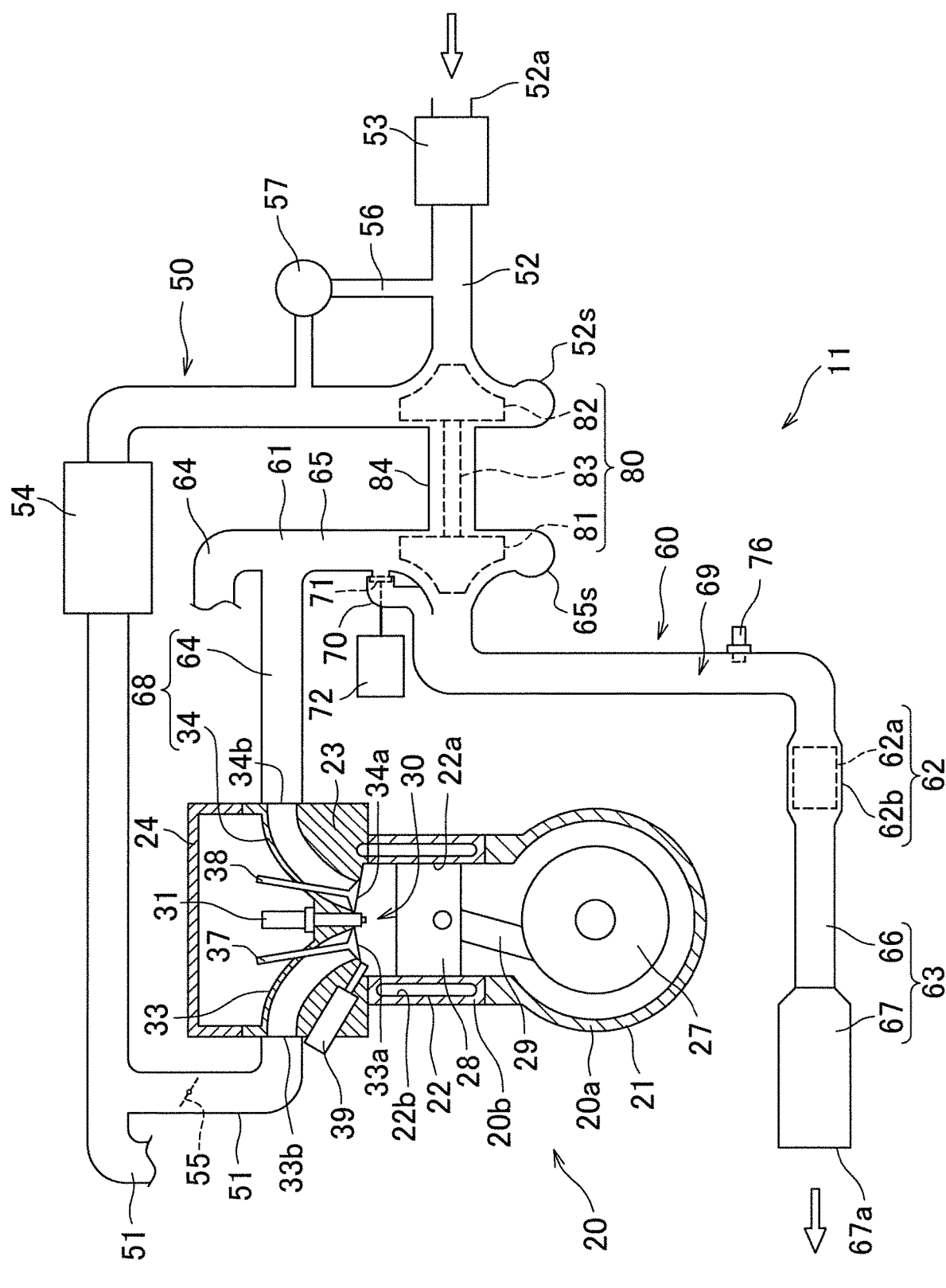
FIG. 6 is a schematic diagram of a part of the engine unit of the motorcycle according to Specific Example 1 of the embodiment of the present teaching.

As shown in FIG. 2, the engine unit 11 includes the engine main body 20, a water cooling device 40, an exhaust passage member 60, and the turbocharger 80. Further, as shown in FIG. 6, the engine unit 11 includes the intake passage member 50. The engine main body 20 is connected to the water cooling device 40, the intake passage member 50, and the exhaust passage member 60. The engine unit 11 is a two-cylinder engine including two cylinders. The engine unit 11 is a four-stroke type engine. The four-stroke type engine is an engine that repeats an intake process, a compression process, a combustion process (expansion stroke), and an exhaust process. The combustion process in the two-cylinder engine is performed at different timings in the respective two cylinders. In FIG. 6, only one of the two cylinders of the engine main body 20 is illustrated, and the remaining cylinder is omitted.

The engine unit 11 is a water-cooled engine. The engine main body 20 is configured to be cooled with coolant water. Hot coolant water, which has absorbed the heat of the engine main body 20, is sent to the water cooling device 40. The water cooling device 40 is configured to decrease the temperature of the coolant water supplied from the engine main body 20 and return it to the engine main body 20. The water cooling device 40 includes a radiator 41, a radiator fan (not illustrated), and a reserve tank 42. The radiator 41 is provided to oppose an upper portion of the front surface of the engine main body 20 in the front-rear direction. The radiator fan (not illustrated) is disposed between the engine main body 20 and the radiator 41. The reserve tank 42 is disposed to be lined up with a lower portion of the front surface of the engine main body 20 in the front-rear direction. The reserve tank 42 is disposed to be lined up with right portion of the front surface of the engine main body 20 in the front-rear direction. The reserve tank 42 may be disposed to oppose a left portion of the front surface of the engine main body 20 or a central portion in the left-right direction of the front surface of the engine main body 20, in the front-rear direction. The engine unit 11 includes a water pump (not illustrated) for circulating the coolant water. The water pump is provided inside the engine main body 20.

<Structure of Engine Main Body>

As shown in FIG. 4, the engine main body 20 includes a crankcase member 20a and a cylinder portion 20b. The crankcase member 20a is provided at a lower portion of the engine main body 20. The cylinder portion 20b is provided at an upper portion of the engine main body 20. The cylinder portion 20b is connected to an upper end portion of the crankcase member 20a.

The crankcase member 20a includes a crankcase 21 and an oil pan 26. The crankcase member 20a includes a crankshaft 27 accommodated in the crankcase 21. Although not shown, the crankcase member 20a includes a gearbox, a clutch, a starter motor, and a generator. These are also accommodated in the crankcase 21. The central axis Cr of the crankshaft 27 is referred to as a crankshaft axis Cr. The crankshaft axis Cr is not a line segment existing only in a region where the crankshaft 27 exists but a linear line with infinite length. The crankshaft axis Cr is along the left-right direction. More specifically, the crankshaft axis Cr is parallel to the left-right direction.

Figure 5:
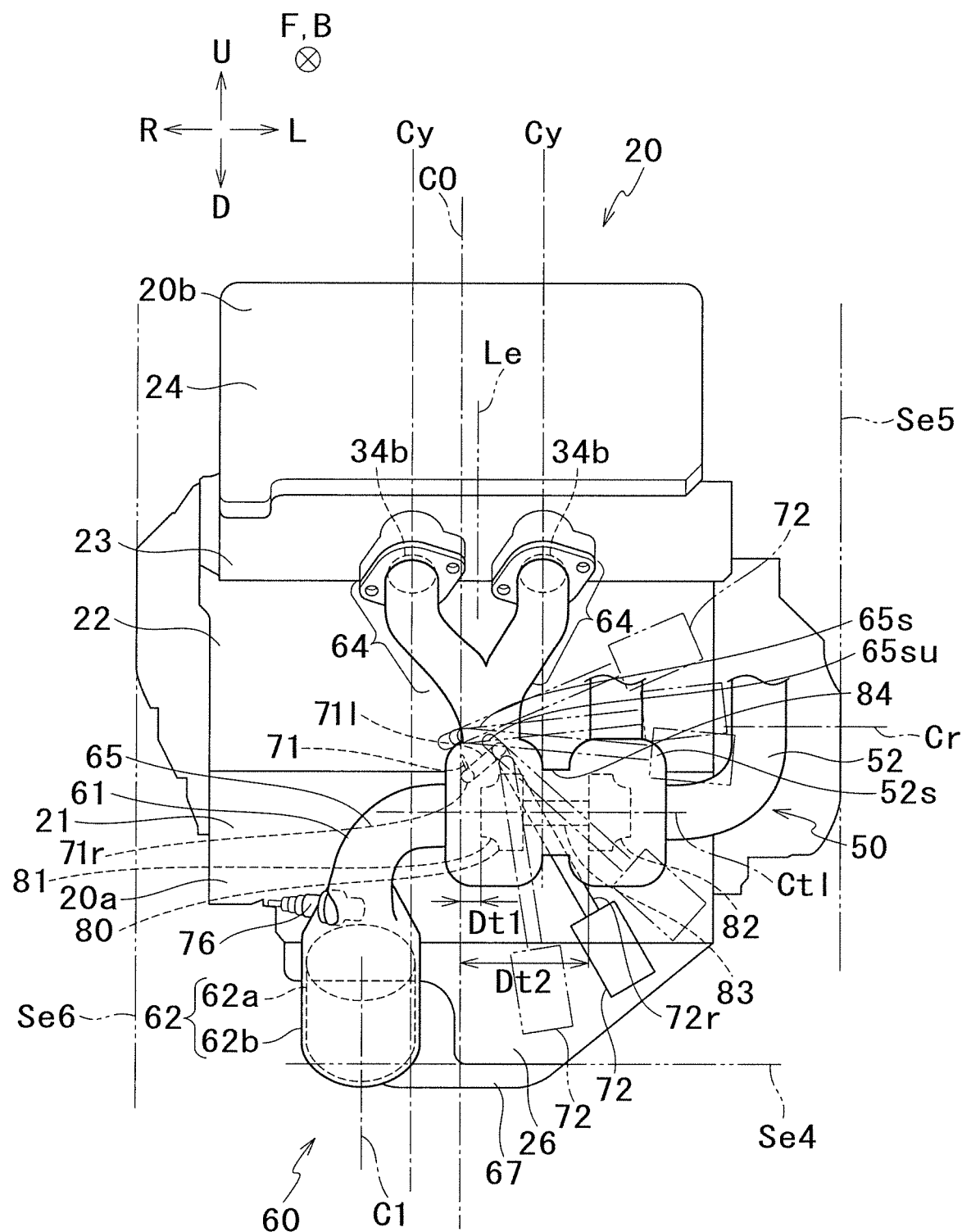
FIG. 5 is a front view of a part of the engine unit of the motorcycle according to Specific Example 1 of the embodiment of the present teaching.

The oil pan 26 is provided at lower portion of the crankcase member 20a. The oil pan 26 is connected to the lower end of the crankcase 21. As shown in FIG. 5, a right part of the lower surface of the oil pan 26 is recessed. In other words, the right part of the lower surface of the oil pan 26 is above the left part of the lower surface of the oil pan 26. Part of the exhaust passage member 60 is disposed inside the recess of the oil pan 26. The oil pan 26 stores lubrication oil by which the engine main body 20 is lubricated. The crankcase member 20a includes an oil pump (not illustrated) for sucking up the lubrication oil stored in the oil pan 26.

As shown in FIG. 4, the cylinder portion 20b includes a cylinder body 22, a cylinder head 23, and a head cover 24. The cylinder body 22 is connected to the upper end portion of the crankcase 21. The cylinder head 23 is connected to the upper end portion of the cylinder body 22. The head cover 24 is connected to the upper end portion of the cylinder head 23.

As shown in FIG. 4 and FIG. 6, the cylinder body 22 includes a cylinder hole 22a. The cylinder body 22 includes a plurality of (two) cylinder holes 22a. The two cylinder holes 22a are lined up along the left-right direction. A piston 28 is slidably housed inside each cylinder hole 22a. The two pistons 28 are connected to one crankshaft 27 via two connecting rods 29. A cooling passage 22b through which coolant water flows is provided around the two cylinder holes 22a.

The central axis Cy of the cylinder hole 22a is referred to as a cylinder axis Cy. The cylinder axis Cy is not a line segment existing only in a region where the cylinder hole 22a exists but a linear line with infinite length. The two cylinder axes Cy are parallel to each other. When viewed in the left or right direction, the two cylinder axes Cy coincide with each other. As shown in FIG. 4, the cylinder axis Cy does not intersect the crankshaft axis Cr. The cylinder axis Cy may intersect with the crankshaft axis Cr. The cylinder axis Cy is along the up-down direction. When viewed in the left or right direction, the cylinder axis Cy is inclined in the front or rear direction with respect to the up-down direction. The cylinder axis Cy is inclined with a positive slope in the forward direction. The inclination angle of the cylinder axis Cy with respect to the up-down direction when viewed in the left or right direction is defined as the inclination angle θcy. The inclination angle θcy is not limited to the angle shown in FIG. 4. The inclination angle θcy is equal to or greater than 0 degrees and equal to or less than 45 degrees. As shown in FIG. 20, the inclination angle θcy may be greater than 45 degrees. In other words, the cylinder axis Cy may be along the front-rear direction.

As shown in FIG. 4 and FIG. 6, the cylinder portion 20b includes a combustion chamber 30. The cylinder portion 20b include a plurality of (two) combustion chambers 30. The two combustion chambers 30 are lined up along the left-right direction. Each combustion chamber 30 is formed by the lower surface of the cylinder head 23, the cylinder hole 22a, and the upper surface of the piston 28. In other words, the cylinder hole 22a forms a part of the combustion chamber 30. As shown in FIG. 4, a linear line passing through the crankshaft axis Cr and parallel to the up-down direction when viewed in the left or right direction is defined as a linear line La1. The linear line La1 is a linear line with infinite length. When viewed in the left or right direction, the two combustion chambers 30 are disposed forward of the linear line La1. That is, when viewed in the left or right direction, the two combustion chambers 30 are disposed forward of the crankshaft axis Cr.

As shown in FIG. 6, the tip portion of an ignition plug 31 is disposed in the combustion chamber 30. The tip portion of the ignition plug 31 generates a spark discharge. By this spark discharge, the air-fuel mixture in the combustion chamber 30 is ignited. In this specification, the air-fuel mixture is a gas in which air and fuel are mixed. The ignition plug 31 is connected to an ignition coil (not illustrated). The ignition coil stores electric power to cause spark discharge of the ignition plug 31.

The cylinder head 23 is provided with a plurality of internal intake passage members 33 and a plurality of internal exhaust passage members 34. In this specification, a passage member is a structure forming a path. A path is a space through which gas or the like passes. Each internal intake passage member 33 is connected to the combustion chamber 30. One internal intake passage member 33 is provided for each combustion chamber 30. Each internal exhaust passage member 34 is connected to the combustion chamber 30. One internal exhaust passage member 34 is provided for each combustion chamber 30. The internal intake passage member 33 is provided to introduce air into the combustion chamber 30. The internal exhaust passage member 34 is provided for discharging the exhaust gas generated in the combustion chamber 30 from the combustion chamber 30.

A combustion chamber intake port 33a and a combustion chamber exhaust port 34a are provided on a surface of the cylinder head 23 which forms the combustion chamber 30. The combustion chamber intake port 33a is a downstream end of the internal intake passage member 33. The combustion chamber exhaust port 34a is a downstream end of the internal exhaust passage member 34. An intake port 33b and an exhaust port 34b are provided on the outer surface of the cylinder head 23. The intake port 33b is an upstream end of the internal intake passage member 33. The exhaust port 34b is a downstream end of the internal exhaust passage member 34. The number of combustion chamber intake ports 33a provided for one combustion chamber 30 may be one, or two or more. The number of intake ports 33b is only one for one combustion chamber 30. For example, when two combustion chamber intake ports 33a are provided for one combustion chamber 30, the internal intake passage member 33 is bifurcated. The number of the combustion chamber exhaust ports 34a provided for one combustion chamber 30 may be one, or two or more. The number of exhaust ports 34b is only one for one combustion chamber 30. As shown in FIG. 4, the intake port 33b is provided on the rear face of the cylinder head 23. The exhaust port 34b is provided on the front surface of the cylinder head 23. As shown in FIG. 5, the two exhaust ports 34b are lined up along the left-right direction.

As shown in FIG. 6, an intake valve 37 for opening and closing the combustion chamber intake port 33a is disposed in the internal intake passage member 33. One intake valve 37 is provided for each combustion chamber intake port 33a. An exhaust valve 38 for opening and closing the combustion chamber exhaust port 34a is disposed in the internal exhaust passage member 34. One exhaust valve 38 is provided for each combustion chamber exhaust port 34a. The intake valve 37 and the exhaust valve 38 are driven by a valve driving device (not illustrated) housed in the cylinder head 23. The valve driving device operates in conjunction with the crankshaft 27. The valve operating mechanism may have a variable valve timing device. As the variable valve timing device, a known one is applied. The variable valve timing device is configured to change opening and closing timing of the intake valve and/or the exhaust valve.

The engine main body 20 includes a plurality of injectors 39. One injector 39 is provided for each combustion chamber 30. The injector 39 is a fuel supplier that supplies fuel to the combustion chamber 30. The injector 39 is provided to inject fuel in the combustion chamber 30. The injector 39 is equivalent to a fuel injector of the present teaching. The injector 39 is connected to the fuel tank 10. A low-pressure pump (not illustrated) is provided inside the fuel tank 10. Furthermore, the engine unit 11 includes a high-pressure pump (not illustrated). The low-pressure pump sucks fuel in the fuel tank 10 and supplies the fuel with a pressure. The high-pressure pump further pressurizes the fuel pressurized by the low-pressure pump. The fuel pressurized by the high-pressure pump is supplied to the injector 39. The injector 39 is therefore able to inject the fuel into the combustion chamber 30 against the pressure inside the combustion chamber 30. Alternatively, the injector 39 may be positioned to inject fuel in the internal exhaust passage member 34. In addition, the injector 39 may be disposed so as to inject fuel in a branched intake passage member 51 of the intake passage member 50, which will be described later. The engine main body 20 may have a carburetor as a fuel supplier, instead of the injector 39. The carburetor utilizes the negative pressure in the combustion chamber 30 to supply fuel into the combustion chamber 30.

As the injector 39 injects fuel in the combustion chamber 30, the temperature of the combustion chamber 30 is lowered by utilizing heat of evaporation of the fuel. In other words, the temperature of the combustion chamber 30 is low as compared to cases where fuel is injected in the internal exhaust passage member 34 or the intake passage member 50. As a result, knocking is unlikely to occur even if the compression ratio is increased. It is therefore possible to increase the compression ratio. As the compression ratio is increased, the fuel consumption can be improved. The knocking is a phenomenon with which metallic pinging sounds or pinging vibrations occur due to abnormal combustion in the combustion chamber 30. Typically, combustion of air-fuel mixture is started by ignition due to spark discharge, and the flame of the burning air-fuel mixture propagates in the combustion chamber. Knocking is caused by spontaneous ignition of unburned air-fuel mixture, to which the flame propagation does not extend, in the combustion chamber 30. The compression ratio is a value obtained by dividing the volume of the combustion chamber 30 at the time when the piston 28 is at the bottom dead center by the volume of the combustion chamber 30 at the time when the piston 28 is at the top dead center.

<Structure of Intake Passage Member>

As shown in FIG. 6, the intake passage member 50 includes one main intake passage member 52, one bypass intake passage member 56, and a plurality of (two) branched intake passage members 51. Hereinafter, upstream and downstream of the intake passage member 50 and the internal intake passage member 33 in the flow direction of the air will be simply referred to as upstream and downstream.

The upstream end of the main intake passage member 52 is an atmosphere suction port 52a facing the atmosphere. The downstream end of the main intake passage member 52 is connected to the upstream ends of the two branched intake passage members 51. The downstream ends of the two branched intake passage members 51 are respectively connected to two intake ports 33b provided in the rear surface of the cylinder head 23, respectively. The atmosphere suction port 52a sucks air from the atmosphere. The air flowing into the main intake passage member 52 from the atmosphere suction port 52a passes through the two branched intake passage members 51 and is supplied to the engine main body 20.

The main intake passage member 52 is provided with an air cleaner 53 for purifying air. The compressor wheel 82 of the turbocharger 80 is provided in the main intake passage member 52. The compressor wheel 82 is provided downstream of the air cleaner 53. As detailed later, the compressor wheel 82 compresses air. The bypass intake passage member 56 is connected to the main intake passage member 52 so as to bypass the compressor wheel 82. A blow-off valve 57 is provided in the bypass intake passage member 56. The blow-off valve 57 is a valve for adjusting the flow rate of air supplied to the engine main body 20. The blow-off valve 57 is opened and closed by a controller (not illustrated). The blow-off valve 57 is, for example, an electromagnetic valve. The bypass intake passage member 56 and the blow-off valve 57 may not be provided.

An intercooler 54 is provided in the main intake passage member 52. The intercooler 54 is provided downstream of the compressor wheel 82. Air compressed by the compressor wheel 82 and heated flows into the intercooler 54. The intercooler 54 is configured to cool passing air. This increases the density of the air supplied to the engine main body 20 and improves the sucking efficiency. The intercooler 54 may be air-cooled or water-cooled. An air-cooled intercooler 54 is provided at a position onto which air is blown while the vehicle is running. The air flowing in the main intake passage member 52 is cooled by the air blowing onto the intercooler 54 while the vehicle is running A water-cooled intercooler 54 includes a coolant water passage in which coolant water flows. The air flowing in the main intake passage member 52 is cooled by the coolant water flowing in the coolant water passage. When the water-cooled type intercooler 54 is provided, a sub radiator is provided to cool the coolant water. This coolant water is coolant water which circulates between the water cooling device 40 and the engine main body 20. A sub radiator is provided at a position onto which air is blown while the vehicle is running.

A throttle valve 55 is provided in each of the branched intake passage members 51. One throttle valve 55 is provided for each combustion chamber 30. The opening degree of the throttle valve 55 is changed as the rider rotationally operates the accelerator grip 13R.

<Structures of Exhaust Passage Member and Turbocharger>

As shown in FIG. 6, the exhaust passage member 60 includes an upstream exhaust passage member 61, a catalyst portion 62, and a downstream collective exhaust passage member 63. Hereinafter, upstream and downstream of the exhaust passage member 60 and the internal exhaust passage member 34 in the flow direction of the exhaust gas will be simply referred to as upstream and downstream. The upstream exhaust passage member 61 includes a plurality of (two) independent exhaust passage members 64 and one upstream collective exhaust passage member 65. One independent exhaust passage member 64 is provided for each combustion chamber 30. The downstream collective exhaust passage member 63 includes a downstream exhaust passage member 66 and a muffler portion 67. The upstream ends of the two independent exhaust passage members 64 are respectively connected to the two exhaust ports 34b provided on the front face of the cylinder head 23. The downstream ends of the two independent exhaust passage members 64 are connected to the upstream end of the upstream collective exhaust passage member 65. The upstream collective exhaust passage member 65 gathers (merges) the exhaust gases discharged from the two independent exhaust passage members 64. The downstream end of the upstream collective exhaust passage member 65 is connected to the upstream end of the catalyst portion 62. The catalyst portion 62 includes therein the main catalyst 62a which is configured to purify exhaust gas. The downstream end of the catalyst portion 62 is connected to the upstream end of the downstream exhaust passage member 66. The downstream end of the downstream exhaust passage member 66 is connected to the upstream end of the muffler portion 67. The muffler portion 67 includes an atmosphere discharge port 67a exposed to the atmosphere. The exhaust gas discharged from the two exhaust ports 34b of the engine main body 20 passes through the upstream exhaust passage member 61 and flows into the catalyst portion 62. The exhaust gas is purified by passing through the main catalyst 62a. Thereafter, the exhaust gas passes through the downstream collective exhaust passage member 63 and is discharged to the atmosphere from the atmosphere discharge port 67a. The independent exhaust passage member 64 is equivalent to an external independent exhaust passage member of the present teaching. The upstream collective exhaust passage member 65 is equivalent to an external upstream collective exhaust passage member of the present teaching.

Gathering (merging) exhaust gas discharged from two independent exhaust passage members 64 indicates a state in which exhaust gas discharged from the two independent exhaust passage members 64 can be gathered (merged). Streams of exhaust gas from the two independent exhaust passage members 64 may not be mixed. As described above, the combustion process in the three combustion chambers 30 is performed at different timings. On this account, streams of exhaust gas discharged from the respective two combustion chambers 30 may not be mixed in some cases.

A passage member which is a combination of the internal exhaust passage member 34 and the independent exhaust passage member 64 is referred to as an independent exhaust passage member 68. One independent exhaust passage member 68 is provided for each combustion chamber 30. A path of exhaust gas from the combustion chamber 30 to the atmosphere discharge port 67a is referred to as an exhaust path 69. The engine unit 11 includes two exhaust paths 69. The exhaust path 69 is a space through which exhaust gas exhausted from one combustion chamber 30 passes. The exhaust path 69 is constituted by the independent exhaust passage member 68, the upstream collective exhaust passage member 65, the catalyst portion 62, and the downstream collective exhaust passage member 63. To put it differently, the exhaust path 69 is constituted by the internal exhaust passage member 34, the upstream exhaust passage member 61, the catalyst portion 62, and the downstream collective exhaust passage member 63.

As shown in FIG. 6, the turbocharger 80 includes the turbine wheel 81 and the compressor wheel 82. The turbine wheel 81 is provided in the upstream collective exhaust passage member 65 of the exhaust passage member 60. The compressor wheel 82 is provided in the main intake passage member 52 of the intake passage member 50. As shown in FIG. 5, the turbine wheel 81 is provided to the right of the compressor wheel 82.

Figure 7:
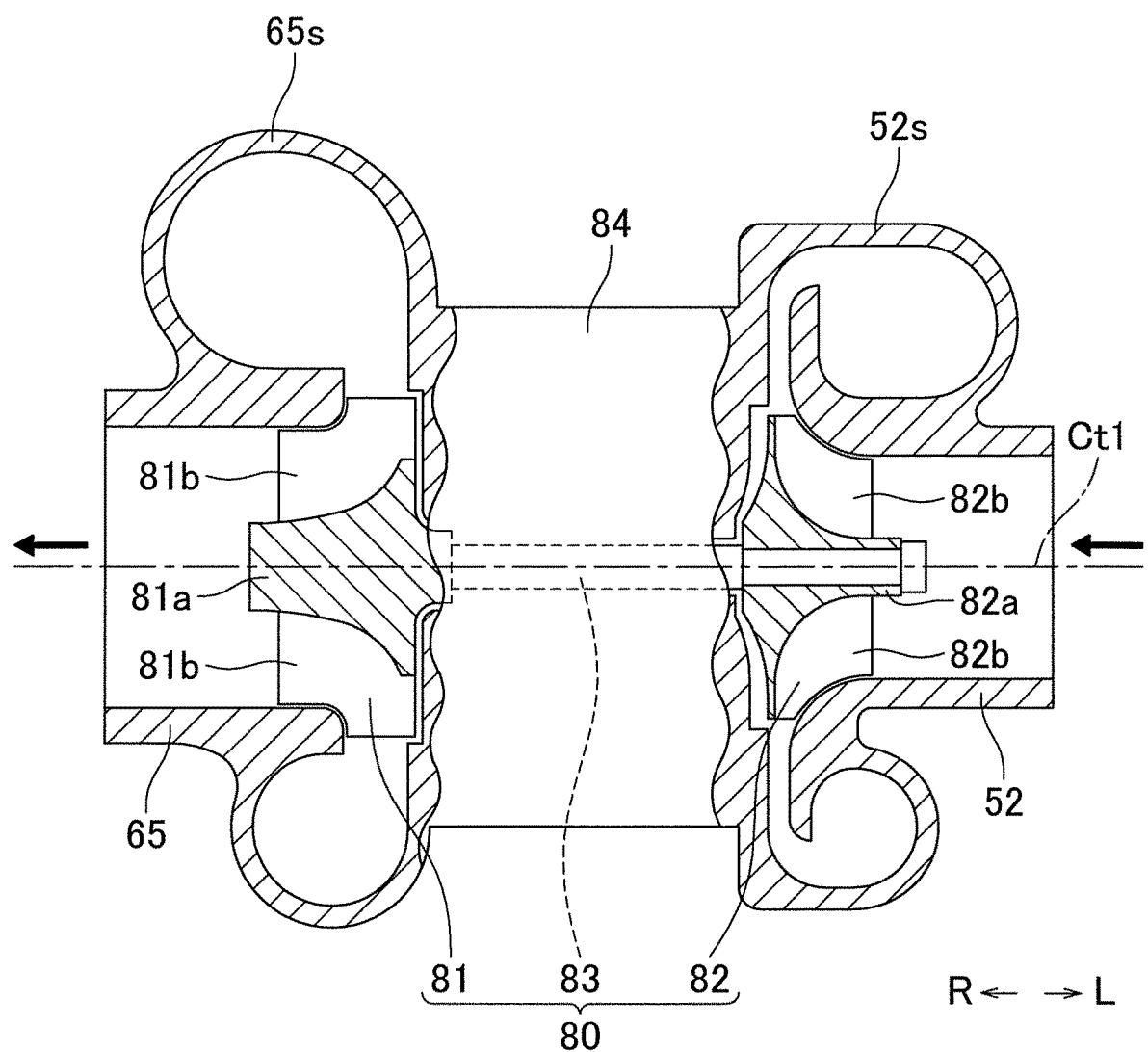
FIG. 7 is a cross section of a turbocharger of the motorcycle according to Specific Example 1 of the embodiment of the present teaching.

As shown in FIG. 7, the turbine wheel 81 is connected to the compressor wheel 82 via the connecting shaft 83. The connecting shaft 83 is housed in a center housing 84. The center housing 84 is connected to the upstream collective exhaust passage member 65 and the main intake passage member 52. The connecting shaft 83 is rotatably supported by the center housing 84 via an unillustrated bearing. The turbine wheel 81 and the compressor wheel 82 are rotatable about the central axis Ct1 of the connecting shaft 83. As shown in FIG. 4 and FIG. 5, the central axis Ct1 is along the left-right direction. More specifically, the central axis Ct1 is substantially parallel to the left-right direction. The central axis Ct1 is not a line segment existing only in a region where the connecting shaft 83 exists but a linear line with infinite length. The central axis of a part of the upstream collective exhaust passage member 65, where the turbine wheel 81 is provided, is coaxial with the central axis Ct1. The central axis of a part of the main intake passage member 52, where the turbine wheel 81 is provided, is coaxial with the central axis Ct1.

Figure 8:
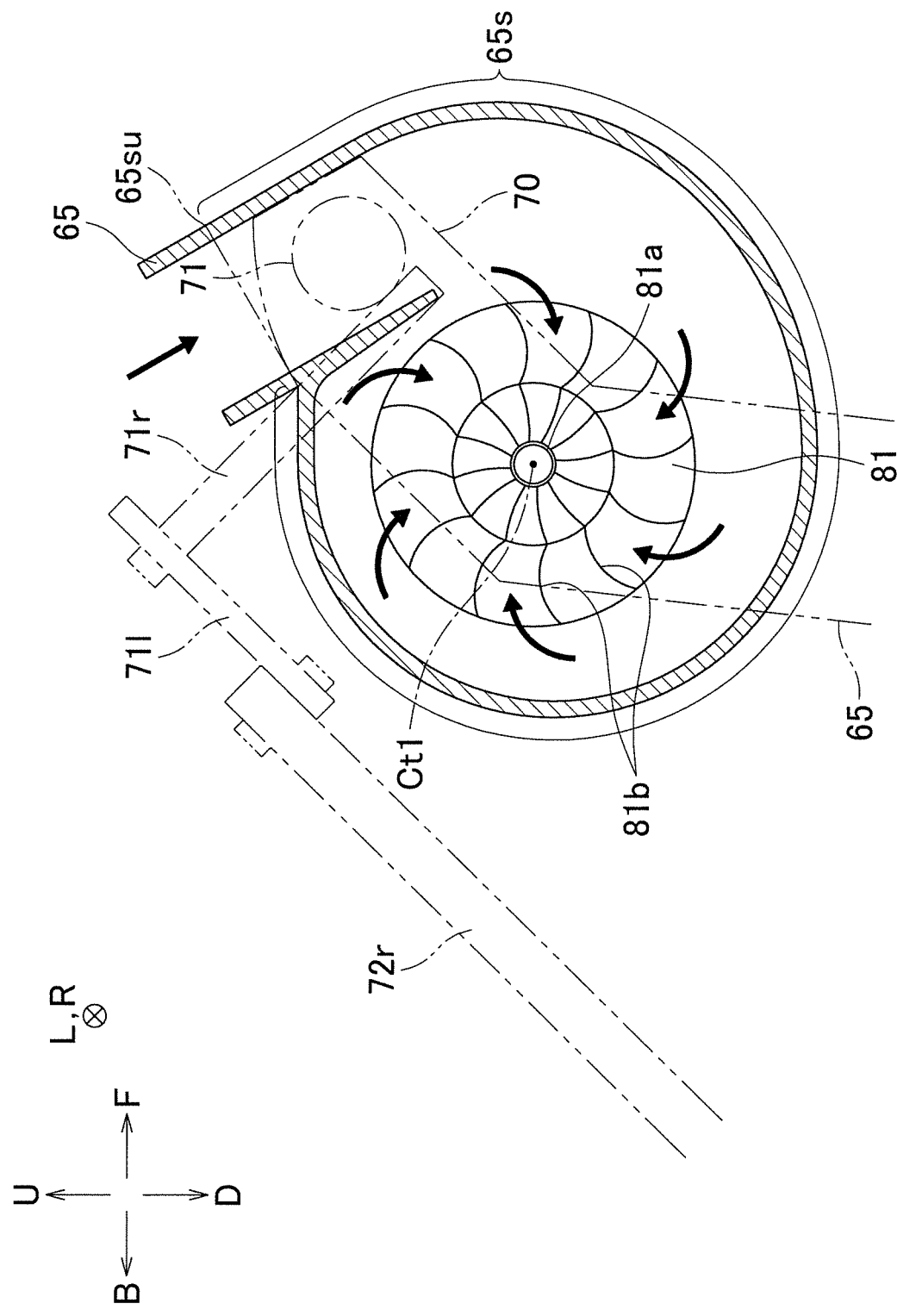
FIG. 8 is a side view of the turbocharger of the motorcycle according to Specific Example 1 of the embodiment of the present teaching.

As shown in FIG. 7, the turbine wheel 81 includes a shaft portion 81a and blades 81b provided on the outer circumferential surface of the shaft portion 81a. As shown in FIG. 8, the blades 81b are radially disposed. The compressor wheel 82 includes a shaft portion 82a and blades 82b provided on the outer circumferential surface of the shaft portion 82a. The blades 82b are radially disposed. The maximum diameter of the turbine wheel 81 is equal to or greater than the maximum diameter of the compressor wheel 82. The maximum diameter of the turbine wheel 81 may be shorter than the maximum diameter of the compressor wheel 82.

As shown in FIG. 7 and FIG. 8, the upstream collective exhaust passage member 65 includes a scroll exhaust passage member 65s. The scroll exhaust passage member 65s entirely surrounds the outer circumference of the turbine wheel 81. As shown in FIG. 7, the main intake passage member 52 includes a scroll intake passage member 52s.

The scroll intake passage member 52s entirely surrounds the outer circumference of the compressor wheel 82. As shown in FIG. 8, the outline of the scroll exhaust passage member 65s is not a perfect circle centered on the central axis Ct1, when viewed in the direction of the central axis Ct1. In other words, the length from the central axis Ct1 to the outside surface of the scroll exhaust passage member 65s is not uniform. The same applies to the scroll intake passage member 52s. The maximum length from the central axis Ct1 to the outer surface of the scroll exhaust passage member 65s is substantially identical with the maximum length from the central axis Ct1 to the outer surface of the scroll intake passage member 52s. The scroll exhaust passage member 65s is provided upstream of the turbine wheel 81. The scroll intake passage member 52s is provided downstream of the compressor wheel 82. The scroll exhaust passage member 65s may or may not be an independent component. The upstream end 65su of the scroll exhaust passage member 65s may or may not therefore be an end portion of a component. Being similar to the scroll exhaust passage member 65s, the scroll intake passage member 52s may or may not be an independent component.

Exhaust gas in the scroll exhaust passage member 65s is blown onto the outer periphery of the turbine wheel 81. This rotates the turbine wheel 81. The exhaust gas blown onto the outer periphery of the turbine wheel 81 is discharged from the turbine wheel 81 in the direction of the central axis Ct1. In accordance with the rotation of the turbine wheel 81, the compressor wheel 82 rotates. Thus, the compressor wheel 82 sucks air in the direction of the central axis Ct1. The compressor wheel 82 compresses the sucked air and discharges the air from its outer periphery. The compressed air discharged from the outer periphery of the compressor wheel 82 flows into the scroll intake passage member 52s. The compressed air is then cooled by the intercooler 54 and supplied to the combustion chamber 30. Because the compressed air is supplied to the combustion chamber 30, the intake efficiency is improved. As a result, an output of the engine is increased. Furthermore, because the compressed air is supplied to the combustion chamber 30, the displacement of the engine main body 20 can be decreased. As a result, the fuel consumption is improved and the engine main body 20 is downsized. Because the engine main body 20 is downsized, it is possible to suppress the increase in size of the motorcycle 1.

As shown in FIG. 6, the exhaust passage member 60 includes the bypass exhaust passage member 70. The bypass exhaust passage member 70 is connected to the upstream collective exhaust passage member 65 so as to bypass the turbine wheel 81. Part of the inner surface of the bypass exhaust passage member 70 may be part of the outer surface of the scroll exhaust passage member 65s. The waste gate valve 71 is provided in the bypass exhaust passage member 70. The waste gate valve 71 is a valve for adjusting the flow rate of exhaust gas supplied to the turbine wheel 81. As shown in FIG. 8, at least part of the waste gate valve 71 is provided above the central axis Ct1. At least part of the waste gate valve 71 may be provided below the central axis Ct1.

Figure 9:
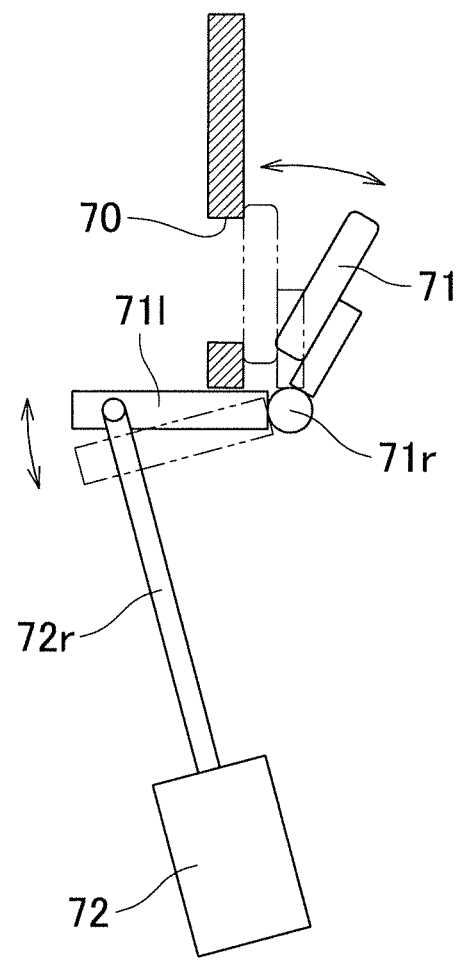
FIG. 9 is a schematic diagram of a waste gate valve and a waste gate valve actuator.

The waste gate valve 71 is driven by the waste gate valve actuator 72. The waste gate valve actuator 72 may be provided at a position indicated by full lines in FIG. 3 and FIG. 5, or at any of positions indicated by two-dot chain lines. The waste gate valve actuator 72 includes the rod 72r. As shown in FIG. 8 and FIG. 9, the waste gate valve 71 is connected to the rod 72r via a rotational axis portion 71r and a lever 711. The waste gate valve 71 and the lever 711 are both rotatably connected to the rotational axis portion 71r. The rod 72r is rotatably connected to the lever 711. The rod 72r may have a bended portion as long as the rod 72r is substantially linear in shape on the whole. The rod 72r may be linear in shape. The waste gate valve actuator 72 is arranged to allow the rod 72r to reciprocate in the longitudinal direction of the rod 72r. The waste gate valve actuator 72 may be driven by an electric motor, or may be driven by utilizing positive or negative air pressure. When air pressure is utilized, the position of the waste gate valve 71 is determined in accordance with the air pressure. Meanwhile, when an electric motor is used, the position of the waste gate valve 71 is controllable by controlling the electric motor by a controller. As the rod 72r reciprocates, the waste gate valve 71 is driven (i.e., opened or closed). The rotation speed of the turbine wheel 81 is changed depending on the opening degree of the waste gate valve 71. As shown in FIG. 3, when viewed in the front or rear direction, at least part of the waste gate valve actuator 72 does not overlap the front wheel unit 2.

The waste gate valve actuator 72 is arranged such that the rod 72r is able to reciprocate in a direction along a virtual plane Sr1 shown in FIG. 4. The virtual plane Sr1 is a plane parallel to both the central axis Ct1 of the connecting shaft 83 of the turbocharger 80 and the cylinder axis Cy. The waste gate valve actuator 72, provided at any of positions indicated by the two-dot chain lines in FIG. 5, is also arranged to allow the rod 72r to reciprocate along a virtual plane which is parallel to both the central axis Ct1 of the connecting shaft 83 of the turbocharger 80 and the cylinder axis Cy. This virtual plane may be identical with or different from the virtual plane Sr1. As shown in FIG. 4, when viewed in the left or right direction, the longitudinal direction of the rod 72r is along the up-down direction. To be more specific, when viewed in the left or right direction, the longitudinal direction of the rod 72r is inclined in the front-rear direction relative to the up-down direction. As shown in FIG. 5, when viewed in the front or rear direction, the longitudinal direction of the rod 72r indicated by full lines is along the up-down direction. To be more specific, when viewed in the front or rear direction, the longitudinal direction of the rod 72r indicated by full lines is inclined in the left-right direction relative to the up-down direction. When viewed in the front or rear direction, the longitudinal direction of the rod 72r may be parallel to the up-down direction. When viewed in the front or rear direction, the longitudinal direction of the rod 72r may be along the left-right direction.

As shown in FIGS. 4 and 5, the scroll exhaust passage member 65s and the scroll intake passage member 52s are provided below the exhaust port 34b. As a matter of course, the turbine wheel 81 is provided below the exhaust port 34b. A plane passing through the rearmost end of the scroll exhaust passage member 65s and orthogonal to the front-rear direction is defined as a plane Ss1. At least part of the exhaust port 34b is rearward of the plane Ss1. In other words, at least part of the exhaust port 34b is provided rearward of the scroll exhaust passage member 65s. Furthermore, at least part of the exhaust port 34b is provided rearward of the scroll intake passage member 52s. The turbine wheel 81 is provided forward of the exhaust port 34b. Only part of the turbine wheel 81 may be provided forward of the exhaust port 34b. At least part of the turbine wheel 81 is preferably provided forward of the exhaust port 34b.

As shown in FIG. 4, the upstream end 65su of the scroll exhaust passage member 65s is provided at an upper part of the scroll exhaust passage member 65s. The upstream end 65su of the scroll exhaust passage member 65s is provided below the exhaust port 34b. The upstream end 65su of the scroll exhaust passage member 65s is provided forward of the exhaust port 34b. The flow direction of exhaust gas at the upstream end 65su of the scroll exhaust passage member 65s is along the up-down direction. When viewed in the left or right direction, the flow direction of exhaust gas from the upstream end of the exhaust passage member 60 to the scroll exhaust passage member 65s is obliquely downward and forward. In the scroll exhaust passage member 65s, the exhaust gas flows in the circumferential direction and in the radially inward direction. The downstream end of the scroll exhaust passage member 65s is provided at a central part of the scroll exhaust passage member 65s. As shown in FIG. 5, the downstream end of the scroll intake passage member 52s is provided at an upper part of the scroll intake passage member 52s. The downstream end of the scroll intake passage member 52s may be provided at a lower part of the scroll intake passage member 52s. The downstream end of the scroll intake passage member 52s may be provided at a rear part or front part of the scroll intake passage member 52s. In the scroll intake passage member 52s, the air flows in the circumferential direction and in the radially outward direction. The upstream end of the scroll intake passage member 52s may be provided at a central part of the scroll intake passage member 52s.

As shown in FIG. 4, an axis passing the center of the exhaust port 34b when viewed in the left or right direction is termed a central axis Cu1. The central axis Cu1 is a linear line with infinite length. The direction of the central axis Cu1 is identical with the flow direction of exhaust gas at the exhaust port 34b. When viewed in the left or right direction, the scroll exhaust passage member 65s and the scroll intake passage member 52s are provided below the central axis Cu1. As a matter of course, when viewed in the left or right direction, the turbine wheel 81 is provided below the central axis Cu1. When viewed in the left or right direction, part of the scroll exhaust passage member 65s may be provided above the central axis Cu1. At least part of the scroll exhaust passage member 65s is preferably provided below the central axis Cu1. Similarly, at least part of the scroll intake passage member 52s is preferably provided below the central axis Cu1.

As shown in FIG. 4, when viewed in the left or right direction, the scroll exhaust passage member 65s is provided straight below the engine main body 20. When viewed in the left or right direction, at least part of the scroll exhaust passage member 65s is lined up with the engine main body 20 in the up-down direction. When viewed in the left or right direction, the scroll intake passage member 52s is provided straight below the engine main body 20. When viewed in the left or right direction, at least part of the scroll intake passage member 52s is lined up with the engine main body 20 in the up-down direction. When viewed in the left or right direction, the turbine wheel 81 is provided straight below the engine main body 20. When viewed in the left or right direction, at least part of the turbine wheel 81 is lined up with the engine main body 20 in the up-down direction. A plane passing through the front-most end of the crankcase member 20a and orthogonal to the front-rear direction is defined as a plane Se1. The scroll exhaust passage member 65s and the scroll intake passage member 52s are provided forward of the plane Se1. In other words, the scroll exhaust passage member 65s and the scroll intake passage member 52s are provided forward of the crankcase member 20a. As shown in FIG. 4, a plane passing through the uppermost end of the crankcase member 20a and orthogonal to the up-down direction is defined as a plane Se3. A plane passing through the rearmost end of the crankcase member 20a and orthogonal to the up-down direction is defined as a plane Se4. The scroll exhaust passage member 65s and the scroll intake passage member 52s are provided between the plane Se3 and the plane Se4. When viewed in the left or right direction, the scroll exhaust passage member 65s and the scroll intake passage member 52s are provided in front of the crankcase member 20a. When viewed in the left or right direction, the scroll exhaust passage member 65s and the scroll intake passage member 52s are entirely lined up with the crankcase member 20a in the front-rear direction. As a matter of course, when viewed in the left or right direction, the turbine wheel 81 is provided in front of the crankcase member 20a. When viewed in the left or right direction, the entirety of the turbine wheel 81 is lined up with the crankcase member 20a in the front-rear direction.

As shown in FIG. 5, a plane passing through the leftmost end of the engine main body 20 and orthogonal to the left-right direction is defined as a plane Se5. The plane Se5 passes the leftmost end of the crankcase member 20a. A plane passing through the rightmost end of the engine main body 20 and orthogonal to the left-right direction is defined as a plane Se6. The plane Se6 passes the rightmost end of the crankcase member 20a. The scroll exhaust passage member 65s and the scroll intake passage member 52s are provided between the plane Se5 and the plane Se6. When viewed in the front or rear direction, the scroll exhaust passage member 65s and the scroll intake passage member 52s overlap the crankcase member 20a. As a matter of course, when viewed in the front or rear direction, the turbocharger 80 overlaps the crankcase member 20a. When viewed in the front or rear direction, at least part of the scroll intake passage member 52s may not overlap the engine main body 20. When viewed in the front or rear direction, part of the scroll exhaust passage member 65s may not overlap the engine main body 20. When viewed in the front or rear direction, at least part of the scroll exhaust passage member 65s preferably overlaps the engine main body 20. The scroll exhaust passage member 65s and the scroll intake passage member 52s are provided in front of the crankcase member 20a. The scroll exhaust passage member 65s and the scroll intake passage member 52s are entirely lined up with the crankcase member 20a in the front-rear direction. As a matter of course, the turbocharger 80 is provided in front of the crankcase member 20a. The entirety of the turbocharger 80 is lined up with the crankcase member 20a in the front-rear direction. Part of the scroll exhaust passage member 65s may not be lined up with the crankcase member 20a in the front-rear direction. At least part of the scroll intake passage member 52s may not be lined up with the crankcase member 20a in the front-rear direction.

As shown in FIG. 4, when viewed in the left or right direction, the scroll exhaust passage member 65s and the scroll intake passage member 52s are provided forward of the linear line La1. In other words, the scroll exhaust passage member 65s and the scroll intake passage member 52s are provided forward of the crankshaft axis Cr. A linear line that is orthogonal to the cylinder axis Cy and passes through the crankshaft axis Cr when viewed in the left or right direction is defined as a linear line La2. The linear line La2 is a linear line with infinite length. When viewed in the left or right direction, the scroll exhaust passage member 65s and the scroll intake passage member 52s are provided forward of (above) the linear line La2. When viewed in the left or right direction, only part of the scroll exhaust passage member 65s may be provided forward of the linear line La2. When viewed in the left or right direction, at least part of the scroll exhaust passage member 65s is preferably provided forward of the linear line La2. Being similar to the scroll exhaust passage member 65s, when viewed in the left or right direction, at least part of the scroll intake passage member 52s is preferably provided forward of the linear line La2. Furthermore, the scroll exhaust passage member 65s and the scroll intake passage member 52s are provided below the crankshaft axis Cr. At least part of the scroll exhaust passage member 65s may be provided above the crankshaft axis Cr. Furthermore, at least part of the scroll intake passage member 52s may be provided above the crankshaft axis Cr.

As shown in FIG. 4, when viewed in the left or right direction, the scroll exhaust passage member 65s and the scroll intake passage member 52s do not overlap the vehicle body frame 4. As a matter of course, when viewed in the left or right direction, the turbine wheel 81 does not overlap the vehicle body frame 4. The shape of the vehicle body frame 4 is not limited to the shape shown in FIG. 2.

As shown in FIG. 4, a line segment which is the lowermost one among line segments connecting points on the outline of the engine main body 20 with points on the outline of the front wheel unit 2, when viewed in the left or right direction, is defined as a line segment Lw1. The line segment Lw1 is a line segment connecting the lowermost end of the engine main body 20 with the vicinity of the lowermost end of the front wheel unit 2. When viewed in the left or right direction, the scroll exhaust passage member 65s and the scroll intake passage member 52s are provided on the line segment Lw1. A line segment which is the uppermost one among line segments connecting points on the outline of the engine main body 20 with points on the outline of the front wheel unit 2, when viewed in the left or right direction, is defined as a line segment Lw2. The line segment Lw2 is a line segment connecting the uppermost end of the engine main body 20 with the uppermost end or the vicinity of the uppermost end of the front wheel unit 2. When viewed in the left or right direction, the scroll exhaust passage member 65s and the scroll intake passage member 52s are provided straight below the line segment Lw2. When viewed in the left or right direction, the scroll exhaust passage member 65s and the scroll intake passage member 52s are provided in a rectangular region, two sides of which are the line segment Lw1 and the line segment Lw2. The rectangle, two sides of which are the line segment Lw1 and the line segment Lw2, is a rectangle whose apexes are the ends of the line segment Lw1 and the ends of the line segment Lw2. When viewed in the left or right direction, the scroll exhaust passage member 65s and the scroll intake passage member 52s are provided in the above-described rectangular region and do not overlap the engine main body 20. In other words, when viewed in the left or right direction, the scroll exhaust passage member 65s and the scroll intake passage member 52s are provided between the engine main body 20 and the front wheel unit 2. When viewed in the left or right direction, only part of the scroll exhaust passage member 65s may be provided between the engine main body 20 and the front wheel unit 2. For example, when viewed in the left or right direction, part of the scroll exhaust passage member 65s may overlap the engine main body 20. When viewed in the left or right direction, at least part of the scroll exhaust passage member 65s is preferably provided between the engine main body 20 and the front wheel unit 2. Being similar to the scroll exhaust passage member 65s, when viewed in the left or right direction, at least part of the scroll intake passage member 52s is preferably provided between the engine main body 20 and the front wheel unit 2. As the front forks 6 and/or the rear suspension 8 extend or contract, the position of the vehicle body frame 4 relative to the front wheel unit 2 is changed. On this account, the position of the engine unit 11 relative to the front wheel unit 2 is changed. Providing at least part of the catalyst portion 62 between the engine main body 20 and the front wheel unit 2 when viewed in the left or right direction does not indicate that the at least part of the catalyst portion 62 is provided in this way no matter in what position the engine unit 11 is provided relative to the front wheel unit 2. Providing at least part of the catalyst portion 62 between the engine main body 20 and the front wheel unit 2 when viewed in the left or right direction indicates that the at least part of the catalyst portion 62 is provided in this way when the engine unit 11 is provided at a certain position relative to the front wheel unit 2.

As shown in FIG. 4, a horizontal plane passing the upper end of the front wheel unit 2 is defined as a horizontal plane Sw1. The scroll exhaust passage member 65s and the scroll intake passage member 52s are provided below the horizontal plane Sw1. As a matter of course, the turbine wheel 81 is provided below the horizontal plane Sw1. In this specification, providing a component or part of a component below the horizontal plane Sw1 indicates that the component or the part of the component is provided in this way when the engine unit 11 is provided at a certain position relative to the front wheel unit 2.

As shown in FIG. 4, a horizontal plane passing the center of the front wheel unit 2 is defined as a horizontal plane Sw2. The horizontal plane Sw2 passes the scroll exhaust passage member 65s and the scroll intake passage member 52s. The entirety of the scroll exhaust passage member 65s may be provided above the horizontal plane Sw2. In other words, at least part of the scroll exhaust passage member 65s may be provided above the horizontal plane Sw2. The entirety of the scroll exhaust passage member 65s may be provided below the horizontal plane Sw2. In other words, at least part of the scroll exhaust passage member 65s may be provided below the horizontal plane Sw2. The same applies to the scroll intake passage member 52s. At least part of the turbine wheel 81 is provided above the horizontal plane Sw2. At least part of the turbine wheel 81 may be provided below the horizontal plane Sw2. In this specification, providing a component or part of a component below or above the horizontal plane Sw2 indicates that the component or the part of the component is provided in this way when the engine unit 11 is provided at a certain position relative to the front wheel unit 2.

As shown in FIG. 5, the scroll exhaust passage member 65s and the scroll intake passage member 52s are provided in left part of the motorcycle 1. In this connection, a plane passing the center in the left-right direction of the front wheel unit 2 and the rear wheel unit 3 is referred to as C0. The center in the left-right direction of the front wheel unit 2 and the rear wheel unit 3 is also the center in the left-right direction of the motorcycle 1. Hereinafter, the center in the left-right direction of the motorcycle 1 will be referred to as the center C0 in the left-right direction of the motorcycle 1. The turbocharger 80 is provided leftward of the center C0 in the left-right direction of the motorcycle 1. The distance in the left-right direction between the center C0 in the left-right direction of the motorcycle 1 and the turbine wheel 81 is defined as a distance Dt1. The distance in the left-right direction between the center C0 in the left-right direction of the motorcycle 1 and the compressor wheel 82 is defined as a distance Dt2. As described above, the turbine wheel 81 is provided to the right of the compressor wheel 82. The distance Dt1 is therefore shorter than the distance Dt2. The turbine wheel 81 may be provided on the center C0 in the left-right direction of the motorcycle 1. The turbine wheel 81 may be provided rightward of the center C0 in the left-right direction of the motorcycle 1. In these cases, the distance Dt1 is preferably shorter than the distance Dt2, too. A linear line which passes the center in the left-right direction of all of the exhaust ports 34b and is parallel to the up-down direction when viewed in the front or rear direction is defined as a linear line Le. The linear line Le is a linear line with infinite length. The distance in the left-right direction between the turbine wheel 81 and the linear line Le when viewed in the front or rear direction is preferably short. When the distance is short, the distance may be zero. In other words, when viewed in the front or rear direction, the turbine wheel 81 is preferably close to the center (Le) in the left-right direction of all of the exhaust ports 34b. With this, differences in path length between the independent exhaust passage members 64 are decreased.

As shown in FIG. 4, FIG. 5, and FIG. 6, an oxygen sensor 76 is provided at the upstream collective exhaust passage member 65. The oxygen sensor 76 is provided downstream of the turbine wheel 81. The oxygen sensor 76 is configured to detect the oxygen density of the exhaust gas in the upstream collective exhaust passage member 65.

As shown in FIG. 4 and FIG. 5, the catalyst portion 62 includes the main catalyst 62a and a cylinder member 62b. The cylinder member 62b is connected to the downstream end of the upstream collective exhaust passage member 65 and the upstream end of the downstream exhaust passage member 66. The cylinder member 62b may be integrally molded with part of the upstream collective exhaust passage member 65. Alternatively, the cylinder member 62b may be integrally molded with part of the downstream exhaust passage member 66. No catalysts other than the main catalyst 62a are provided in the exhaust passage member 60. The main catalyst 62a purifies exhaust gas most in the exhaust paths 69 (see FIG. 6).

The main catalyst 62a is a cylindrical prism in shape. The main catalyst 62a has a porous structure. The porous structure means a structure having a plurality of pores penetrating in the exhaust gas flow direction. The main catalyst 62a is a three-way catalyst. The three-way catalyst removes three substances in exhaust gas, namely hydrocarbon (HC), carbon monoxide (CO), and nitrogen oxide (NOx), by oxidation or reduction. The three-way catalyst is a type of oxidation-reduction catalysts. Note that the main catalyst 62a may be a catalyst for removing any one or two of hydrocarbon, carbon monoxide, and nitrogen oxide. The main catalyst 62a may not be an oxidation-reduction catalyst. The main catalyst may be an oxidation catalyst which removes harmful substances by only oxidation. The main catalyst may be a reduction catalyst which removes harmful substances by only reduction. The main catalyst 62a includes a substrate and catalytic materials attached to the surface of the substrate. The catalytic materials are formed of a carrier and a noble metal. The carrier has a function of attaching the noble metal to the substrate. The noble metal has a function of purifying exhaust gas. Examples of noble metals include platinum, palladium, and rhodium which remove hydrocarbon, carbon monoxide, and nitrogen oxide. When the temperature of the main catalyst 62a is lower than a predetermined activation temperature, the main catalyst 62a is in an inactive state and does not exert the purification performance. When the temperature of the main catalyst 62a is equal to or higher than the predetermined activation temperature, the main catalyst 62a is in an active state and exerts the purification performance. The main catalyst 62a may be a metal-substrate catalyst or a ceramic-substrate catalyst. The metal-substrate catalyst is a catalyst in which the substrate is made of metal. The ceramic-substrate catalyst is a catalyst in which the substrate is made of ceramic. The substrate of the metal-substrate catalyst is formed, for example, by alternately stacking metal corrugated plates and metal flat plates and winding them. The substrate of the ceramic-substrate catalyst is, for example, a honeycomb structured body.

The central axis C1 of the main catalyst 62a is coaxial with the central axis of the catalyst portion 62. The central axis of the catalyst portion 62 indicates the central axis of the cylinder member 62b. The length of the catalyst portion 62 in the exhaust gas flow direction is the same as the length of the main catalyst 62a in the exhaust gas flow direction. The length of the main catalyst 62a in the flow direction of the exhaust gas is longer than the maximum length of the main catalyst 62a in the direction orthogonal to the flow direction of the exhaust gas. The flow direction of the exhaust gas in the main catalyst 62a is substantially identical with the direction of the central axis C1 of the main catalyst 62a. Hereinafter, the flow direction of the exhaust gas in the main catalyst 62a may be referred to as the flow direction C1 of exhaust gas.

As shown in FIG. 4, when viewed in the left or right direction, the central axis C1 of the main catalyst 62a is inclined in the front-rear direction relative to the up-down direction. The inclination angle of the central axis C1 of the main catalyst 62a with respect to the up-down direction when viewed in the left or right direction is defined as the inclination angle θ1. The inclination angle θ1 is not limited to the angle shown in FIG. 4. The inclination angle θ1 is greater than 45 degrees. The inclination angle θ1 is smaller than 90 degrees. On this account, when viewed in the left or right direction, the central axis C1 of the main catalyst 62a is along the front-rear direction. To put it differently, when viewed in the left or right direction, the flow direction C1 of exhaust gas in the main catalyst 62a is along the front-rear direction. The inclination angle θ1 may be greater than 0 degrees, and equal to or smaller than 45 degrees. To put it differently, when viewed in the left or right direction, the flow direction C1 of exhaust gas in the main catalyst 62a may be along the up-down direction. As shown in FIG. 5, when viewed in the front or rear direction, the flow direction C1 of exhaust gas in the main catalyst 62a is along the up-down direction. To be more specific, when viewed in the front or rear direction, the flow direction C1 of exhaust gas in the main catalyst 62a is substantially parallel to the up-down direction. When viewed in the front or rear direction, the flow direction C1 of exhaust gas in the main catalyst 62a may be inclined in the left-right direction relative to the up-down direction. When viewed in the front or rear direction, the flow direction C1 of exhaust gas in the main catalyst 62a may be along the left-right direction. Although not illustrated, when viewed in the up or down direction, the flow direction C1 of exhaust gas in the main catalyst 62a is along the front-rear direction. To be more specific, when viewed in the up or down direction, the flow direction C1 of exhaust gas in the main catalyst 62a is substantially parallel to the front-rear direction. When viewed in the up or down direction, the flow direction C1 of exhaust gas in the main catalyst 62a may be inclined in the left-right direction relative to the front-rear direction. When viewed in the up or down direction, the flow direction C1 of exhaust gas in the main catalyst 62a may be along the left-right direction. The flow direction C1 of exhaust gas in the main catalyst 62a is along the front-rear direction. In other words, the flow direction C1 of exhaust gas in the main catalyst 62a is along the horizontal direction. The flow direction C1 of exhaust gas in the main catalyst 62a may be along the up-down direction. The flow direction C1 of exhaust gas in the main catalyst 62a may be along the left-right direction.

As shown in FIG. 4, when viewed in the left or right direction, the flow direction C1 of exhaust gas in the main catalyst 62a is along the direction parallel to the cylinder axis Cy. As shown in FIG. 5, when viewed in the front or rear direction, the flow direction C1 of exhaust gas in the main catalyst 62a is along the direction parallel to the cylinder axis Cy. The flow direction C1 of exhaust gas in the main catalyst 62a is therefore along the direction parallel to the cylinder axis Cy.

Figure 10:
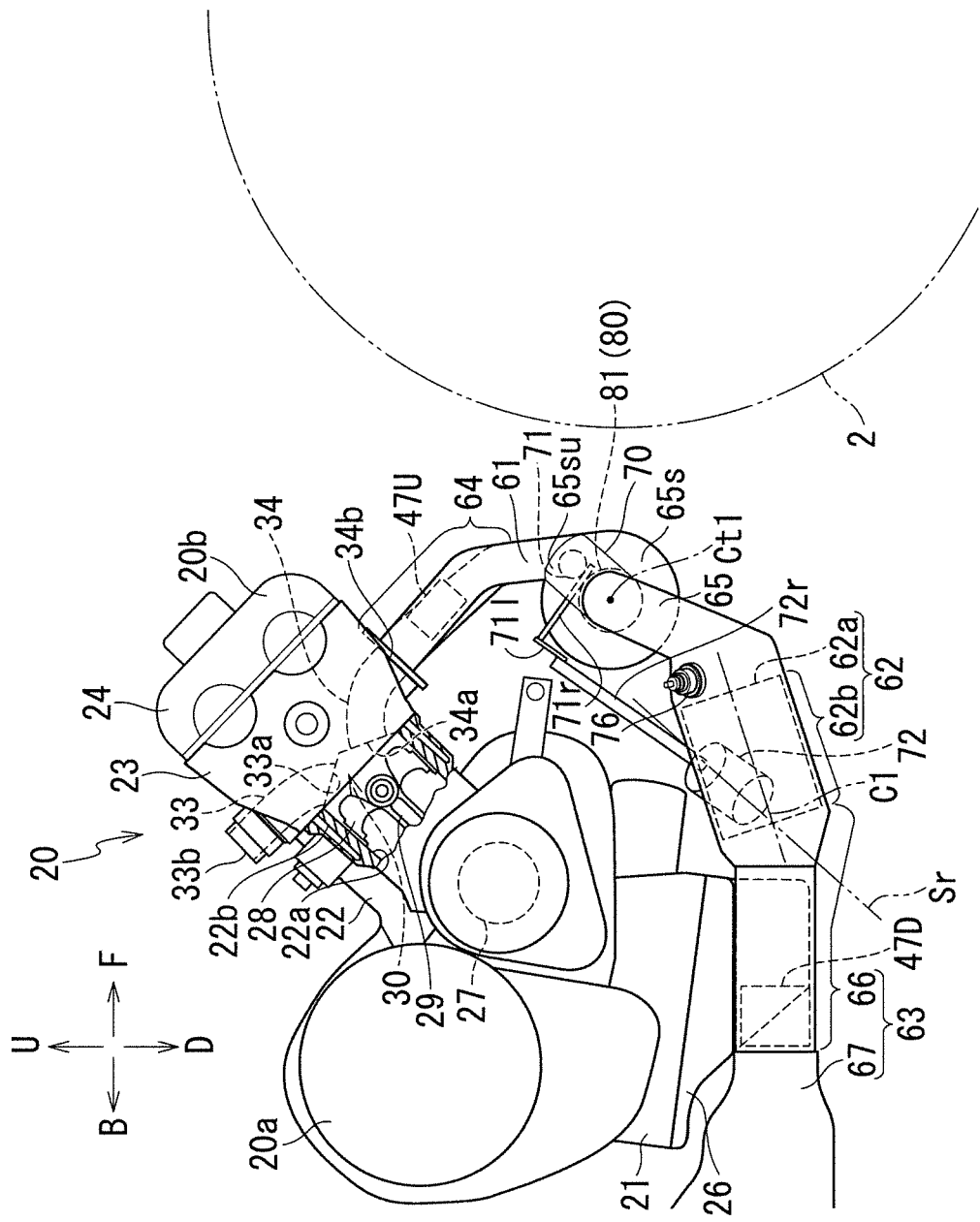
FIG. 10 is a right side view of a part of an engine unit of a motorcycle according to Specific Example 2 of the embodiment of the present teaching.

The arrow A in FIG. 4 shows a direction which is orthogonal to both the central axis Ct1 of a connecting shaft 83 of the turbocharger 80 and the cylinder axis Cy. FIG. 10 shows the engine unit 11 viewed in the A direction. As shown in FIG. 1B, when viewed in the A direction, the flow direction of the exhaust gas in the main catalyst 62a intersects with the reciprocating direction of the rod 72r of the waste gate valve actuator 72 to form an acute angle or an obtuse angle therebetween. In other words, when viewed in the A direction, the flow direction C1 of exhaust gas in the main catalyst 62a is not parallel to the reciprocating direction of the rod 72r. When viewed in the A direction, the flow direction C1 of exhaust gas in the main catalyst 62a is not orthogonal to the reciprocating direction of the rod 72r. When viewed in the A direction, the flow direction C1 of exhaust gas in the main catalyst 62a may be parallel to the reciprocating direction of the rod 72r. When viewed in the A direction, the flow direction C1 of exhaust gas in the main catalyst 62a may be orthogonal to the reciprocating direction of the rod 72r.

As shown in FIG. 4, when viewed in the left or right direction, the catalyst portion 62 is provided straight below the engine main body 20. When viewed in the left or right direction, the entirety of the catalyst portion 62 is lined up with the engine main body 20 in the up-down direction. A plane passing through the rearmost end of the crankcase member 20a and orthogonal to the front-rear direction is defined as a plane Se2. The catalyst portion 62 is disposed between the plane Se1 and the plane Se2. As described above, the plane Se1 is a plane passing through the frontmost end of the crankcase member 20a and orthogonal to the front-rear direction. When viewed in the left or right direction, the catalyst portion 62 is provided straight below the crankcase member 20a. When viewed in the left or right direction, the entirety of the catalyst portion 62 is lined up with the crankcase member 20a in the up-down direction. When viewed in the left or right direction, only part of the catalyst portion 62 may oppose the crankcase member 20a in the up-down direction. When viewed in the left or right direction, at least part of the catalyst portion 62 is preferably lined up with the crankcase member 20a in the up-down direction. As shown in FIG. 4, at least part of the catalyst portion 62 is provided between the plane Se3 and the plane Se4. The plane Se3 is a plane passing through the uppermost end of the crankcase member 20a and orthogonal to the up-down direction. The plane Se4 is a plane passing through the rearmost end of the crankcase member 20a and orthogonal to the up-down direction. When viewed in the left or right direction, the catalyst portion 62 is provided in front of the crankcase member 20a. At least part of the catalyst portion 62 is lined up with the crankcase member 20a in the front-rear direction. As shown in FIG. 5, the catalyst portion 62 is provided between the plane Se5 and the plane Se6. The plane Se5 is a plane passing through the leftmost end of the crankcase member 20a and orthogonal to the left-right direction. The plane Se6 is a plane passing through the rightmost end of the crankcase member 20a and orthogonal to the left-right direction. When viewed in the front or rear direction, at least part of the catalyst portion 62 overlaps the crankcase member 20a. Although not shown, at least part of the catalyst portion 62 overlaps the crankcase member 20a when viewed in the up or down direction. The catalyst portion 62 is provided in front of the crankcase member 20a. At least part of the catalyst portion 62 is lined up with the crankcase member 20a in the front-rear direction. The catalyst portion 62 is provided straight below the crankcase member 20a. At least part of the catalyst portion 62 may be lined up with the crankcase member 20a in the up-down direction. The entirety of the catalyst portion 62 may not oppose the crankcase member 20a in the up-down direction. However, at least part of the catalyst portion 62 is preferably lined up with the engine main body 20 in the up-down direction.

When viewed in the left or right direction, the catalyst portion 62 is provided forward of the linear line La1. That is, the catalyst portion 62 is provided forward of the crankshaft axis Cr. Only part of the catalyst portion 62 may be provided forward of the crankshaft axis Cr. At least part of the catalyst portion 62 is preferably disposed forward of the crankshaft axis Cr. When viewed in the left or right direction, the catalyst portion 62 is provided rearward of (below) the linear line La2. The linear line La2 is a linear line orthogonal to the cylinder axis Cy and passes the crankshaft axis Cr when viewed in the left or right direction. When viewed in the left or right direction, only part of the catalyst portion 62 may be provided rearward of (below) the linear line La2. When viewed in the left or right direction, at least part of the catalyst portion 62 is preferably provided rearward of (below) the linear line La2. When viewed in the left or right direction, the entirety of the catalyst portion 62 may be provided forward of (above) the linear line La2. In other words, at least part of the catalyst portion 62 may be disposed forward of (above) the linear line La2 when viewed in the left or right direction. Furthermore, the catalyst portion 62 is provided below the crankshaft axis Cr. When viewed in the left or right direction, the catalyst portion 62 is provided forward of the cylinder axis Cy.

As shown in FIG. 4, a plane passing through the lowermost end of the scroll exhaust passage member 65s and orthogonal to the up-down direction is defined as a plane Ss2. The catalyst portion 62 is provided below the plane Ss2. In other words, the catalyst portion 62 is provided below the scroll exhaust passage member 65s. Only part of the catalyst portion 62 may be provided below the scroll exhaust passage member 65s. At least part of the catalyst portion 62 is preferably provided below the scroll exhaust passage member 65s. The catalyst portion 62 is provided below the turbine wheel 81. As a matter of course, the downstream end of the catalyst portion 62 is provided below the turbine wheel 81.

As shown in FIG. 4, the catalyst portion 62 is provided rearward of the plane Ss1. The plane Ss1 is a plane passing through the rearmost end of the scroll exhaust passage member 65s and orthogonal to the front-rear direction. In other words, the catalyst portion 62 is provided rearward of the scroll exhaust passage member 65s. Only part of the catalyst portion 62 may be provided rearward of the scroll exhaust passage member 65s. At least part of the catalyst portion 62 is preferably provided rearward of the scroll exhaust passage member 65s.

As shown in FIG. 4, when viewed in the left or right direction, the catalyst portion 62 is provided on a line segment Lw1. The line segment Lw1 is a line segment which is the lowermost one among line segments connecting points on the outline of the engine main body 20 with points on the outline of the front wheel unit 2, when viewed in the left or right direction. When viewed in the left or right direction, the catalyst portion 62 is provided straight below a line segment Lw2. The line segment Lw2 is a line segment which is the uppermost one among line segments connecting points on the outline of the engine main body 20 with points on the outline of the front wheel unit 2, when viewed in the left or right direction. When viewed in the left or right direction, the catalyst portion 62 is provided in a rectangular region, two sides of which are the line segment Lw1 and the line segment Lw2. When viewed in the left or right direction, the catalyst portion 62 is provided in the above-described rectangular region and does not overlap the engine main body 20. To put it differently, when viewed in the left or right direction, the catalyst portion 62 is provided between the engine main body 20 and the front wheel unit 2. When viewed in the left or right direction, only part of the catalyst portion 62 may be provided between the engine main body 20 and the front wheel unit 2. For example, when viewed in the left or right direction, part of the catalyst portion 62 may overlap the engine main body 20. Furthermore, for example, when viewed in the left or right direction, part of the catalyst portion 62 may be provided straight below the line segment Lw1. When viewed in the left or right direction, at least part of the catalyst portion 62 is preferably provided between the engine main body 20 and the front wheel unit 2.

As shown in FIG. 4, when viewed in the left or right direction, a line segment connecting the lowermost end of the engine main body 20 with the lowermost end of the front wheel unit 2 is defined as a line segment Lw3. When viewed in the left or right direction, the lowermost end of the engine main body 20 has length in the front-rear direction. In FIG. 4, an end of the line segment Lw3 is at the front end of the lowermost end of the engine main body 20. However, an end of the line segment Lw3 may be at any position on the lowermost end of the engine main body 20. When viewed in the left or right direction, the catalyst portion 62 is provided on the line segment Lw3.

When viewed in the left or right direction, only part of the catalyst portion 62 may be provided on the line segment Lw3. When viewed in the left or right direction, at least part of the catalyst portion 62 is preferably provided on the line segment Lw3 and its extension.

As shown in FIG. 4, the catalyst portion 62 is provided below a horizontal plane Sw2. The horizontal plane Sw2 is a horizontal plane passing the center of the front wheel unit 2. Only part of the catalyst portion 62 may be provided below the horizontal plane Sw2. At least part of the catalyst portion 62 is preferably provided below the horizontal plane Sw2.

As shown in FIG. 5, the catalyst portion 62 is provided in a right part of the motorcycle 1. The center of the upstream end and the center of the downstream end of the catalyst portion 62 are not on the center C0 in the left-right direction of the motorcycle 1. The center of the upstream end and the center of the downstream end of the catalyst portion 62 are provided to the right of the center C0 in the left-right direction of the motorcycle 1. When viewed in the front or rear direction, the catalyst portion 62 is provided to the right of the center C0 in the left-right direction of the motorcycle 1. When viewed in the front or rear direction, a part of the catalyst portion 62 may be provided to the right of the center C0 in the left-right direction of the motorcycle 1 and the remaining part of the catalyst portion 62 may be provided to the left of the center C0 in the left-right direction of the motorcycle 1. The catalyst portion 62 and the main catalyst 62*a* are provided rightward of the turbine wheel 81. The main catalyst 62*a* is provided rightward of the waste gate valve actuator 72. The center C0 in the left-right direction of the motorcycle 1 is provided between the main catalyst 62*a* and the waste gate valve actuator 72. Furthermore, as shown in FIG. 3, when viewed in the front or rear direction, at least part of the catalyst portion 62 does not overlap the front wheel unit 2.

The downstream end of the catalyst portion 62 is connected to the upstream end of the downstream exhaust passage member 66. The flow direction of the exhaust gas in the downstream exhaust passage member 66 is along the front-rear direction. The downstream end of the downstream exhaust passage member 66 is connected to the upstream end of the muffler portion 67. The muffler portion 67 is a device for reducing noise due to exhaust gas.

In addition to the above-described oxygen sensor 76, the engine unit 11 includes sensors. The sensors include, for example, a sensor configured to detect pressure in the intake passage member 50. The sensors further include a sensor configured to detect temperature in the intake passage member 50. The sensors further include a sensor configured to detect temperature of coolant water in the cooling passage 22*b*. In addition to the oxygen sensor 76, the engine unit 11 may have an oxygen sensor provided at the downstream exhaust passage member 66 or the muffler portion 67. The sensors including the oxygen sensor 76 are connected to a controller (not illustrated). The controller is configured to control the operation of the engine unit 11 based on signals from the sensors. For example, the controller controls the operations of a low-pressure pump and the injector 39 based on signals from the sensors. By doing this, the controller controls a fuel injection amount and a fuel injection timing. Furthermore, the controller controls electric conduction to an ignition coil based on signals from the sensors. By doing this, the controller controls an ignition timing. The ignition timing indicates a timing at which the ignition plug 31 discharges electricity. When an oxygen sensor is provided at the downstream exhaust passage member 66 or the muffler portion 67, the controller may determine the deterioration of the main catalyst 62*a* based on at least a signal from this oxygen sensor.

Specific Example 1 of the embodiment of the present teaching has the following effects in addition to the effects obtained by the above-described embodiment of the present teaching.

When viewed in the A direction, the catalyst portion 62 is provided so that the flow direction C1 of the exhaust gas in the main catalyst 62*a* intersects with the reciprocating direction of the rod 72*r* of the waste gate valve actuator 72 to form an acute angle or an obtuse angle therebetween (see FIG. 1B). The A direction is orthogonal to both the central axis Ct1 of the connecting shaft 83 of the turbocharger 80 and the central axis Cy of the cylinder hole 22*a*. This arrangement reduces the distance in the left-right direction between the catalyst portion 62 and the waste gate valve actuator 72. The degree of freedom in layout of the catalyst portion 62 is therefore improved. It is therefore possible to provide the catalyst portion 62 at a position where increase in size of the motorcycle 1 in the up-down direction is restrained, even when the size of the main catalyst 62*a* is increased. As a result, it is possible to suppress the increase in size of the motorcycle 1 and at the same time to further improve the exhaust gas purification performance.

At least part of the catalyst portion 62 and at least part of the waste gate valve actuator 72 do not overlap the front wheel unit 2 when viewed in the front or rear direction. If the catalyst portion 62, the turbocharger 80, and the waste gate valve actuator 72 are provided in a concentrated manner in order to suppress upsizing of the straddled vehicle 1, there is concern over the decrease in durability of components due to heat. In some cases, increase in size of the vehicle is required to avoid the decrease in durability of components due to heat. In this regard, because at least part of the catalyst portion 62 and at least part of the waste gate valve actuator 72 do not overlap the front wheel unit 2 when viewed in the front or rear direction, the decrease in durability of components due to heat is avoidable. It is therefore possible to provide the catalyst portion 62 at a position where increase in size of the motorcycle 1 in the up-down direction is restrained, even when the size of the main catalyst 62*a* is increased. As a result, it is possible to suppress the increase in size of the motorcycle 1 and at the same time to further improve the exhaust gas purification performance.

The crankshaft 27 has a central axis Cr which is along the left-right direction. At least part of the catalyst portion 62 is provided forward of the central axis Cr of the crankshaft 27. The path length from the combustion chamber 30 to the catalyst portion 62 is therefore short. The temperature of exhaust gas flowing into the main catalyst 62*a* is higher. Thus, at the cold start of the engine unit 11, the time required for activation of the main catalyst 62*a* in an inactive state is shortened. As a result, it is possible to further improve the exhaust gas purification performance of the main catalyst 62*a*. The cold start of the engine unit 11 is to start the engine unit 11 in a state in which the temperature of the engine main body 20 is equal to or lower than the outside air temperature.

At least part of the catalyst portion 62 is provided below the horizontal plane Sw2 passing the center of the front wheel unit 2. If the entirety of the catalyst portion 62 is provided above the horizontal plane Sw2 passing the center of the front wheel unit 2, the position of the turbocharger 80 is considerably higher. As a result, the motorcycle 1 is increased in size in the up-down direction in order to secure a space where the turbocharger 80 is provided. It is possible to further restrain increase in size of the motorcycle 1 in the up-down direction by providing at least part of the catalyst portion 62 below the horizontal plane Sw2 passing the center of the front wheel unit 2.

The distance Dt1 in the left-right direction between the center C0 in the left-right direction of the motorcycle 1 and the turbine wheel 81 is shorter than the distance Dt2 in the left-right direction between the center C0 in the left-right direction of the motorcycle 1 and the compressor wheel 82. In other words, the turbine wheel 81 is closer to the center C0 in the left-right direction of the motorcycle 1 than to the compressor wheel 82. The exhaust ports 34*b* connected to the upstream exhaust passage member 61 are formed in the outer surface of the engine main body 20. The center in the left-right direction of the region where all exhaust ports 34*b* are provided is close to the center in the left-right direction of the motorcycle 1. Because the turbine wheel 81 is provided at a position close to the center in the left-right direction of the motorcycle 1, the path length from the upstream end of the upstream exhaust passage member 61 to the turbine wheel 81 is further shortened. It is therefore possible to shorten the path length from the combustion chamber 30 to the catalyst portion 62. The temperature of exhaust gas flowing into the main catalyst 62*a* is higher.

Thus, at the cold start of the engine unit 11, the time required for activation of the main catalyst 62a in an inactive state is shortened. As a result, it is possible to further improve the exhaust gas purification performance of the main catalyst 62a.

The catalyst portion 62 is provided leftward of or rightward of the turbine wheel 81. With this arrangement, when viewed in the front or rear direction, at least part of the catalyst portion 62 and at least part of the turbine wheel 81 are not lined up in the up-down direction. Assume that, when viewed in the front or rear direction, at least part of the catalyst portion 62 is provided straight below the turbine wheel 81 and is lined up with at least part of the turbine wheel 81 in the up-down direction. In this case, the path from the turbine wheel 81 to the downstream end of the upstream exhaust passage member 61 is bent in a substantially S shape when viewed in the front or rear direction. The path length of a passage member is typically long when the passage member has many bended portions. On this account, when the catalyst portion 62 is provided leftward of or rightward of the turbine wheel 81, the path length from the combustion chamber 30 to the catalyst portion 62 is short. The temperature of exhaust gas flowing into the main catalyst 62a is higher. Thus, at the cold start of the engine unit 11, the time required for activation of the main catalyst 62a in an inactive state is shortened. As a result, it is possible to further improve the exhaust gas purification performance of the main catalyst 62a.

The crankshaft 27 has a central axis Cr which is along the left-right direction. When viewed in the left or right direction, at least part of the scroll exhaust passage member 65s is provided forward of the linear line La2. The linear line La2 is a linear line which is orthogonal to the central axis Cy of the cylinder hole 22a and passes the central axis Cr of the crankshaft 27 when viewed in the left or right direction. With this arrangement, the path length from the upstream end of the upstream exhaust passage member 61 to the turbine wheel 81 is short as compared to cases where the entirety of the scroll exhaust passage member 65s is provided rearward of the linear line La2 when viewed in the left or right direction. As a result, the path length of a part of the upstream exhaust passage member 61, which is downstream of the turbine wheel 81, is long. Due to this, it is possible to further improve the degree of freedom in layout of the catalyst portion 62. It is therefore possible to provide the catalyst portion 62 at a position where increase in size of the motorcycle 1 in the up-down direction is restrained, even when the size of the main catalyst 62a is increased. As a result, it is possible to suppress the increase in size of the motorcycle 1 and at the same time to further improve the exhaust gas purification performance.

The catalyst portion 62 is provided below the turbine wheel 81. On this account, the degree of freedom in layout of the catalyst portion 62 is high as compared to cases where at least part of the catalyst portion 62 is provided above the lowermost end of the turbine wheel 81. It is therefore possible to provide the catalyst portion 62 at a position where increase in size of the motorcycle 1 in the up-down direction is restrained, even when the size of the main catalyst 62a is increased. As a result, it is possible to suppress the increase in size of the motorcycle 1 and at the same time to further improve the exhaust gas purification performance.

The central axis Cy of all cylinder holes 22a are along the up-down direction. This makes it easy to provide the catalyst portion 62 below the turbine wheel 81. As a result, it is possible to suppress the increase in size of the motorcycle 1 and at the same time to further improve the exhaust gas purification performance.

The catalyst portion 62 is provided such that the flow direction C1 of exhaust gas in the main catalyst 62a is along the horizontal direction. According to this arrangement, the length in the up-down direction of the catalyst portion 62 is shorter than the length in the front-rear direction of the catalyst portion 62. This makes it easy to secure a space straight below the engine main body 20, where the catalyst portion 62 is provided. With this arrangement, increase in size of the motorcycle 1 in the up-down direction can be restrained even when the main catalyst 62a is increased in size.

The crankshaft 27 has a central axis Cr which is along the left-right direction. When viewed in the left or right direction, at least part of the catalyst portion 62 is provided rearward of the linear line La2. The linear line La2 is a linear line which is orthogonal to the central axis Cy of the cylinder hole 22a and passes the central axis Cr of the crankshaft 27 when viewed in the left or right direction. In addition, the catalyst portion 62 is provided such that the flow direction C1 of exhaust gas in the main catalyst 62a is along the horizontal direction. Assume that the entirety of such a catalyst portion 62 is provided forward of the linear line La2 when viewed in the left or right direction. In such a case, the front-most end of the catalyst portion 62 may be significantly forward of the front-most end of the engine main body 20. To secure a sufficient distance between the front wheel unit 2 and the catalyst portion 62, it is necessary to increase the size of the motorcycle 1 in the front-rear direction. It is therefore possible to restrain increase in size of the motorcycle 1 in the front-rear direction by providing at least part of the catalyst portion 62 at a position rearward of the linear line La2 when viewed in the left or right direction.

The engine unit 11 includes the injector 39 which is configured to supply fuel to the combustion chamber 30. With this arrangement, the temperature of the combustion chamber 30 is lowered by heat of evaporation of the fuel. As a result, knocking is unlikely to occur even if the compression ratio is increased. It is therefore possible to increase the compression ratio. As the compression ratio is increased, the fuel consumption can be improved.

When viewed in the left or right direction, the turbine wheel 81 does not overlap the vehicle body frame 4. If at least part of the turbine wheel 81 overlaps the vehicle body frame when viewed in the left or right direction, the position of the turbocharger 80 is higher. When the position of the turbocharger 80 is high, the motorcycle 1 is increased in size in the up-down direction in order to secure a space where the turbocharger 80 is provided. It is therefore possible to restrain increase in size of the motorcycle 1 in the up-down direction by arranging the turbine wheel 81 not to overlap the vehicle body frame when viewed in the left or right direction.

The upstream exhaust passage member 61 includes the plurality of independent exhaust passage members 64 and the upstream collective exhaust passage member 65. The independent exhaust passage member 64 is equivalent to an external independent exhaust passage member of the present teaching. The upstream collective exhaust passage member 65 is equivalent to an external upstream collective exhaust passage member of the present teaching. The independent exhaust passage members 64 are connected to the engine main body 20. The turbine wheel 81 is provided in the upstream collective exhaust passage member 65. The upstream collective exhaust passage member 65 is connected to the downstream ends of the independent exhaust passage members 64 and the upstream end of the catalyst portion 62. The upstream collective exhaust passage member 65 gathers (merges) the exhaust gas discharged from the independent exhaust passage members 64. The passage member by which the exhaust gas exhausted from the combustion chambers 30 is gathered (merged) is therefore not provided at the engine main body 20. Assume that the passage member by which the exhaust gas exhausted from the combustion chambers 30 is gathered (merged) is provided at the engine main body 20. In this case, pressure of exhaust gas exhausted from one combustion chamber 30 may obstruct the exhaust of exhaust gas from another combustion chamber 30. The flow rate and pressure of the exhaust gas may therefore be decreased. This causes decrease in an engine output. When the flow rate and pressure of exhaust gas decrease, the rotation speed of the turbine wheel 81 decreases. As a result, the intake efficiency becomes lower. The decrease in intake efficiency results in deterioration in fuel consumption and further decrease in engine output. Because the upstream exhaust passage member 61 includes the plurality of independent exhaust passage members 64 and the upstream collective exhaust passage member 65, the decrease in output and the deterioration in fuel consumption can be prevented.

(Specific Example 2 of Embodiment of Present Teaching)

Next, Specific Example 2 of the above-described embodiment of the present teaching will be described with reference to FIG. 10. Basically, Specific Example 2 of the embodiment of the present teaching encompasses all features of the embodiment of the present teaching described above. Items identical with those in the embodiment above of the present teaching and Specific Example 1 are not explained again. The following will describe arrangements which are different from those of the above-described embodiment of the present teaching and Specific Example 1.

As shown in FIG. 10, an engine unit of a motorcycle of Specific Example 2 of the embodiment includes a downstream sub-catalyst 47D and an upstream sub-catalyst 47U. The arrangements other than this are identical with those in Specific Example 1 of the embodiment. Hereinafter, the upstream sub-catalyst 47U and the downstream sub-catalyst 47D may be collectively termed as sub-catalysts.

The upstream sub-catalyst 47U is provided upstream of the catalyst portion 62. The upstream sub-catalyst 47U is provided in the upstream exhaust passage member 61. The upstream sub-catalyst 47U is provided in at least one of the independent exhaust passage members 64. The upstream sub-catalyst 47U may be provided in the upstream collective exhaust passage member 65. The upstream sub-catalyst 47U may be provided in at least one of the internal exhaust passage members 34. The upstream sub-catalyst 47U is provided upstream of the oxygen sensor 76.

The downstream sub-catalyst 47D is provided downstream of the catalyst portion 62. The downstream sub-catalyst 47D is provided in the downstream collective exhaust passage member 63. The downstream sub-catalyst 47D is provided in the downstream exhaust passage member 66. The downstream sub-catalyst 47D may be provided in the muffler portion 67.

The sub-catalysts 47U and 47D purify exhaust gas. The sub-catalysts 47U and 47D include the same catalytic material as the main catalyst 62a. The sub-catalysts 47U and/or 47D may have a porous structure in the same manner as the main catalyst 62a. The sub-catalysts 47U and/or 47D may not have a porous structure. The following is an example of a sub-catalyst 47U or 47D which does not have a porous structure. For example, the sub-catalyst 47U or 47D is formed solely of a catalytic material attached to an inner surface of the downstream collective exhaust passage member 63. In such a case, the substrate to which the catalytic material of the sub-catalyst 47U or 47D is attached is the downstream collective exhaust passage member 63. The following is another example of a sub-catalyst 47U or 47D which does not have a porous structure. For example, the sub-catalyst 47U or 47D is formed by attaching a catalytic material to a plate-shaped substrate. The cross-sectional shape orthogonal to the exhaust gas flow direction of the plate-shaped substrate is, for example, a circular shape, a C shape, or an S shape.

In Specific Example 2 of the embodiment, the main catalyst 62a purifies the exhaust gas most in the exhaust paths 69. In other words, the main catalyst 62a purifies more of the exhaust gas exhausted from the combustion chamber 30 in the exhaust paths 69 than each of the sub-catalysts 47U and 47D. That is, the degree of contribution to the purification by each of the sub-catalysts 47U and 47D of the exhaust gas is lower than that of the main catalyst 62a. The degree of contribution to the purification by the main catalyst 62a, the upstream sub-catalyst 47U, and the downstream sub-catalyst 47D may be measured by the following method.

The engine unit of Specific Example 2 of the embodiment is driven, and in a warm-up state, the density of harmful substances in the exhaust gas exhausted from the atmosphere discharge port 67a is measured. The warm-up state refers to a state in which the engine main body 20 is sufficiently warmed up. The method of measuring the exhaust gas is in compliance with European regulations. When the engine unit is in the warm-up state, the main catalyst 62a and the sub-catalysts 47U and 47D are hot and activated. The main catalyst 62a and the sub-catalysts 47U and 47D can therefore sufficiently perform their purification performances in this warm-up state.

Subsequently, the downstream sub-catalyst 47D is detached from the engine unit of Specific Example 2 of the embodiment, and only the substrate of the downstream sub-catalyst 47D is attached. The engine unit in this state is assumed to be a measurement engine unit A. The measurement engine unit A is driven, and in a warm-up state, the density of harmful substances in the exhaust gas exhausted from the atmosphere discharge port 67a is measured.

In this connection, the downstream sub-catalyst 47D may be structured such that a catalytic material is directly attached to the inner surface of the downstream collective exhaust passage member 63. In such a case, providing only the substrate of the downstream sub-catalyst 47D indicates that no catalytic material is attached to the inner surface of the downstream collective exhaust passage member 63.

Subsequently, the main catalyst 62a of the measurement engine unit A is detached, and only the substrate of the main catalyst 62a is attached. The engine unit in this state is assumed to be a measurement engine unit B. The measurement engine unit B is driven, and in a warm-up state, the density of harmful substances in the exhaust gas exhausted from the atmosphere discharge port 67a is measured.

Subsequently, the upstream sub-catalyst 47U of the measurement engine unit B is detached, and only the substrate of the upstream sub-catalyst 47U is attached. The engine unit in this state is assumed to be a measurement engine unit C. The measurement engine unit C is driven, and in a warm-up state, the density of harmful substances in the exhaust gas exhausted from the atmosphere discharge port 67a is measured.

The measurement engine unit C includes neither the main catalyst 62a nor the sub-catalysts 47U and 47D. The measurement engine unit B includes the upstream sub-catalyst 47U but does not include the main catalyst 62a and the downstream sub-catalyst 47D. The measurement engine unit A includes the main catalyst 62a and the upstream sub-catalyst 47U but does not include the downstream sub-catalyst 47D. On this account, the degree of contribution to the purification of the downstream sub-catalyst 47D is calculated from a difference between a measurement result of the engine unit of Specific Example 2 of the embodiment and a measurement result of the measurement engine unit A. Furthermore, the degree of contribution to the purification of the main catalyst 62a is calculated from a difference between a measurement result of the measurement engine unit A and a measurement result of the measurement engine unit B. Furthermore, the degree of contribution to the purification of the upstream sub-catalyst 47U is calculated from a difference between a measurement result of the measurement engine unit B and a measurement result of the measurement engine unit C.

The main catalyst 62a purifies exhaust gas most in the exhaust paths 69. As long as this condition is satisfied, the purification capability of the sub-catalysts 47 may be higher than or lower than that of the main catalyst 62a. The purification capability of each of the sub-catalysts 47U and 47D is lower than that of the purification capability of the main catalyst 62a in the following case. The exhaust gas exhausted from the atmosphere discharge port 67a when only the sub-catalysts are provided is purified more than when only the main catalyst 62a is provided.

An upstream catalyst is typically deteriorated more rapidly than a downstream catalyst. For this reason, when the time of use is long, the magnitude correlation between the degree of contribution to the purification of the main catalyst 62a and the degree of contribution to the purification of the downstream sub-catalyst 47D may be reversed. The degree of contribution to the purification of the main catalyst 62a is regarded to be higher than that of the downstream sub-catalyst 47D, in the following state. If the degree of contribution to the purification of the main catalyst 62a is higher than that of the downstream sub-catalyst 47D when the running distance has not reached a predetermined distance (e.g., 1000 km), it is regarded that the degree of contribution to the purification of the main catalyst 62a is higher than that of the downstream sub-catalyst 47D.

The volume of the main catalyst 62a is preferably larger than the volume of each of the sub-catalysts 47U and 47D. The surface area of the main catalyst 62a is preferably larger than the surface area of each of the sub-catalysts 47U and 47D. The amount of noble metal in the main catalyst 62a is preferably larger than the amount of noble metal in the sub-catalysts.

The engine unit may include only one of the upstream sub-catalyst 47U and the downstream sub-catalyst 47D. In this case, the degree of contribution to the purification can be calculated by a method similar to the above.

According to Specific Example 2 of the embodiment, the exhaust gas purification performance is improved as compared to cases where no sub-catalyst 47U and/or 47D is provided. Furthermore, the main catalyst 62a is downsized while the exhaust gas purification performance of purifying the exhaust gas is maintained, as compared to cases where no sub-catalyst 47U and/or 47D is provided. As a result, it is possible to suppress the increase in size of the motorcycle 1 and at the same time to further improve the exhaust gas purification performance.

(Modification 1 of Embodiment of Present Teaching)

Modification 1 of the embodiment of the present teaching will be described with reference to FIG. 11, FIG. 12, and FIG. 13. Basically, Modification 1 of the embodiment of the present teaching encompasses all features of the embodiment of the present teaching described above. Items identical with those in the embodiment above of the present teaching and Specific Example 1 are not explained again. The following will describe arrangements which are different from those of the above-described embodiment of the present teaching and Specific Examples 1 and 2.

Figure 11:
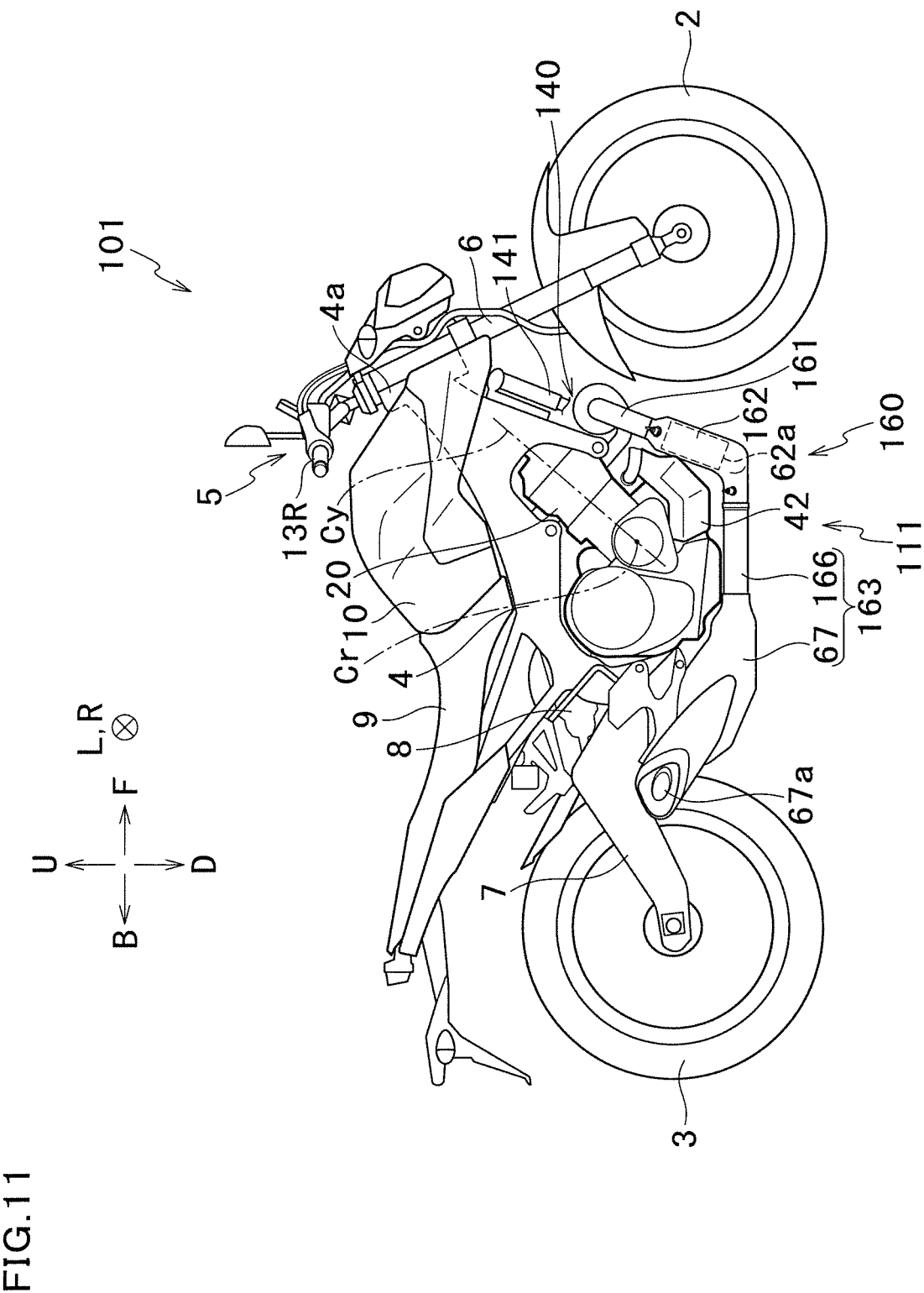
FIG. 11 is a right side view of a motorcycle of Modification 1 of the embodiment of the present teaching.

As shown in FIG. 11, in a motorcycle 101 of Modification 1 of the embodiment, the structure of an engine unit 111 is different from that of the engine unit 11 of Specific Example 1 of the embodiment. The arrangements other than this are substantially identical with those in Specific Example 1 of the embodiment. The engine unit 111 includes an engine main body 20, an exhaust passage member 160, an intake passage member 150 (see FIG. 13), and a water cooling device 140 (see FIG. 11). As shown in FIG. 11, a radiator 141 of the water cooling device 140 is shorter than the radiator 41 of Specific Example 1 of the embodiment in the up-down direction. Furthermore, the lower end of the radiator 141 is above the lower end of the radiator 41. The arrangements of the water cooling device 140 other than this are substantially identical with those of the water cooling device 40 of Specific Example 1 of the embodiment. FIG. 11 does not show part of the water cooling device 140. As shown in FIG. 13, the shape of a main intake passage member 152 of the intake passage member 150 is different from the shape of the main intake passage member 52 of Specific Example 1 of the embodiment. The arrangements of the intake passage member 150 other than this are substantially identical with those of the intake passage member 50 in Specific Example 1 of the embodiment shown in FIG. 6.

Figure 12:
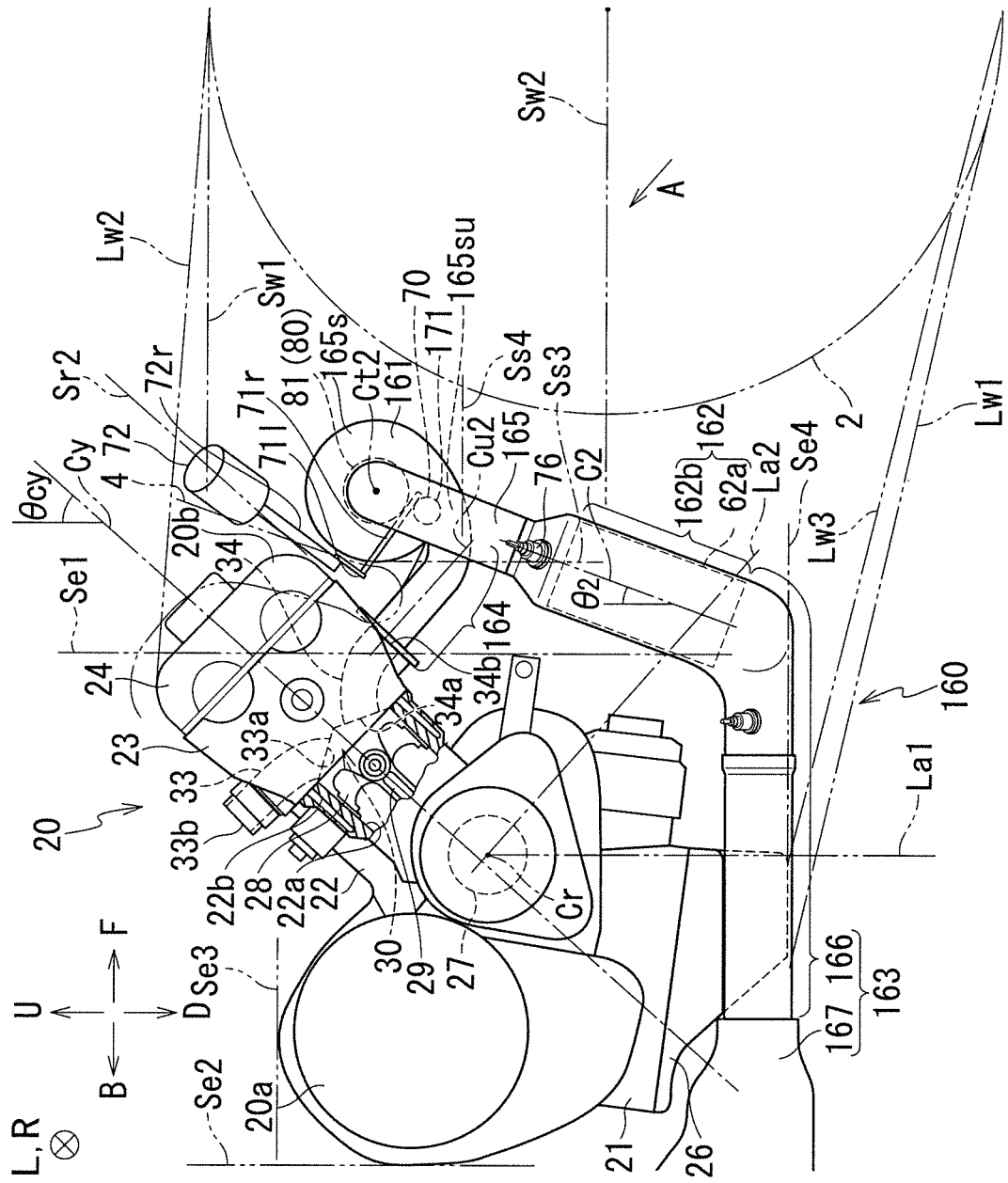
FIG. 12 is a right side view of a part of an engine unit of the motorcycle according to Modification 1 of the embodiment of the present teaching.

As shown in FIG. 12, the exhaust passage member 160 includes an upstream exhaust passage member 161, a catalyst portion 162, and a downstream collective exhaust passage member 163. The upstream exhaust passage member 161 includes two independent exhaust passage members 164 and an upstream collective exhaust passage member 165. The downstream collective exhaust passage member 163 includes a downstream exhaust passage member 166 and a muffler portion 67. The independent exhaust passage member 164 is different in shape from the independent exhaust passage member 64 of Specific Example 1 of the embodiment. The upstream collective exhaust passage member 165 is different in shape from the upstream collective exhaust passage member 65 of Specific Example 1 of the embodiment. The downstream exhaust passage member 166 is different in shape from the downstream exhaust passage member 66 of Specific Example 1 of the embodiment. The arrangements of the exhaust passage member 160 other than this are substantially identical with those of the exhaust passage member 60 in Specific Example 1 of the embodiment shown in FIG. 6. The independent exhaust passage member 164 is equivalent to an external independent exhaust passage member of the present teaching. The upstream collective exhaust passage member 165 is equivalent to an external upstream collective exhaust passage member of the present teaching.

The engine unit 111 includes a turbocharger 80. As shown in FIG. 13, a turbine wheel 81 of the turbocharger 80 is provided in the upstream collective exhaust passage member 165. The compressor wheel 82 of the turbocharger 80 is provided in the main intake passage member 152. The turbine wheel 81 is provided to the right of the compressor wheel 82. The central axis Ct2 of a connecting shaft 83 is substantially parallel to the left-right direction. The upstream collective exhaust passage member 165 includes a scroll exhaust passage member 165s. The main intake passage member 152 includes a scroll intake passage member 152s. The scroll exhaust passage member 165s entirely surrounds the outer circumference of the turbine wheel 81. The size of the scroll exhaust passage member 165s is identical with the scroll exhaust passage member 65s of Specific Example 1 of the embodiment. The scroll intake passage member 152s entirely surrounds the outer circumference of the compressor wheel 82. The size of the scroll intake passage member 152s is substantially identical with the scroll intake passage member 52s of Specific Example 1 of the embodiment. The flows of exhaust gas and air in the turbocharger 80 are substantially identical with those in Specific Example 1 of the embodiment.

As shown in FIG. 12, the exhaust passage member 160 includes the bypass exhaust passage member 170. The bypass exhaust passage member 170 is connected to the upstream collective exhaust passage member 165 so as to bypass the turbine wheel 81. Part of the inner surface of the bypass exhaust passage member 170 may be part of the outer surface of the scroll exhaust passage member 165s. The waste gate valve 71 is provided in the bypass exhaust passage member 170. At least part of the waste gate valve 71 is provided below the central axis Ct2. At least part of the waste gate valve 71 may be provided above the central axis Ct2.

The waste gate valve 71 is driven by the waste gate valve actuator 72. The waste gate valve actuator 72 may be provided at a position indicated by full lines in FIG. 13, or at any of positions indicated by two-dot chain lines. The waste gate valve 71 is connected to a rod 72r of the waste gate valve actuator 72 via a rotational axis portion 71r and a lever 71l. When viewed in the front or reardirection, at least part of the waste gate valve actuator 72 does not overlap the front wheel unit 2.

The waste gate valve actuator 72 is arranged such that the rod 72r is able to reciprocate in a direction along a virtual plane Sr2 shown in FIG. 12. The virtual plane Sr2 is a plane parallel to both the central axis Ct2 of the connecting shaft 83 of the turbocharger 80 and the cylinder axis Cy. The waste gate valve actuator 72 provided at any of positions by indicated by the two-dot chain lines in FIG. 13 is also arranged to allow the rod 72r to reciprocate along a virtual plane which is parallel to both the central axis Ct2 of the connecting shaft 83 of the turbocharger 80 and the cylinder axis Cy. This virtual plane may be identical with or different from the virtual plane Sr2. As shown in FIG. 12, when viewed in the left or right direction, the longitudinal direction of the rod 72r is along the up-down direction. To be more specific, when viewed in the left or right direction, the longitudinal direction of the rod 72r is inclined in the front-rear direction relative to the up-down direction. As shown in FIG. 13, when viewed in the front or rear direction, the longitudinal direction of the rod 72r indicated by full lines is along the up-down direction. To be more specific, when viewed in the front or rear direction, the longitudinal direction of the rod 72r indicated by full lines is inclined in the left-right direction relative to the up-down direction. When viewed in the front or rear direction, the longitudinal direction of the rod 72r may be parallel to the up-down direction. When viewed in the front or rear direction, the longitudinal direction of the rod 72r may be along the left-right direction.

Figure 13:
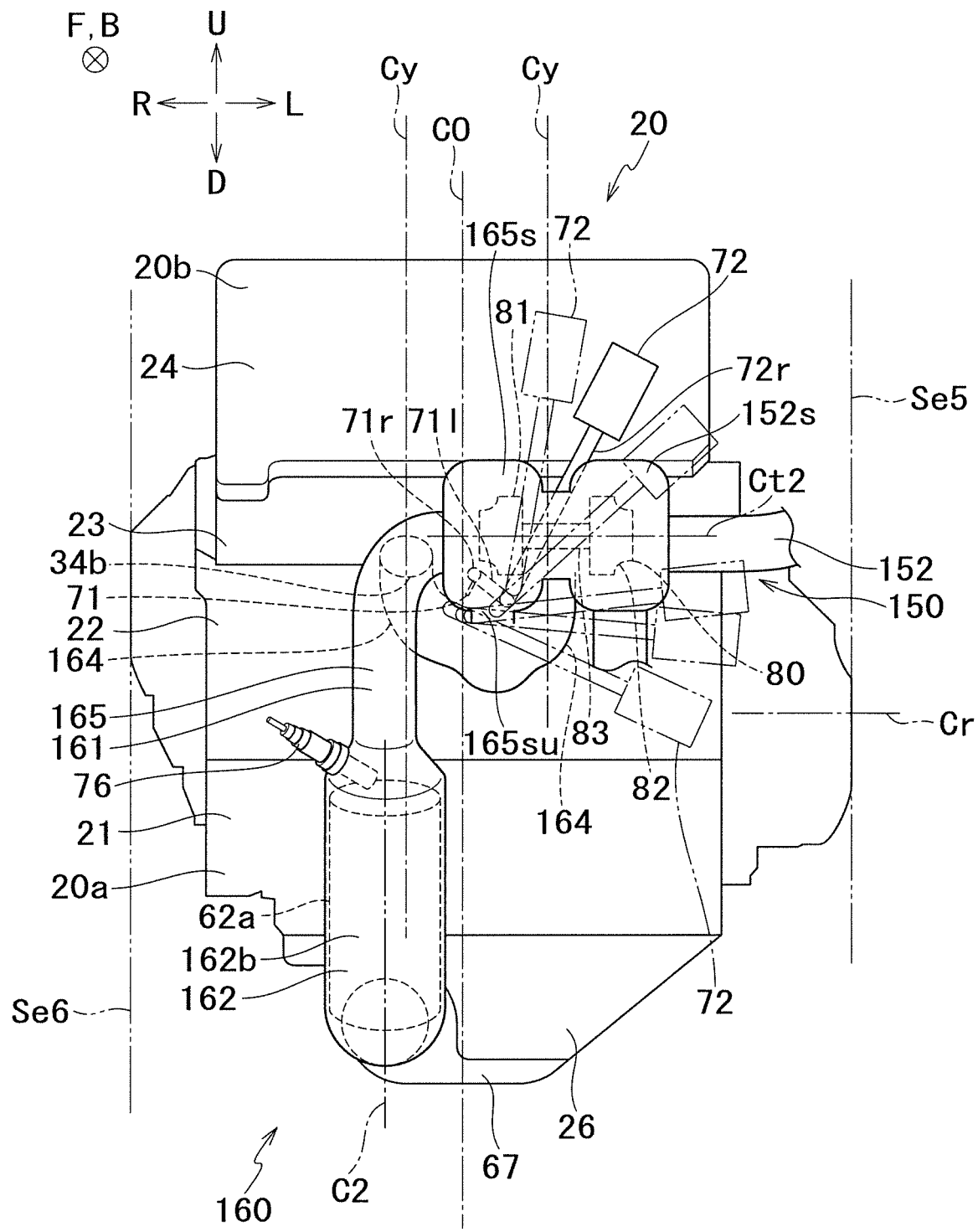
FIG. 13 is a front view of a part of the engine unit of the motorcycle according to Modification 1 of the embodiment of the present teaching.

As shown in FIGS. 12 and 13, the scroll exhaust passage member 165s and the scroll intake passage member 152s are partially provided above the exhaust port 34b. The entirety of the scroll exhaust passage member 165s may be provided above the exhaust port 34b. At least part of the scroll exhaust passage member 165s is preferably provided above the exhaust port 34b. Similarly, at least part of the scroll intake passage member 152s is preferably provided above the exhaust port 34b. At least part of the scroll exhaust passage member 165s may be provided below the exhaust port 34b. Similarly, at least part of the scroll intake passage member 152s may be provided below the exhaust port 34b. A plane passing through the rearmost end of the scroll exhaust passage member 165s and orthogonal to the front-rear direction is defined as a plane Ss3. The exhaust port 34b is provided rearward of the plane Ss3. In other words, the scroll exhaust passage member 165s is provided forward of the exhaust port 34b. Similarly, the scroll intake passage member 152s is provided forward of the exhaust port 34b. As a matter of course, the turbine wheel 81 is provided forward of the exhaust port 34b.

As shown in FIG. 12, the upstream end 165su of the scroll exhaust passage member 165s is provided at lower part of the scroll exhaust passage member 165s. The upstream end 165su of the scroll exhaust passage member 165s is provided forward of the exhaust port 34b. At least part of the upstream end 165su of the scroll exhaust passage member 165s is provided below the exhaust port 34b. The flow direction of exhaust gas at the upstream end 165su of the scroll exhaust passage member 165s is along the front-rear direction. The upstream end 165su of the scroll exhaust passage member 165s may be provided at rear part or front part of the scroll exhaust passage member 165s. The downstream end of the scroll exhaust passage member 165s is provided at central part of the scroll exhaust passage member 165s. As shown in FIG. 13, the downstream end of the scroll intake passage member 152s is provided at lower part of the scroll intake passage member 152s. The downstream end of the scroll intake passage member 152s may be provided at upper part of the scroll intake passage member 152s. The downstream end of the scroll intake passage member 152s may be provided at a rear part or front part of the scroll intake passage member 152s. The upstream end of the scroll intake passage member 152s may be provided at a central part of the scroll intake passage member 152s.

As shown in FIG. 12, an axis passing the center of the exhaust port 34b when viewed in the left or right direction is termed a central axis Cu2. The direction of the central axis Cu2 is identical with the flow direction of exhaust gas at the exhaust port 34b. When viewed in the left or right direction, the scroll exhaust passage member 165s and the scroll intake passage member 152s are provided above the central axis Cu2. As a matter of course, when viewed in the left or right direction, the turbine wheel 81 is provided above the central axis Cu2. When viewed in the left or right direction, part of the scroll exhaust passage member 165s may be provided below the central axis Cu2. At least part of the scroll exhaust passage member 165s is preferably provided above the central axis Cu2. Similarly, at least part of the scroll intake passage member 152s is preferably provided above the central axis Cu2.

As shown in FIGS. 12 and 13, when viewed in the left or right direction, the scroll exhaust passage member 165s and the scroll intake passage member 152s are provided in front of the engine main body 20. When viewed in the left or right direction, the entirety of the scroll exhaust passage member 165s and the entirety of the scroll intake passage member 152s are lined up with the engine main body 20 in the front-rear direction. Furthermore, when viewed in the left or right direction, the scroll exhaust passage member 165s and the scroll intake passage member 152s are provided forward of the engine main body 20. As a matter of course, when viewed in the left or right direction, the scroll exhaust passage member 165s and the scroll intake passage member 152s are provided forward of the crankcase member 20a. The scroll exhaust passage member 165s and the scroll intake passage member 152s are provided between the plane Se3 and the plane Se4. The plane Se3 is a plane passing through the uppermost end of the crankcase member 20a and orthogonal to the up-down direction. The plane Se4 is a plane passing through the rearmost end of the crankcase member 20a and orthogonal to the up-down direction. When viewed in the left or right direction, the scroll exhaust passage member 165s and the scroll intake passage member 152s are provided in front of the crankcase member 20a. When viewed in the left or right direction, the scroll exhaust passage member 165s and the scroll intake passage member 152s are entirely lined up with the crankcase member 20a in the front-rear direction. As a matter of course, when viewed in the left or right direction, the turbine wheel 81 is provided in front of the crankcase member 20a. When viewed in the left or right direction, the entirety of the turbine wheel 81 is lined up with the crankcase member 20a in the front-rear direction. When viewed in the left or right direction, part of the scroll exhaust passage member 165s may not overlap the crankcase member 20a in the front-rear direction. For example, at least part of the scroll exhaust passage member 165s may be provided above the plane Se3. When viewed in the left or right direction, at least part of the scroll exhaust passage member 165s is preferably lined up with the crankcase member 20a in the front-rear direction. Similarly, when viewed in the left or right direction, at least part of the scroll intake passage member 152s is preferably lined up with the crankcase member 20a in the front-rear direction. When viewed in the left or right direction, at least part of the turbine wheel 81 is preferably lined up with the crankcase member 20a in the front-rear direction.

As shown in FIG. 13, the scroll exhaust passage member 165s and the scroll intake passage member 152s are provided between the plane Se5 and the plane Se6. The plane Se5 is a plane passing through the leftmost end of the crankcase member 20a and orthogonal to the left-right direction. The plane Se6 is a plane passing through the rightmost end of the crankcase member 20a and orthogonal to the left-right direction. When viewed in the front or rear direction, the scroll exhaust passage member 165s and the scroll intake passage member 152s overlap the crankcase member 20a. As a matter of course, when viewed in the front or rear direction, the turbocharger 80 overlaps the crankcase member 20a. When viewed in the front or rear direction, at least part of the scroll intake passage member 152s may not overlap the engine main body 20. When viewed in the front or rear direction, part of the scroll exhaust passage member 165s may not overlap the engine main body 20. When viewed in the front or rear direction, at least part of the scroll exhaust passage member 165s preferably overlaps the engine main body 20. The scroll exhaust passage member 165s and the scroll intake passage member 152s are provided in front of the crankcase member 20a. The scroll exhaust passage member 165s and the scroll intake passage member 152s are entirely lined up with the crankcase member 20a in the front-rear direction. As a matter of course, the turbocharger 80 is provided in front of the crankcase member 20a. The entirety of the turbocharger 80 is lined up with the crankcase member 20a in the front-rear direction. When viewed in the front or rear direction, part of the scroll exhaust passage member 165s may not overlap the crankcase member 20a. At least part of the scroll intake passage member 152s may not be lined up with the crankcase member 20a in the front-rear direction.

As shown in FIG. 12, when viewed in the left or right direction, the scroll exhaust passage member 165s and the scroll intake passage member 152s are provided forward of the linear line La1. In other words, the scroll exhaust passage member 165s and the scroll intake passage member 152s are provided forward of the crankshaft axis Cr. When viewed in the left or right direction, the entirety of the scroll exhaust passage member scroll exhaust passage member 165s and the entirety of the scroll intake passage member 152s are provided forward of (above) the linear line La2. The linear line La2 is a linear line orthogonal to the cylinder axis Cy and passes the crankshaft axis Cr when viewed in the left or right direction. Furthermore, the scroll exhaust passage member 165s and the scroll intake passage member 152s are provided above the crankshaft axis Cr. Only part of the scroll exhaust passage member 165s may be provided above the crankshaft axis Cr. At least part of the scroll exhaust passage member 165s is preferably provided above the crankshaft axis Cr. At least part of the scroll intake passage member 152s is preferably provided above the crankshaft axis Cr.

As shown in FIGS. 12 and 13, when viewed in the left or right direction, the scroll exhaust passage member 165s and the scroll intake passage member 152s do not overlap the vehicle body frame 4. As a matter of course, when viewed in the left or right direction, the turbine wheel 81 does not overlap the vehicle body frame 4. When viewed in the left or right direction, at least part of the scroll exhaust passage member 165s may overlap the vehicle body frame 4. When viewed in the left or right direction, at least part of the scroll intake passage member 152s may overlap the vehicle body frame 4. When viewed in the left or right direction, at least part of the turbine wheel 81 may overlap the vehicle body frame 4. The shape of the vehicle body frame 4 is not limited to the shape shown in FIG. 11.

As shown in FIGS. 12 and 13, when viewed in the left or right direction, the scroll exhaust passage member 165s and the scroll intake passage member 152s are provided in a rectangular region, two sides of which are the line segment Lw1 and the line segment Lw2. The line segment Lw1 is a line segment which is the lowermost one among line segments connecting points on the outline of the engine main body 20 with points on the outline of the front wheel unit 2, when viewed in the left or right direction. The line segment Lw2 is a line segment which is the uppermost one among line segments connecting points on the outline of the engine main body 20 with points on the outline of the front wheel unit 2, when viewed in the left or right direction. When viewed in the left or right direction, the scroll exhaust passage member 165s and the scroll intake passage member 152s are provided in the above-described rectangular region and do not overlap the engine main body 20. In other words, when viewed in the left or right direction, the scroll exhaust passage member 165s and the scroll intake passage member 152s are provided between the engine main body 20 and the front wheel unit 2. When viewed in the left or right direction, only part of the scroll exhaust passage member 165s may be provided between the engine main body 20 and the front wheel unit 2. For example, when viewed in the left or right direction, part of the scroll exhaust passage member 165s may overlap the engine main body 20. For example, part of the scroll exhaust passage member 165s may be provided above the line segment Lw2. When viewed in the left or right direction, at least part of the scroll exhaust passage member 165s is preferably provided between the engine main body 20 and the front wheel unit 2. Being similar to the scroll exhaust passage member 165s, when viewed in the left or right direction, at least part of the scroll intake passage member 152s is preferably provided between the engine main body 20 and the front wheel unit 2.

As shown in FIGS. 12 and 13, the scroll exhaust passage member 165s and the scroll intake passage member 152s are provided below the horizontal plane Sw1. The horizontal plane Sw1 is a horizontal plane passing the upper end of the front wheel unit 2. As a matter of course, the turbine wheel 81 is provided below the horizontal plane Sw1. Part of the scroll exhaust passage member 165s may be provided above the horizontal plane Sw1. At least part of the scroll exhaust passage member 165s is preferably provided below the horizontal plane Sw1. Being similar to the scroll exhaust passage member 165s, at least part of the scroll intake passage member 152s is preferably provided below the horizontal plane Sw1. Part of the turbine wheel 81 may be provided above the horizontal plane Sw1. At least part of the turbine wheel 81 is preferably provided below the horizontal plane Sw1.

As shown in FIGS. 12 and 13, the scroll exhaust passage member 165s and the scroll intake passage member 152s are provided above the horizontal plane Sw2. The horizontal plane Sw2 is a horizontal plane passing the center of the front wheel unit 2.

In the left-right direction, the positions of the scroll exhaust passage member 165s and the scroll intake passage member 152s are substantially identical with the positions of the scroll exhaust passage member 65s and the scroll intake passage member 52s of Specific Example 1 of the embodiment. The distance in the left-right direction between the center C0 in the left-right direction of the motorcycle 101 and the turbine wheel 81 is therefore shorter than the distance in the left-right direction between the center C0 in the left-right direction of the motorcycle 101 and the compressor wheel 82.

As shown in FIGS. 12 and 13, the catalyst portion 162 includes the main catalyst 62a and a cylinder member 162b. The cylinder member 162b is connected to the downstream end of the upstream collective exhaust passage member 165 and the upstream end of the downstream exhaust passage member 166. The cylinder member 162b may be integrally molded with part of the upstream collective exhaust passage member 165. Alternatively, the cylinder member 162b may be integrally molded with part of the downstream exhaust passage member 166. No catalysts other than the main catalyst 62a are provided in the exhaust passage member 160.

The central axis C2 of the main catalyst 62a is coaxial with the central axis of the catalyst portion 162. The central axis of the catalyst portion 162 indicates the central axis of the cylinder member 162b. The length of the catalyst portion 162 in the exhaust gas flow direction is the same as the length of the main catalyst 62a in the exhaust gas flow direction. The flow direction of the exhaust gas in the main catalyst 62a is substantially identical with the direction of the central axis C2 of the main catalyst 62a. Hereinafter, the flow direction of the exhaust gas in the main catalyst 62a may be referred to as the flow direction C2 of exhaust gas.

As shown in FIG. 12, when viewed in the left or right direction, the central axis C2 of the main catalyst 62a is inclined in the front-rear direction relative to the up-down direction. The inclination angle of the central axis C2 of the main catalyst 62a with respect to the up-down direction when viewed in the left or right direction is defined as the inclination angle θ2. The inclination angle θ2 is not limited to the angle shown in FIG. 12. The inclination angle θ2 is greater than 0 degrees. The inclination angle θ2 is equal to or smaller than 45 degrees. On this account, when viewed in the left or right direction, the central axis C2 of the main catalyst 62a is along the up-down direction. To put it differently, when viewed in the left or right direction, the flow direction C2 of exhaust gas in the main catalyst 62a is along the up-down direction. The inclination angle θ2 may be 0 degrees. The inclination angle θ2 may be greater than 45 degrees. To put it differently, when viewed in the left or right direction, the flow direction C2 of exhaust gas in the main catalyst 62a may be along the front-rear direction. As shown in FIG. 13, when viewed in the front or rear direction, the flow direction C2 of exhaust gas in the main catalyst 62a is along the up-down direction. To be more specific, when viewed in the front or rear direction, the flow direction C2 of exhaust gas in the main catalyst 62a is substantially parallel to the up-down direction. When viewed in the front or rear direction, the flow direction C2 of exhaust gas in the main catalyst 62a may be inclined in the left-right direction relative to the up-down direction. Although not illustrated, when viewed in the up or down direction, the flow direction C2 of exhaust gas in the main catalyst 62a is along the front-rear direction. When viewed in the up or down direction, the flow direction C2 of exhaust gas in the main catalyst 62a may be along the left-right direction. The flow direction C2 of exhaust gas in the main catalyst 62a is along the up-down direction.

As shown in FIG. 12, when viewed in the left or right direction, the flow direction C2 of exhaust gas in the main catalyst 62a is along the direction parallel to the cylinder axis Cy. As shown in FIG. 13, when viewed in the front or rear direction, the flow direction C2 of exhaust gas in the main catalyst 62a is along the direction parallel to the cylinder axis Cy. The flow direction C2 of exhaust gas in the main catalyst 62a is therefore along the direction parallel to the cylinder axis Cy.

Figure 14:
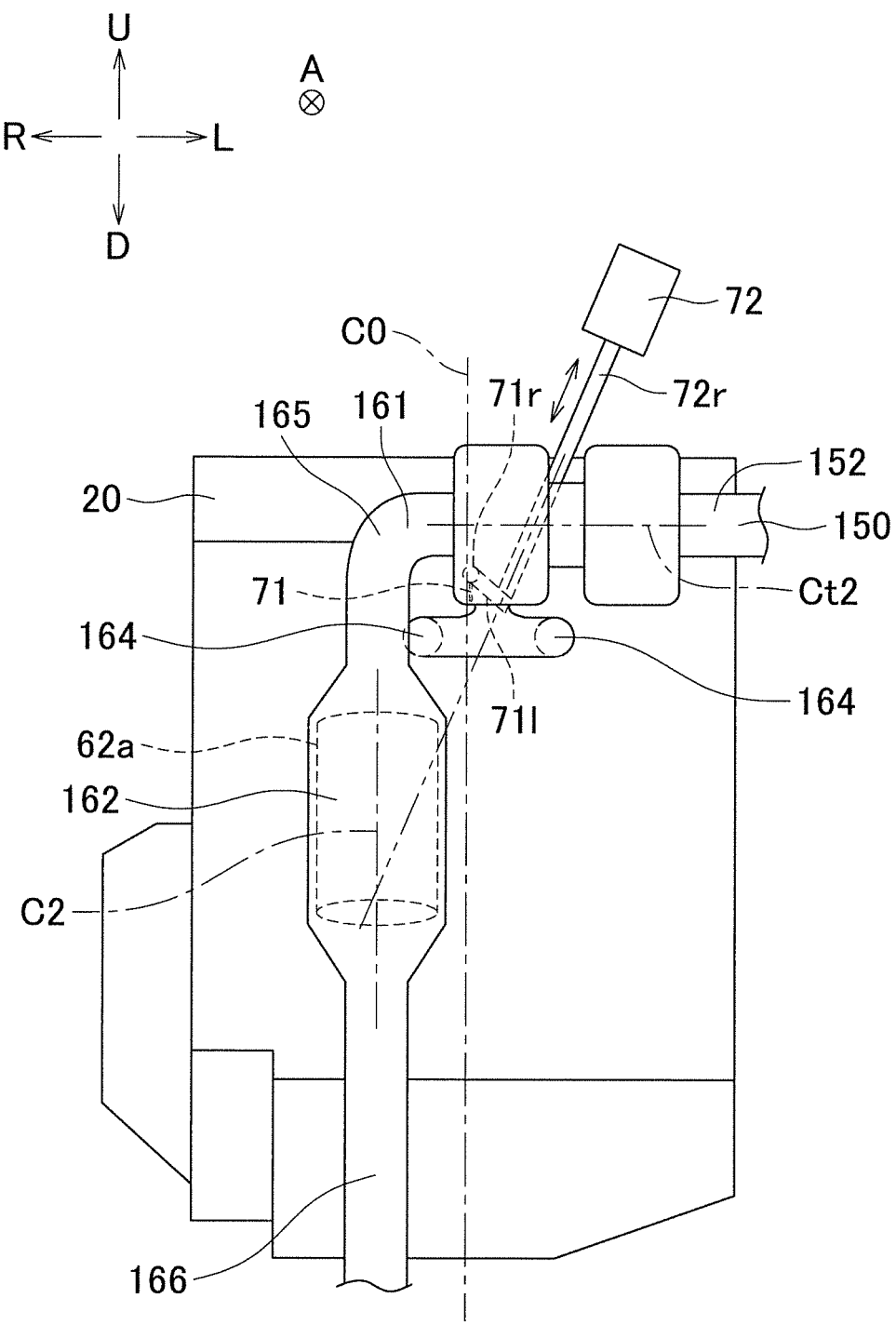
FIG. 14 shows the engine unit which is viewed in an A direction in FIG. 12.

The arrow A in FIG. 12 shows a direction which is orthogonal to both the central axis Ct2 of a connecting shaft 83 of the turbocharger 80 and the cylinder axis Cy. FIG. 14 shows the engine unit 111 viewed in the A direction. As shown in FIG. 14, when viewed in the A direction, the flow direction of the exhaust gas in the main catalyst 62a intersects with the reciprocating direction of the rod 72r of the waste gate valve actuator 72 to form an acute angle or an obtuse angle therebetween. In other words, when viewed in the A direction, the flow direction C1 of exhaust gas in the main catalyst 62a is not parallel to the reciprocating direction of the rod 72r. When viewed in the A direction, the flow direction C1 of exhaust gas in the main catalyst 62a is not orthogonal to the reciprocating direction of the rod 72r. When viewed in the A direction, the flow direction C1 of exhaust gas in the main catalyst 62a may be parallel to the reciprocating direction of the rod 72r. When viewed in the A direction, the flow direction C1 of exhaust gas in the main catalyst 62a may be orthogonal to the reciprocating direction of the rod 72r.

As shown in FIG. 12, part of the catalyst portion 162 is provided between the plane Se1 and the plane Se2. The plane Se1 is a plane passing through the front-most end of the crankcase member 20a and orthogonal to the front-rear direction. The plane Se2 is a plane passing through the rearmost end of the crankcase member 20a and orthogonal to the front-rear direction. When viewed in the left or right direction, the catalyst portion 162 is provided straight below the crankcase member 20a. When viewed in the left or right direction, part of the catalyst portion 162 is lined up with the crankcase member 20a in the up-down direction. The entirety of the catalyst portion 162 may be provided forward of the plane Se1. To put it differently, when viewed in the left or right direction, the entirety of the catalyst portion 162 may not be lined up with the crankcase member 20a in the up-down direction. As shown in FIG. 12, the catalyst portion 162 is provided between the plane Se3 and the plane Se4. The plane Se3 is a plane passing through the uppermost end of the crankcase member 20a and orthogonal to the up-down direction. The plane Se4 is a plane passing through the rearmost end of the crankcase member 20a and orthogonal to the up-down direction. When viewed in the left or right direction, the catalyst portion 162 is provided in front of the crankcase member 20a. When viewed in the left or right direction, the entirety of the catalyst portion 162 is lined up with the crankcase member 20a in the front-rear direction. When viewed in the left or right direction, only part of the catalyst portion 162 may be lined up with the crankcase member 20a in the front-rear direction. At least part of the catalyst portion 162 is preferably lined up with the crankcase member 20a in the front-rear direction. As shown in FIG. 13, the catalyst portion 162 is provided between the plane Se5 and the plane Se6. The plane Se5 is a plane passing through the leftmost end of the crankcase member 20a and orthogonal to the left-right direction. The plane Se6 is a plane passing through the rightmost end of the crankcase member 20a and orthogonal to the left-right direction. When viewed in the front or rear direction, at least part of the catalyst portion 162 overlaps the crankcase member 20a. To put it differently, when viewed in the front or rear direction, at least part of the catalyst portion 162 overlaps the engine main body 20. Although not shown, at least part of the catalyst portion 162 overlaps the engine main body 20 when viewed in the up or down direction. At least part of the catalyst portion 162 is lined up with the engine main body 20 in the front-rear direction. At least part of the catalyst portion 162 is lined up with the crankcase member 20a in the front-rear direction. Part of the catalyst portion 162 is lined up with the engine main body 20 in the up-down direction.

When viewed in the left or right direction, the catalyst portion 162 is provided forward of the linear line La1. That is, the catalyst portion 162 is provided forward of the crankshaft axis Cr. Furthermore, the catalyst portion 162 is provided below the crankshaft axis Cr. Part of the catalyst portion 162 may be provided above the crankshaft axis Cr. At least part of the catalyst portion 162 is preferably disposed below the crankshaft axis Cr. When viewed in the left or right direction, the catalyst portion catalyst portion 162 is provided forward of the cylinder axis Cy. When viewed in the left or right direction, part of the catalyst portion 162 is provided forward of (above) the linear line La2. The linear line La2 is a linear line orthogonal to the cylinder axis Cy and passes the crankshaft axis Cr when viewed in the left or right direction. When viewed in the left or right direction, the catalyst portion 162 may be entirely provided forward of the linear line La2. When viewed in the left or right direction, at least part of the catalyst portion 162 is preferably provided forward of the linear line La2.

As shown in FIG. 12, a plane passing through the lowermost end of the scroll exhaust passage member 165s and orthogonal to the up-down direction is defined as a plane Ss4. The catalyst portion 162 is provided below the plane Ss4. In other words, the catalyst portion 162 is provided below the scroll exhaust passage member 165s. The catalyst portion 162 is therefore provided below the turbine wheel 81. As a matter of course, the downstream end of the catalyst portion 162 is provided below the turbine wheel 81. When viewed in the left or right direction, the catalyst portion 162 is provided straight below the scroll exhaust passage member 165s. When viewed in the left or right direction, part of the catalyst portion 162 is lined up with the scroll exhaust passage member 165s in the up-down direction. When viewed in the left or right direction, part of the catalyst portion 162 may not be lined up with the scroll exhaust passage member 165s in the up-down direction. When viewed in the left or right direction, the entirety of the catalyst portion 162 may be lined up with the scroll exhaust passage member 165s in the up-down direction. When viewed in the left or right direction, at least part of the catalyst portion 162 is preferably lined up with the scroll exhaust passage member 165s in the up-down direction. When viewed in the left or right direction, the catalyst portion 162 is not provided straight below the turbine wheel 81. When viewed in the left or right direction, the catalyst portion 162 may be provided straight below the turbine wheel 81. When viewed in the left or right direction, part of the catalyst portion 162 may be lined up with the turbine wheel 81 in the up-down direction.

As shown in FIG. 12, part of the catalyst portion 162 is provided rearward of the plane Ss3. The plane Ss3 is a plane passing through the rearmost end of the scroll exhaust passage member 165s and orthogonal to the front-rear direction. In other words, part of the catalyst portion 162 is provided rearward of the scroll exhaust passage member 165s. Part of the catalyst portion 162 may be provided forward of the plane Ss3. Part of the catalyst portion 162 may be provided rearward of the plane Ss3.

As shown in FIG. 13, the catalyst portion 162 is provided rightward of the turbine wheel 81. In other words, the catalyst portion 162 is provided on the side opposite to the compressor wheel 82 over the turbine wheel 81. Being similar to Specific Example 1 of the embodiment, when viewed in the front or rear direction, at least part of the catalyst portion 162 does not overlap the front wheel unit 2.

As shown in FIG. 12, when viewed in the left or right direction, the catalyst portion 162 is provided in a rectangular region, two sides of which are the line segment Lw1 and the line segment Lw2. The line segment Lw1 is a line segment which is the lowermost one among line segments connecting points on the outline of the engine main body 20 with points on the outline of the front wheel unit 2, when viewed in the left or right direction. The line segment Lw2 is a line segment which is the uppermost one among line segments connecting points on the outline of the engine main body 20 with points on the outline of the front wheel unit 2, when viewed in the left or right direction. When viewed in the left or right direction, the catalyst portion 162 is provided in the above-described rectangular region and does not overlap the engine main body 20. To put it differently, when viewed in the left or right direction, the catalyst portion 162 is provided between the engine main body 20 and the front wheel unit 2. When viewed in the left or right direction, only part of the catalyst portion 162 may be provided between the engine main body 20 and the front wheel unit 2. For example, when viewed in the left or right direction, part of the catalyst portion 162 may overlap the engine main body 20. When viewed in the left or right direction, at least part of the catalyst portion 162 is preferably provided between the engine main body 20 and the front wheel unit 2.

As shown in FIG. 12, when viewed in the left or right direction, the catalyst portion 162 is provided on a line segment Lw3. The line segment Lw3 is, when viewed in the left or right direction, a line segment connecting the lowermost end of the engine main body 20 with the lowermost end of the front wheel unit 2. When viewed in the left or right direction, only part of the catalyst portion 162 may be provided on the line segment Lw3. When viewed in the left or right direction, at least part of the catalyst portion 162 is preferably provided on the line segment Lw3 and its extension.

As shown in FIG. 12, part of the catalyst portion 162 is provided below the horizontal plane Sw2. The horizontal plane Sw2 is a horizontal plane passing the center of the front wheel unit 2.

In the left-right direction, the position of the catalyst portion 162 is substantially identical with the position of the catalyst portion 62 in Specific Example 1 of the embodiment. The catalyst portion 162 is provided in right part of the motorcycle 101. The catalyst portion 162 and the main catalyst 62*a* are provided rightward of the turbine wheel 81. The main catalyst 62*a* is provided rightward of the waste gate valve actuator 72. The center C0 in the left-right direction of the motorcycle 101 is provided between the main catalyst 62*a* and the waste gate valve actuator 72. When viewed in the front or rear direction, at least part of the catalyst portion 162 does not overlap the front wheel unit 2.

The engine unit 111 of the present embodiment may include an upstream sub-catalyst 47U as in Specific Example 2 of the embodiment. The engine unit 111 of the present embodiment may include a downstream sub-catalyst 47D as in Specific Example 2 of the embodiment.

In regard to the arrangements similar to those in Embodiment 1 of the embodiment, the motorcycle 101 of the present embodiment exerts effects similar to the effects described in Specific Example 1 of the embodiment. Furthermore, the motorcycle 101 of the present embodiment has the following characteristics.

The catalyst portion 162 is provided such that the flow direction C1 of exhaust gas in the main catalyst 62*a* is along the up-down direction. On this account, the length in the front-rear direction of the catalyst portion 162 is shorter than the length in the up-down direction of the catalyst portion 162.

This makes it easy to secure a space in front of the engine main body 20, where the catalyst portion 162 is provided. With this arrangement, increase in size of the motorcycle 101 in the front-rear direction can be restrained even when the main catalyst 62*a* is increased in size.

The crankshaft 27 has a central axis Cr which is along the left-right direction. When viewed in the left or right direction, at least part of the catalyst portion 162 is provided forward of the linear line La2. The linear line La2 is a linear line which is orthogonal to the central axis Cy of the cylinder hole 22*a* and passes the central axis Cr of the crankshaft 27 when viewed in the left or right direction. With this arrangement, the path length from the combustion chamber 30 to the catalyst portion 162 is short as compared to cases where the entirety of the catalyst portion 162 is provided rearward of the linear line La2 when viewed in the left or right direction. On this account, the temperature of exhaust gas flowing into the main catalyst 62*a* is even higher. Thus, at the cold start of the engine unit 111, the time required for activation of the main catalyst 62*a* in an inactive state is shortened. As a result, it is possible to further improve the exhaust gas purification performance of the main catalyst 62*a*.

When viewed in the left or right direction, at least part of the catalyst portion 162 is lined up with at lest part of the scroll exhaust passage member 165*s* in the up-down direction, and is provided straight below the scroll exhaust passage member 165*s*. It is therefore possible to shorten, in the front-rear direction, the space in which the catalyst portion 162 and the turbocharger 80 are provided. On this account, increase in size of the motorcycle 101 in the front-rear direction can be restrained even when the main catalyst 62*a* is increased in size.

The present teaching is not limited to the above-described Specific Examples 1 and 2 and Modification 1 of the embodiment, and various changes can be made within the scope of the claims. The following describes modifications of the embodiment of the present teaching.

In Specific Examples 1 and 2 and Modification 1 of the embodiment, the crankcase 21 and the cylinder body 22 are different members. Alternatively, the crankcase and the cylinder body may be integrally molded. In Specific Examples 1 and 2 and Modification 1 of the embodiment, moreover, the cylinder body 22, the cylinder head 23, and the head cover 24 are different members. Alternatively, two or three of the cylinder body, the cylinder head, and the head cover may be integrally molded. In Specific Examples 1 and 2 and Modification 1 of the embodiment, the crankcase 21 and the oil pan 26 are different members. Alternatively, the crankcase and the oil pan may be integrally molded.

In Specific Examples 1 and 2 and Modification 1 of the embodiment, the shape of a cross section orthogonal to the flow direction of the exhaust gas in the main catalyst 62*a* is circular. The cross-sectional shape of the main catalyst of the present teaching, however, is not limited to circular. For example, the cross-sectional shape of the main catalyst may be elliptic and long in the left-right direction. In other words, the cross-sectional shape may be flat. The cross-sectional shape of the catalyst portion is preferably similar to the cross-sectional shape of the main catalyst.

When the sub-catalysts 47U and/or 47D have a porous structure, the modification may be applied to the sub-catalysts 47U and/or 47D.

In Specific Examples 1 and 2 and Modification 1 of the embodiment, the length of the main catalyst 62*a* in the flow direction C1 of the exhaust gas is longer than the maximum length of the main catalyst 62*a* in the direction orthogonal to the flow direction C1 of the exhaust gas. Alternatively, in the present teaching, the length of the main catalyst in the flow direction of the exhaust gas may be shorter than the maximum length of the main catalyst in the direction orthogonal to the flow direction of the exhaust gas.

In the present teaching, the main catalyst of the present teaching may be arranged such that multiple catalyst pieces are provided in close proximity. Each catalyst piece includes a substrate and a catalyst material. Disposing a plurality of catalyst pieces in close proximity means the following state. The catalyst pieces are in close proximity in a sense that the distance between neighboring catalyst pieces is shorter than the length of each catalyst piece in the flow direction of exhaust gas. The compositions of the substrate materials of the plurality of catalyst pieces may be the same or different. The noble metals of the catalyst materials of the catalyst pieces may be the same or different.

This modification may be employed in the sub-catalysts 47U and/or 47D.

In Specific Examples 1 and 2 and Modification 1 of the embodiment, the catalyst portion 62, 162 is provided in a right part of the motorcycle 1, 101. Alternatively, in the present teaching, the catalyst portion may be provided in a left part of the straddled vehicle. In such a case, the downstream exhaust passage member is preferably provided in the left part of the straddled vehicle. Furthermore, in the case above, the catalyst portion is preferably provided leftward of the turbine wheel. When viewed in the front or rear direction, the central axis of the main catalyst may intersect with the line at the center in the left-right direction of the straddled vehicle.

Figure 15:
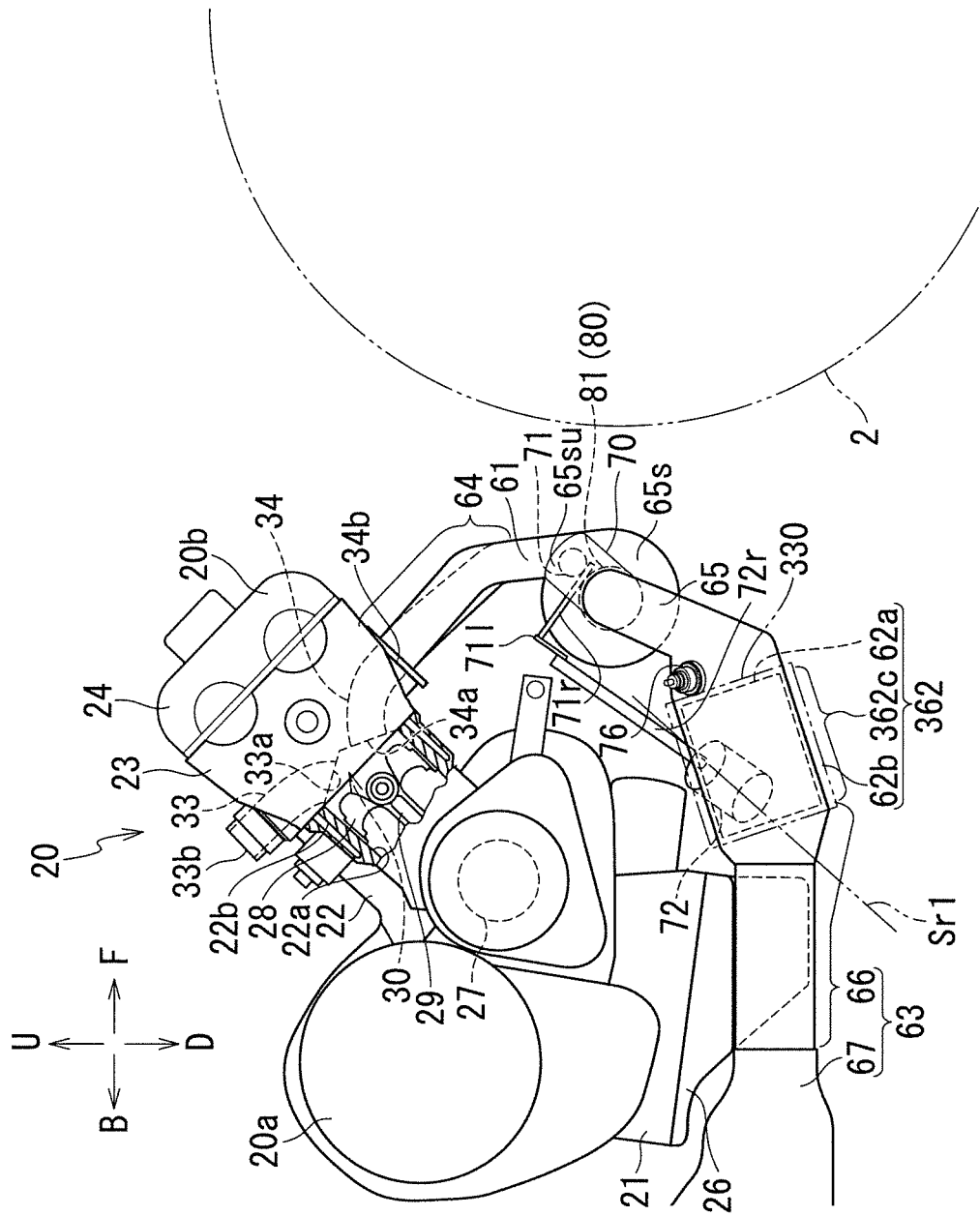
FIG. 15 is a right side view of a part of an engine unit according to another modification of the embodiment of the present teaching.

As shown in FIG. 15, at least part of the outer surface of the cylinder member 62b may be covered with a protector 330. In the protector 330, a part covering the outer surface of the cylinder member 62b is referred to as a catalyst protector portion 362c. The catalyst protector portion 362c is included in a catalyst portion 362. Part of the protector 330 may be included in the upstream collective exhaust passage member 65. Part of the protector 330 may be included in the downstream exhaust passage member 66. The catalyst protector portion 362c may or may not be cylindrical in shape. The catalyst protector portion 362c improves a heat retaining effect of the main catalyst 62a. Thus, at the cold start of the engine unit, the time required for activation of the main catalyst 62a in an inactive state is further shortened. The exhaust gas purification performance of the main catalyst 62a is therefore further improved. When the catalyst protector portion 362c is provided, the cylinder member 62b and the main catalyst 62a can be protected. Furthermore, the catalyst protector portion 362c improves the appearance.

These modifications may be used in Specific Example 2 and Modification 1 of the embodiment.

Figure 16:
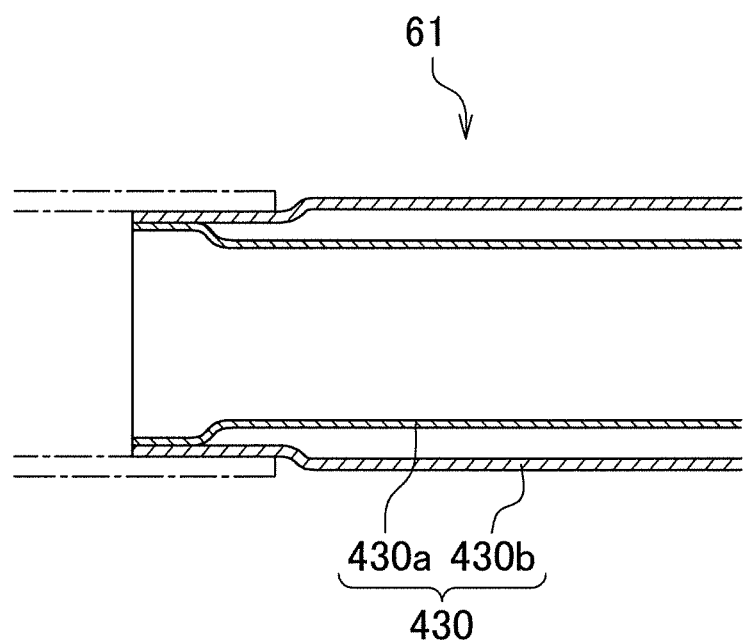
FIG. 16 is a cross section of a upstream exhaust passage member of another modification of the embodiment of the present teaching.

In the present teaching, at least part of the upstream exhaust passage member may be formed of a multi-walled pipe. The multi-walled pipe is constituted by an inner pipe and at least one outer pipe which covers the inner pipe. For example, as shown in FIG. 16, a part of the upstream exhaust passage member 61 may be formed of a double-walled pipe 430. The double-walled pipe 430 includes an inner pipe 430a and an outer pipe 430b. The end portions of the inner pipe 430a are in contact with the end portions of the outer pipe 430b. The inner pipe 430a and the outer pipe 430b may be in contact with each other at a portion other than the end portions. For example, the inner pipe 430a and the outer pipe 430b may be in contact with each other at a bended portion. A multi-walled pipe such as the double-walled pipe 430 restrains the decrease in temperature of the exhaust gas in the upstream exhaust passage member. Thus, at the cold start of the engine unit, the time required for activation of the main catalyst in an inactive state is shortened. On this account, the exhaust gas purification performance of the main catalyst is further improved.

The exhaust passage member 60 may include two muffler members 67 for one catalyst portion 62. In other words, the exhaust passage member 60 may have two atmosphere discharge ports 67a for one catalyst portion 62. In this case, the downstream exhaust passage member 66 is bifurcated. The two muffler members 67 are lined up in the up-down direction. Alternatively, the two muffler members 67 are provided in right and left parts of the motorcycle 1, respectively.

This modification may be used in Specific Example 2 and Modification 1 of the embodiment.

In Specific Examples 1 and 2 and Modification 1 of the embodiment, the number of the exhaust ports 34b in the engine main body 20 is identical with the number of the combustion chambers 30. However, when a plurality of combustion chamber exhaust ports 34a are provided for one combustion chamber 30, the number of the exhaust ports 34b may be larger than the number of the combustion chambers 30. In other words, in the present teaching, the number of the external independent exhaust passage members may be larger than the number of the combustion chambers 30.

Figure 17:
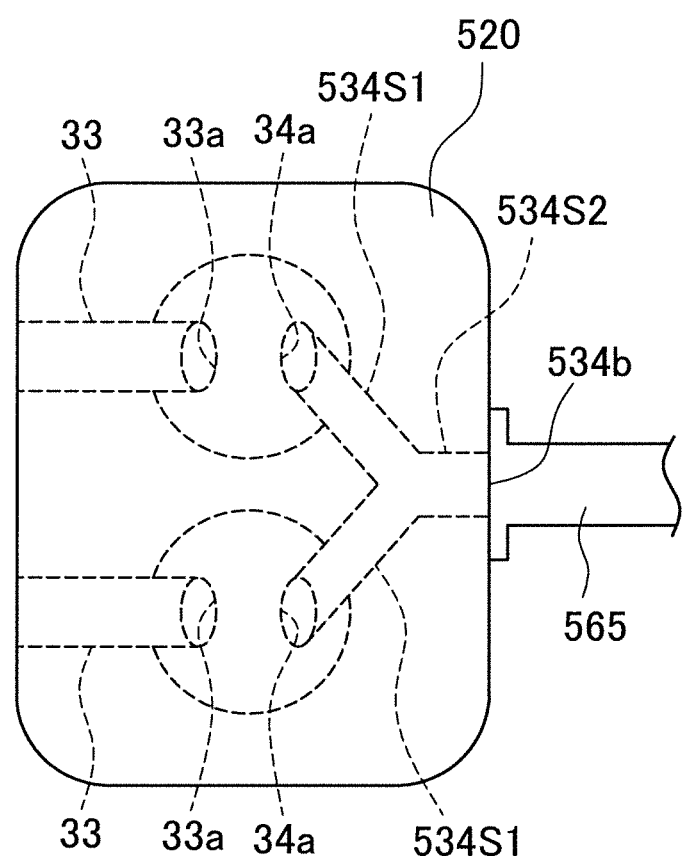
FIG. 17 is a plan view of a part of an engine unit according to another modification of the embodiment of the present teaching.

The number of the exhaust ports 34b in the engine main body 20 may be smaller than the number of the combustion chambers 30. The number of the exhaust ports 34b may be optionally set as long as the number is one or more. In this case, streams of the exhaust gas exhausted from the combustion chambers 30 are merged in the engine main body 20. To be more specific, as shown in FIG. 17, an engine main body 520 includes a plurality of internal independent exhaust passage members 534S1 and an internal collective exhaust passage member 534S2. The internal independent exhaust passage members 534S1 are connected to the respective combustion chambers 30. While the number of the combustion chambers 30 is two in FIG. 17, the number may be three or more. The internal collective exhaust passage member 534S2 is connected to the downstream ends of the internal independent exhaust passage members 534S1. The internal collective exhaust passage member 534S2 gathers (merges) the exhaust gas exhausted from the internal independent exhaust passage members 534S1. An exhaust port 534b is provided at the downstream end of the internal collective exhaust passage member 534S2. The internal collective exhaust passage member 534S2 is connected to the upstream end of an upstream collective exhaust passage member 565. A plurality of independent exhaust passage members 64 are not provided. According to this modification, the path length of a passage member in which only exhaust gas exhausted from one combustion chamber 30 passes is shortened. It is therefore possible to decrease the surface area of the inner surface of the passage member from the combustion chambers 30 to the catalyst portion 62. It is therefore possible to decrease the thermal capacity of the passage member from the combustion chambers 30 to the catalyst portion 62. On this account, the temperature of exhaust gas flowing into the catalyst portion 62 is higher. Thus, at the cold start of the engine unit 11, the time required for activation of the main catalyst 62a in an inactive state is shortened. The exhaust gas purification performance of the main catalyst 62a is therefore improved.

When the internal independent exhaust passage member 534S1 is provided, it is possible to provide the turbocharger 80 at a location closer to the exhaust port 534b. It is therefore possible to provide the catalyst portion so that the flow direction of the exhaust gas of the main catalyst 62a is along the up-down direction as in Specific Example 2 of the embodiment, while the turbocharger 80 is provided below the exhaust port 534b.

Figure 18:
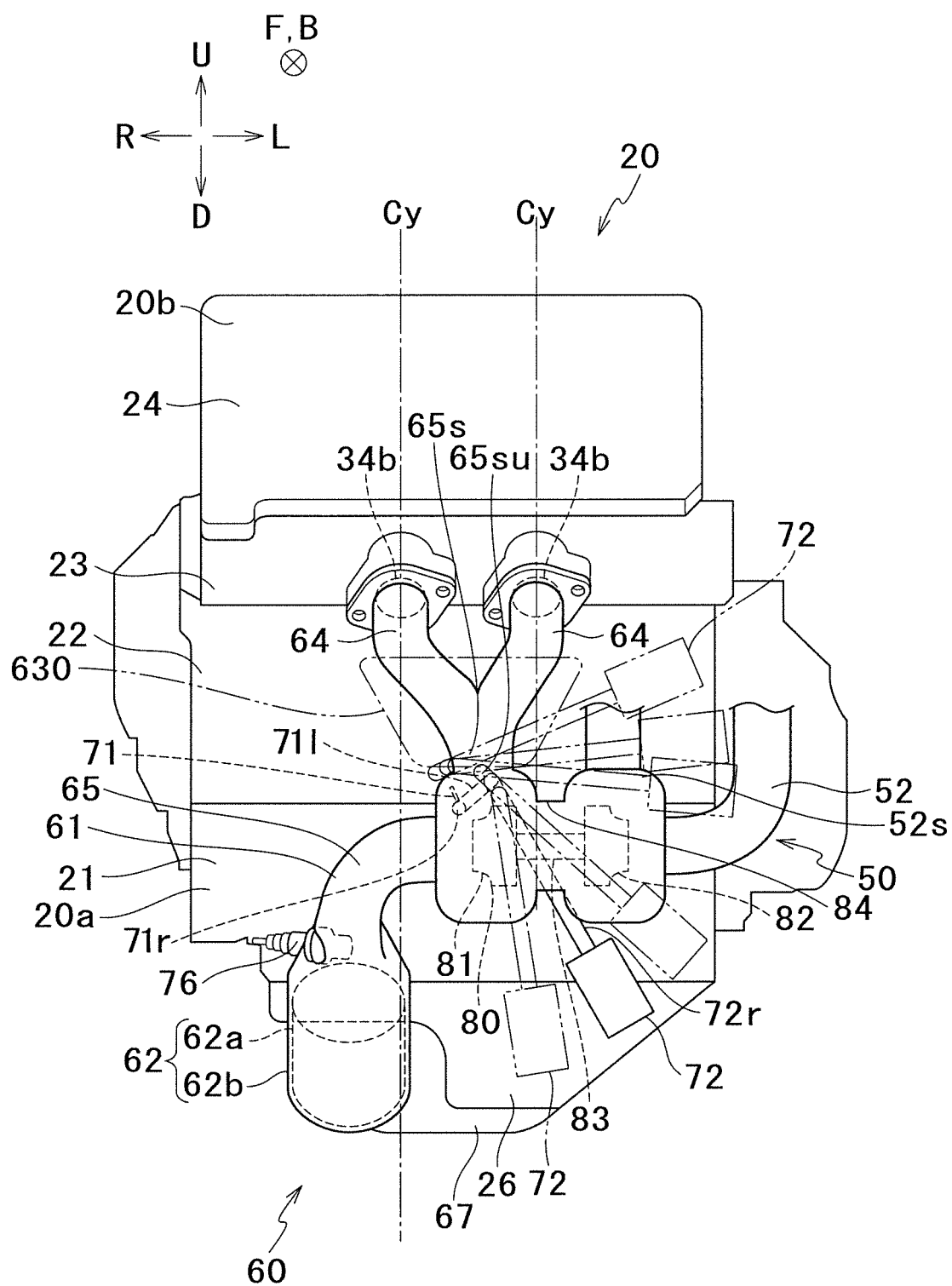
FIG. 18 is a front view of a part of an engine unit according to another modification of the embodiment of the present teaching.

The engine unit 11 may be arranged such that the exhaust gas is cooled by coolant water while passing between the combustion chamber 30 and the catalyst portion 62. In other words, the engine unit 11 may include an exhaust gas cooling passage member in which coolant water cooling exhaust gas flows. For example, as shown in FIG. 18, at least part of the exhaust gas cooling passage member 630 may be provided at the outer circumference of at least part of the upstream collective exhaust passage member 65. For example, as shown in FIG. 18, at least part of the exhaust gas cooling passage member 630 may be provided at the outer circumference of at least part of each the independent exhaust passage members 64. Alternatively, at least part of the exhaust gas cooling passage member may be provided at the outer circumference of at least part of each the internal exhaust passage members 34. In other words, at least part of the exhaust gas cooling passage member may be provided at the outer circumference of at least part of each the independent exhaust passage members 68. The independent exhaust passage member 68 is equivalent to an independent exhaust passage member of the present teaching. The upstream collective exhaust passage member 65 is equivalent to an upstream collective exhaust passage member of the present teaching. The coolant water flowing in the exhaust gas cooling passage member may be identical with or different from the coolant water cooling the engine main body 20. Exhaust gas may be cooled by using a coolant which is not water, instead of the coolant water. Furthermore, it is preferable not to circulate the coolant water in the exhaust gas cooling passage member until a predetermined timing comes after the cold start of the engine unit 11. In other words, it is preferable not to cool the exhaust gas by the coolant water during this period. The predetermined timing is determined based on, for example, an elapsed time, the total rotation number of the crankshaft 27, or the temperature of the exhaust gas. In this modification, the temperature of exhaust gas flowing into the catalyst portion 62 is low. On this account, the temperature of exhaust gas flowing into the catalyst portion 62 does not become excessively high, even when the catalyst portion 62 is provided at a location close to the combustion chamber 30. The deterioration of the main catalyst 62*a* due to excessive heating is prevented. As a result, it is possible to further improve the exhaust gas purification performance of the main catalyst 62*a*. Furthermore, the following effect is obtained when at least part of the exhaust gas cooling passage member is provided at the outer circumference of at least part of the upstream collective exhaust passage member 65. The exhaust gas cooling passage member is downsized as compared to cases where the exhaust gas cooling passage member is provided not in the upstream collective exhaust passage member 65 but at the outer circumference of each of the independent exhaust passage members 68. On this account, increase in size of the motorcycle 1 in the up-down direction and the front-rear direction can be restrained.

This modification may be used in Specific Example 2 and Modification 1 of the embodiment.

The exhaust gas cooling passage member may be employed in the modification shown in FIG. 17. At least part of the exhaust gas cooling passage member may be provided at the outer circumference of at least part of the upstream collective exhaust passage member 565. At least part of the exhaust gas cooling passage member may be provided at the outer circumference of at least part of the internal collective exhaust passage member 534S2. Alternatively, at least part of the exhaust gas cooling passage member may be provided at the outer circumference of at least part of each the internal independent exhaust passage members 534S1. The internal independent exhaust passage member 534S1 is equivalent to the independent exhaust passage member of the present teaching. Furthermore, a combination of the internal collective exhaust passage member 534S2 and the upstream collective exhaust passage member 565 is equivalent to the upstream collective exhaust passage member of the present teaching. The entirety of the upstream collective exhaust passage member 65 is equivalent to the upstream exhaust passage member of the present teaching. According to this modification, because the exhaust gas is cooled by the coolant water, it is possible to prevent the temperature of exhaust gas flowing into the catalyst portion 62 from becoming excessively high. The deterioration of the main catalyst 62*a* due to excessive heating is prevented. As a result, it is possible to further improve the exhaust gas purification performance of the main catalyst 62*a*. Furthermore, the following effect is obtained when at least part of the exhaust gas cooling passage member is provided at the outer circumference of at least part of the internal collective exhaust passage member 534S2. The exhaust gas cooling passage member is downsized as compared to cases where the exhaust gas cooling passage member is provided not in the internal collective exhaust passage member 534S2 but at the outer circumference of each of the internal independent exhaust passage members 534S1. On this account, increase in size of the engine main body in the up-down direction and the front-rear direction can be restrained. As a result, increase in size of the motorcycle 1 in the up-down direction and the front-rear direction can be restrained.

The combustion chamber 30 may include a main combustion chamber and an auxiliary combustion chamber connected with the main combustion chamber. A combination of the main combustion chamber and the auxiliary combustion chamber is equivalent to a combustion chamber of the present teaching.

In Specific Examples 1 and 2 and Modification 1 of the embodiment, the combustion chambers 30 are disposed to be lined up in the left-right direction. Alternatively, in the present teaching, the combustion chambers may be disposed to be lined up along the front-rear direction. In such a case, the upstream exhaust passage member is connected to the left surface or right surface of the engine main body.

In Specific Examples 1 and 2 and Modification 1 of the embodiment, the exhaust port 34*b* is formed in the front surface of the engine main body 20. Alternatively, the exhaust port 34*b* may be formed in the rear surface of the engine main body 20. To put it differently, in the present teaching, the upstream exhaust passage member may be connected to the front surface or the rear surface of the engine main body.

The engine main body 20 of Specific Examples 1 and 2 and Modification 1 of the embodiment includes two combustion chambers 30. In the present teaching, however, the number of combustion chambers in the engine main body is not limited to two. The number may be three or more. In the present teaching, the number of combustion chambers in the engine main body may be one. In other words, an engine unit of a straddled vehicle to which the present teaching is applied may be a single-cylinder engine.

In the present teaching, when the number of combustion chambers is four or more, more than one catalyst portions may be provided. Only exhaust gas exhausted from one or some of the combustion chambers may be allowed to pass one catalyst portion. In this case, the engine unit includes a plurality of upstream collective exhaust passage members.

The following will describe an example in which the number of combustion chambers is four. The engine unit includes four independent exhaust passage members, two upstream collective exhaust passage members, and two catalyst portions. The independent exhaust passage members are connected to the four combustion chambers, respectively. Each independent exhaust passage member is at least partially provided inside the engine main body. The downstream ends of two of the four independent exhaust passage members are connected to the first upstream collective exhaust passage member. The downstream ends of the remaining two independent exhaust passage members are connected to the second upstream collective exhaust passage member. The first upstream collective exhaust passage member gathers (merges) the exhaust gas discharged from two of the four combustion chambers. The second upstream collective exhaust passage member gathers (merges) the exhaust gas discharged from the remaining two combustion chambers. The first catalyst portion is connected to the downstream end of the first upstream collective exhaust passage member and the upstream end of the first downstream collective exhaust passage member. The first catalyst portion is connected to the downstream end of the second upstream collective exhaust passage member and the upstream end of the second downstream collective exhaust passage member.

When the number of the catalyst portions is two, the engine unit may include two downstream exhaust passage members. The two downstream exhaust passage members are connected to the respective downstream ends of the catalyst portions. Each of the two downstream exhaust passage members has an atmosphere discharge port. When the number of the catalyst portions is two, the engine unit may include only one downstream exhaust passage. This downstream exhaust passage member is connected to the downstream ends of the two catalyst portions. This downstream exhaust passage member gathers (merges) the exhaust gas discharged from the two catalyst portions. This downstream exhaust passage member may include only one atmosphere discharge port or two atmosphere discharge ports. When the downstream exhaust passage member includes two atmosphere discharge ports, the exhaust gas exhausted from the two catalyst portions are gathered (merged) and then divided into two streams.

The turbocharger 80 is provided in at least one of the first upstream collective exhaust passage member or the second upstream collective exhaust passage member. When the turbocharger 80 is provided in the first upstream collective exhaust passage member, the first catalyst portion is equivalent to a catalyst portion of the present teaching. Meanwhile, when the turbocharger 80 is provided in the second upstream collective exhaust passage member, the second catalyst portion is equivalent to a catalyst portion of the present teaching.

The engine main body may be a so-called V engine when the number of combustion chambers is two or more. For example, a V4 engine includes four combustion chambers, and two of these combustion chambers are provided at a front portion whereas the remaining two are provided at a rear portion. The combustion chamber provided at the front portion of the V engine are referred to as front combustion chamber. The combustion chamber provided at the rear portion of the V engine are referred to as rear combustion chamber. When the number of the front combustion chambers is more than one, the front combustion chambers are lined up in the left-right direction. The same applies to the rear combustion chambers. A cylinder hole constituting part of the front combustion chamber is termed a front cylinder hole. The central axis of the front cylinder hole is inclined with a positive slope in the forward direction. The front combustion chamber is encompassed in the "combustion chambers" of the present teaching.

When the engine main body is a V engine, the exhaust gas exhausted from a rear combustion chamber may be merged with the exhaust gas exhausted from a front combustion chamber.

The catalyst portion of the present teaching may be connected to the downstream end of the front-rear collective exhaust passage member which gathers (merges) the exhaust gas exhausted from the rear combustion chamber and the exhaust gas exhausted from the front combustion chamber. In this case, the turbine wheel of the present teaching is provided in the front-rear collective exhaust passage member. In this case, the rear combustion chamber may or may not be included in the "combustion chambers" of the present teaching.

The catalyst portion of the present teaching may be connected to the downstream end of the upstream exhaust passage member in which only the exhaust gas exhausted from at least one front combustion chamber passes. In this case, the turbine wheel of the present teaching is provided in this upstream exhaust passage member. In this case, in addition to the main catalyst which purifies the exhaust gas exhausted from the front combustion chamber, a catalyst which purifies the exhaust gas exhausted from the rear combustion chamber is provided. In this case, the rear combustion chamber is not included in the "combustion chambers" of the present teaching. In the case above, furthermore, a turbocharger which is driven solely by the exhaust gas exhausted from at least one rear combustion chamber may or may not be provided.

When the engine main body is a V engine, the exhaust gas exhausted from a rear combustion chamber may not be merged with the exhaust gas exhausted from a front combustion chamber. In this case, in addition to the main catalyst which purifies the exhaust gas exhausted from the front combustion chamber, a catalyst which purifies the exhaust gas exhausted from the rear combustion chamber is provided. In this case, the rear combustion chamber is not included in the "combustion chambers" of the present teaching. In the case above, furthermore, a turbocharger which is driven solely by the exhaust gas exhausted from at least one rear combustion chamber may or may not be provided.

In Specific Examples 1 and 2 and Modification 1 of the embodiment, the cylinder axis Cy is inclined with a positive slope in the forward direction. Alternatively, the cylinder axis Cy is inclined with a negative slope in the forward direction.

When the number of the independent exhaust passage members 64 is three or more, the downstream end of an independent exhaust passage member 64 may be positioned downstream of the downstream end of another independent exhaust passage member 64. In such a case, the oxygen sensor 76 is preferably provided downstream of the downstream ends of all independent exhaust passage members 64. This modification may be used in Specific Example 2 and Modification 1 of the embodiment.

Figure 19:
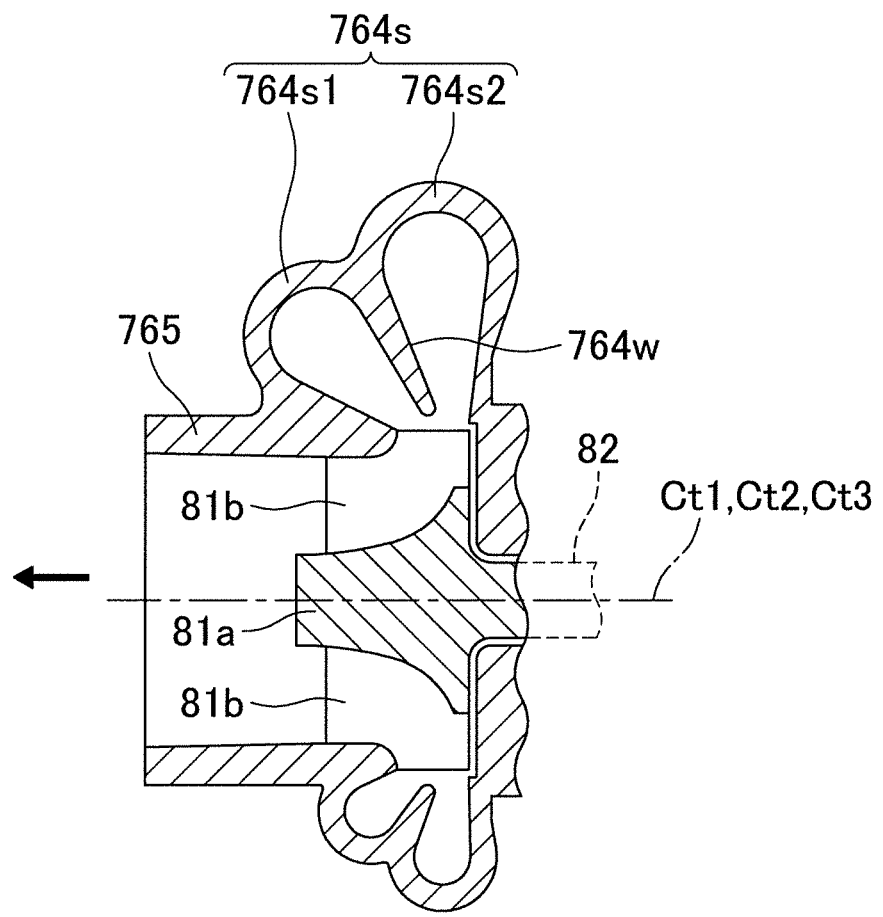
FIG. 19 is a cross section of a part of a turbocharger according to another modification of the embodiment of the present teaching.

In Specific Examples 1 and 2 and Modification 1 of the embodiment, the scroll exhaust passage member 65s, 165s is of a single-scroll type having only one inlet of exhaust gas. Alternatively, the scroll exhaust passage member of the present teaching may be of a twin-scroll type having two inlets of exhaust gas. FIG. 19 is a cross section of a part of a scroll exhaust passage member 764s which is of the twin-scroll type. The scroll exhaust passage member 764s includes a first scroll passage member 764s1 and a second scroll passage member 764s2. The first scroll passage member 764s1 and the second scroll passage member 764s2 are provided in two independent exhaust passage members 764, respectively. A turbine wheel 81 is provided in an upstream collective exhaust passage member 765. The first scroll passage member 764s1 and the second scroll passage member 764s2 are lined up in the direction of the central axis Ct1, Ct2, Ct3 of the connecting shaft 83. The first scroll passage member 764s1 and the second scroll passage member 764s2 are separated from each other by a partition wall 764w. Exhaust gas in the first scroll passage member 764s1 and exhaust gas in the second scroll passage member 764s2 are blown onto the outer periphery of the turbine wheel 81. Streams of the exhaust gas exhausted from the two scroll passage members 764s1 and 764s2 are gathered (merged) when passing the turbine wheel 81. With the scroll exhaust passage member of the twin-scroll type, it is possible to prevent the pressure of exhaust gas exhausted from one combustion chamber 30 from obstructing the discharge of exhaust gas from another combustion chamber 30. Decrease in flow rate and pressure of the exhaust gas is therefore prevented. As a result, decrease in engine output is prevented. Furthermore, because decrease in flow rate and pressure of exhaust gas is prevented, decrease in rotation speed of the turbine wheel 81 is prevented. As a result, decrease in intake efficiency is prevented. Prevention of decrease in intake efficiency results in prevention of decrease in fuel consumption and decrease in engine output.

When the number of the combustion chambers 30 is three or more, the exhaust gas exhausted from two or more combustion chambers 30 flows in at least one of the first scroll passage member 764s1 or the second scroll passage member 764s2. For example, when the number of the combustion chambers 30 is four, only the exhaust gas exhausted from two combustion chambers 30 flows in each of the scroll passage members 764s1 and 764s2. In this case, streams of exhaust gas exhausted from the two combustion chambers 30 are gathered while the gas flows from the two combustion chambers 30 to the first scroll passage member 764s1. Similarly, streams of exhaust gas exhausted from the two combustion chambers 30 are gathered while the gas flows from the remaining two combustion chambers 30 to the second scroll passage member 764s2. The upstream end of the exhaust passage member in which streams of exhaust gas exhausted from the two combustion chambers 30 are gathered may be provided inside the engine main body 20 or outside the engine main body 20.

The catalyst portion 62 of Specific Example 1 of the embodiment may be combined with the upstream exhaust passage member 161 of Modification 1 of the embodiment. In this modification, the path length from the downstream end of the scroll exhaust passage member to the catalyst portion is longer than that of Modification 1 of the embodiment. Modification 1 of the embodiment may be changed as follows. The length of the catalyst portion 162 is shortened in the up-down direction and the turbine wheel 81 is provided at a location below the central axis Cu2 of the exhaust port 34b.

In Specific Example 1 of the embodiment, gas flowing in the exhaust path 69 while the engine unit 11 is driven is only the exhaust gas exhausted from the combustion chamber 30. The engine unit of the present teaching, however, may include a secondary air supply mechanism which is configured to supply air to the upstream exhaust path from the combustion chamber to the catalyst portion. As the specific arrangement of the secondary air supply mechanism, a known arrangement is applied. The secondary air supply mechanism may forcibly supply air to the upstream exhaust path by means of an air pump. The secondary air supply mechanism may take air into the exhaust path by means of negative pressure in the upstream exhaust path. In the latter case, the secondary air supply mechanism includes a reed valve which opens and closes in accordance with changes of the pressure in the upstream exhaust path. When the secondary air supply mechanism is provided, a turbocharger may provided either upstream or downstream of a part to which air is supplied.

This modification may be used in Specific Example 2 and Modification 1 of the embodiment.

In Specific Examples 1 and 2 and Modification 1 of the embodiment, the engine unit 11, 111 is a water-cooled engine. In the present teaching, the engine unit may be an air-cooled engine. In the present teaching, the engine unit may be a natural air-cooled engine or a forced air-cooled engine.

The motorcycle of Specific Examples 1 and 2 and Modification 1 of the embodiment is a sports motorcycle. Alternatively, the straddled vehicle of the present teaching may be an on-road motorcycle, an off-road motorcycle, a scooter, an engine-equipped bicycle, a moped, etc. It should be noted that the straddled vehicle in the present teaching is not limited to the motorcycle. The straddled vehicle of the present teaching includes motorcycles, tricycles, four-wheeled buggies (ATVs: All Terrain Vehicles), personal water crafts, snowmobiles, and the like. A straddled vehicle indicates all types of vehicles on which a rider rides in a manner of straddling a saddle.

REFERENCE SIGNS LIST 1, 101 motorcycle (straddled vehicle)
2 front wheel unit
3 rear wheel unit
4 vehicle body frame
11, 111 engine unit
20, 520 engine main body
22a cylinder hole
27 crankshaft
30 combustion chamber
34 internal exhaust passage member
34b, 534b exhaust port
39 injector (fuel injector)
50, 150 intake passage member
52, 152 main intake passage member
52a atmosphere suction port
52s, 152s scroll intake passage member
60, 160 exhaust passage member
61, 161 upstream exhaust passage member
62, 162, 362 catalyst portion
62a main catalyst
63, 163 downstream collective exhaust passage member
64, 164, 764 independent exhaust passage member (external independent exhaust passage member)
65, 165, 765 upstream collective exhaust passage member (external upstream collective exhaust passage member)
65s, 165s, 764s scroll exhaust passage member
66, 166 downstream exhaust passage member
67a atmosphere discharge port
68 independent exhaust passage member
69 exhaust path
71 waste gate valve
72 waste gate valve actuator
72r rod
80 turbocharger
81 turbine wheel
82 compressor wheel
83 connecting shaft
534S1 internal independent exhaust passage member
534S2 internal collective exhaust passage member
565 upstream collective exhaust passage member (upstream exhaust passage member)
630 exhaust gas cooling passage member
C1, C2, C3 central axis of catalyst portion
Cr central axis of crankshaft
Ct1, Ct2, Ct3 central axis of connecting shaft
Cy central axis of cylinder hole Da distance in left-right direction between center in left-right direction of vehicle and turbine wheel
Dt2 distance in left-right direction between center in left-right direction of vehicle and compressor wheel
Sw2 horizontal plane passing center of front wheel unit

What is claimed is:

1. A straddled vehicle comprising:
a vehicle body frame;
an engine unit supported by the vehicle body frame;
a front wheel unit which includes at least one front wheel and is provided in front of the engine unit in a front-rear direction of the vehicle when viewed in a left-right direction of the vehicle; and
a rear wheel unit which includes at least one rear wheel and is provided behind the engine unit in the front-rear direction when viewed in the left or right direction,
the engine unit including:
an engine main body including at least one combustion chamber and at least one cylinder hole;
an intake passage member which is connected to the engine main body and includes an atmosphere suction port through which air is suckable, air supplied to the at least one combustion chamber passing through the intake passage member,
an upstream exhaust passage member which is connected to the engine main body, exhaust gas exhausted from the at least one combustion chamber passing through the upstream exhaust passage member;
a downstream exhaust passage member including an atmosphere discharge port from which the exhaust gas is dischargeable to the atmosphere;
a turbocharger including a turbine wheel which is provided in the upstream exhaust passage member and a compressor wheel which is provided in the intake passage member and is connected to the turbine wheel via a connecting shaft having a central axis which is along the left-right direction of the vehicle;
a bypass exhaust passage member connected to the upstream exhaust passage member so as to bypass the turbine wheel;
a waste gate valve which is configured to adjust a flow rate of the exhaust gas supplied to the turbine wheel by changing a cross-sectional area of a path of the bypass exhaust passage member;
a waste gate valve actuator which includes a rod connected to the waste gate valve and is configured to drive the waste gate valve by reciprocating the rod along a virtual plane which is parallel to both the central axis of the connecting shaft of the turbocharger and at least one central axis of the at least one cylinder hole; and
a catalyst portion which is connected to a downstream end of the upstream exhaust passage member and an upstream end of the downstream exhaust passage member and includes a main catalyst configured to purify the exhaust gas exhausted from the at least one combustion chamber most in at least one exhaust path from the at least one combustion chamber to the atmosphere discharge port, the catalyst portion being provided so that
(a) the main catalyst is provided forward of the at least one central axis of the at least one cylinder hole in the front-rear direction when viewed in the left-right direction,
(b) a flow direction of the exhaust gas in the main catalyst is along a direction parallel to the at least one central axis of the at least one cylinder hole,
(c) the flow direction of the exhaust gas in the main catalyst intersects with a reciprocating direction in which the rod of the waste gate valve actuator moves, when viewed in a direction orthogonal to both the central axis of the connecting shaft of the turbocharger and the at least one central axis of the at least one cylinder hole, and
(d) a center in the left-right direction of the straddled vehicle is positioned between the main catalyst and the waste gate valve actuator.

2. The straddled vehicle according to claim 1, wherein the catalyst portion is provided such that, when viewed in the direction orthogonal to both the central axis of the connecting shaft of the turbocharger and the at least one central axis of the at least one cylinder hole, the flow direction of the exhaust gas in the main catalyst intersects with the reciprocating direction of the rod of the waste gate valve actuator to form an acute angle or an obtuse angle.

3. The straddled vehicle according to claim 1, wherein the engine main body includes a crankshaft having a central axis which is along the left-right direction, and at least part of the catalyst portion is provided forward of the central axis of the crankshaft in the front-rear direction.

4. The straddled vehicle according to claim 1, wherein at least part of the catalyst portion is provided below a horizontal plane which passes a center of the front wheel unit in an up-down direction of the vehicle.

5. The straddled vehicle according to claim 1, wherein when viewed in the front-rear direction, the catalyst portion is provided leftward of or rightward of the turbine wheel in the left-right direction.

6. The straddled vehicle according to claim 1, wherein, the at least one central axis of the at least one cylinder hole is along an up-down direction of the vehicle.

7. The straddled vehicle according to claim 6, wherein, the catalyst portion is provided so that the flow direction of the exhaust gas in the main catalyst is along the up-down direction.

8. The straddled vehicle according to claim 7, wherein, the engine main body includes a crankshaft having a central axis which is along the left-right direction, and when viewed in the left-right direction, at least part of the catalyst portion is provided forward of a linear line in the front-rear direction, the linear line being orthogonal to the at least one central axis of the at least one cylinder hole and passing through the central axis of the crankshaft.

9. The straddled vehicle according to claim 7, wherein, the upstream exhaust passage member includes a scroll exhaust passage member which entirely surrounds the outer circumference of the turbine wheel, and when viewed in the left or right direction, at least part of the catalyst portion is lined up with at least part of the scroll exhaust passage member in the up-down direction, and is provided straight below the scroll exhaust passage member.

10. The straddled vehicle according to claim 1, wherein at least part of the catalyst portion and at least part of the waste gate valve actuator do not overlap the front wheel unit when viewed in the front-rear direction.

11. The straddled vehicle according to claim 1, wherein a distance in the left-right direction between the center in the left-right direction of the straddled vehicle and the turbine wheel is shorter than a distance in the left-right direction between the center in the left-right direction of the straddled vehicle and the compressor wheel.

12. The straddled vehicle according to claim 1, wherein,
the engine main body includes a crankshaft having a central axis which is along the left-right direction,
the upstream exhaust passage member includes a scroll exhaust passage member which entirely surrounds the outer circumference of the turbine wheel, and
when viewed in the left-right direction, at least part of the scroll exhaust passage member is provided forward of a linear line in the front-rear direction, the linear line being orthogonal to the at least one central axis of the at least one cylinder hole and passing through the central axis of the crankshaft.

13. The straddled vehicle according to claim 1, wherein, the catalyst portion is provided below the turbine wheel in an up-down direction of the vehicle.

14. The straddled vehicle according to claim 1, wherein, the catalyst portion is provided so that the flow direction of the exhaust gas in the main catalyst is along a horizontal direction.

15. The straddled vehicle according to claim 14, wherein,
the engine main body includes a crankshaft having a central axis which is along the left-right direction, and
when viewed in the left-right direction, at least part of the catalyst portion is provided rearward of a linear line in the front-rear direction, the linear line being orthogonal to the at least one central axis of the at least one cylinder hole and passing through the central axis of the crankshaft.

* * * * *